United States Patent [19]
Kinjo et al.

[11] Patent Number: 5,982,590
[45] Date of Patent: Nov. 9, 1999

[54] MAGNETIC RECORDING/REPRODUCING APPARATUS WITH TILTING HEAD DRUM FOR DYNAMIC TRACKING

[75] Inventors: Hisao Kinjo; Hiromichi Hirayama, both of Yokohama; Ryo Nishima, Yokosuka, all of Japan

[73] Assignee: Victor Company of Japan, Ltd., Yokohama, Japan

[21] Appl. No.: 08/876,110

[22] Filed: Jun. 13, 1997

Related U.S. Application Data

[63] Continuation of application No. 08/398,750, Mar. 6, 1995, abandoned, which is a continuation-in-part of application No. 08/126,221, Sep. 23, 1993, Pat. No. 5,504,642.

[30] Foreign Application Priority Data

Mar. 7, 1994 [JP] Japan .................................. 6-062072

[51] Int. Cl.⁶ ........................... G11B 5/588; G11B 15/16
[52] U.S. Cl. ..................................... 360/109; 360/130.24
[58] Field of Search ................................. 360/107, 109, 360/84, 130.24

[56] References Cited

U.S. PATENT DOCUMENTS

| | | | |
|---|---|---|---|
| 3,567,869 | 3/1971 | Hirota et al. ............................. 360/107 |
| 3,697,676 | 10/1972 | Protas ..................................... 360/107 |
| 3,995,317 | 11/1976 | Schmidt .................................. 360/109 |
| 4,541,557 | 9/1985 | Fell et al. ................................ 226/191 |
| 5,003,424 | 3/1991 | Grant ................................. 360/130.23 |
| 5,047,872 | 9/1991 | Heitmann ................................ 360/10.2 |
| 5,067,035 | 11/1991 | Kudelski et al. ........................ 360/85 |

FOREIGN PATENT DOCUMENTS

| | | |
|---|---|---|
| 0 115 275 | 8/1984 | European Pat. Off. . |
| 0 589 726A2 | 3/1994 | European Pat. Off. . |
| 61-158633 | 10/1986 | Japan . |
| 63-034126 | 9/1988 | Japan . |
| 3-216849 | 9/1991 | Japan . |
| 4-295657 | 10/1992 | Japan . |
| 2 155 685 | 9/1985 | United Kingdom . |

OTHER PUBLICATIONS

IBM Technical Disclosure Bulletin vol. 18, No. 12, pp. 3926–3930, May 1976, by Karol et al. entitled "Head/Rotor Control and Maximation of Time/Tape Space Utilization". Japanese Patent Abstract of 59–084369 published May 16, 1984 to Mitsura et al.

*Primary Examiner*—Craig A. Renner
*Attorney, Agent, or Firm*—Michael N. Meller; Eugene Lieberstein

[57] ABSTRACT

A magnetic recording and reproducing apparatus includes a tape guide drum (10) composed of a lower stationary drum (10A) supported integrally with a drum shaft (18) and an upper rotary drum (10B), a lead member (12) provided separately from the lower drum and composed of an annular portion (52) having a portion for guiding a reference edge Te of a magnetic tape T and a bottom portion (53). The apparatus further includes pivot means provided inside the drum to support and allow the center axis of the drum to tilt with respect to the annular portion of the tape guide.

9 Claims, 39 Drawing Sheets

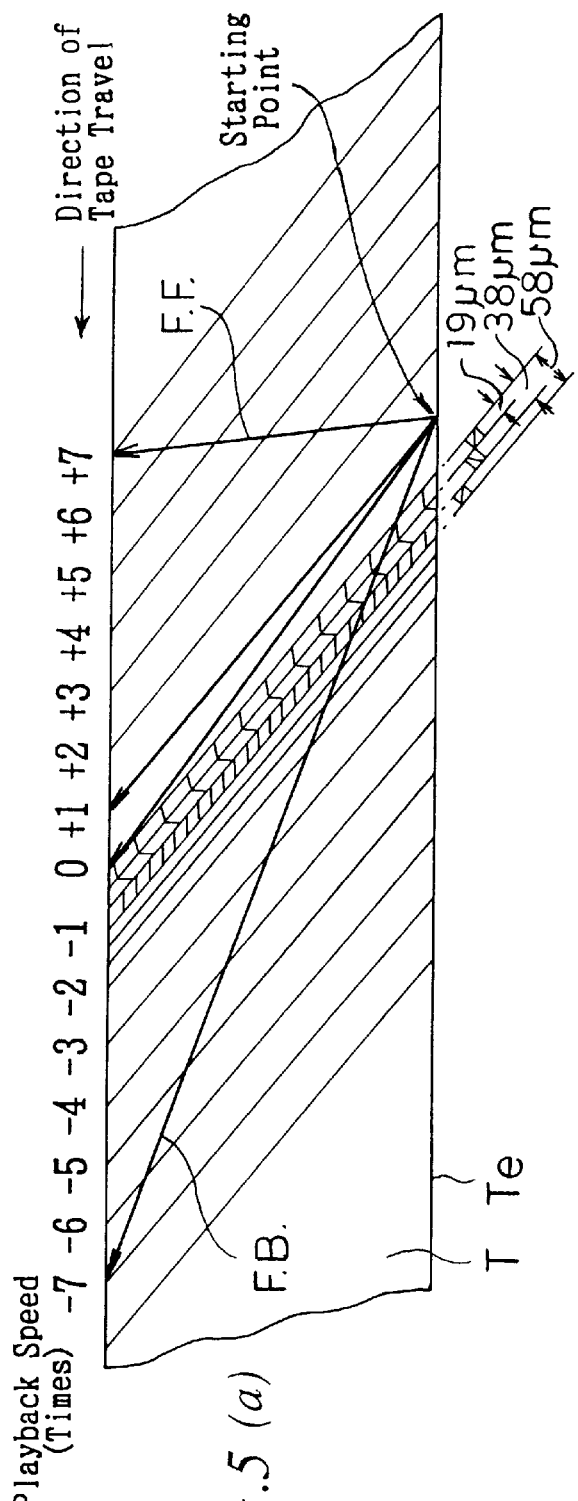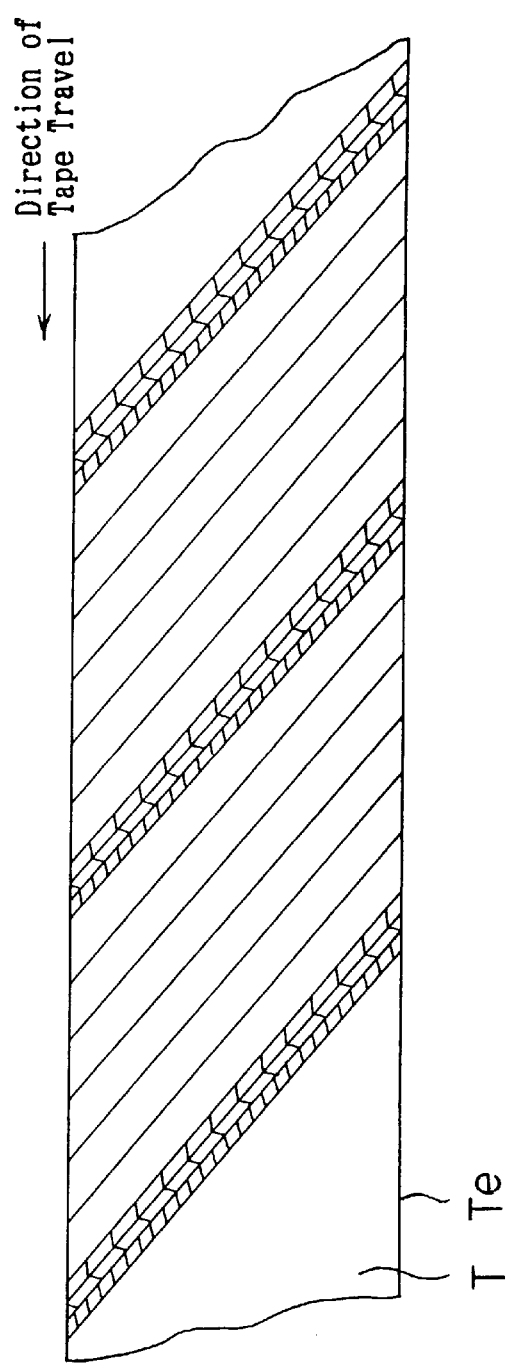
Fig.5 (a)
Fig.5 (b)

90° - 270°

0° - 180°

MAGNETIC RECORDING/REPRODUCING APPARATUS WITH TILTING HEAD DRUM FOR DYNAMIC TRACKING

This application is a continuation of application Ser. No. 08/398,750, filed Mar. 6, 1995, now abandoned, which is a Continuation-In-Part application of U.S. Ser. No. 08/126,221 filed on Sep. 23, 1993, now U.S. Pat. No. 5,504,642, issued on Apr. 2, 1996.

BACKGROUND OF THE INVENTION

1. Field of the Invention

This relates to a magnetic recording/reproducing apparatus and, particularly, to a magnetic recording/reproducing apparatus in which rotary magnetic heads can reliably trace recorded tracks on a magnetic tape by changing a spatial positional relation between a rotary locus plane of the rotary magnetic heads and the magnetic tape in response to a change of running speed of the magnetic tape running along a portion of a peripheral surface of a drum in contact therewith.

2. Description of the Prior Art

A typical example of the magnetic recording/reproducing apparatus which performs a recording/reproducing operation by helically scanning a magnetic tape running at a certain speed along a peripheral surface of a drum composed of an upper drum and a lower drum in contact with a portion of the peripheral surface with rotary magnetic heads (referred to as "magnetic head", hereinafter) may be a video tape recorder (referred to as "VTR", hereinafter).

It is usual that a VTR of this type is provided with, in addition to a function of a normal reproduction in which a recorded information is reproduced while running a magnetic tape at the same speed as that used in recording operation, functions of the so-called variable speed reproduction (referred to as "trick plays", hereinafter) in which a reproduction is performed while running a magnetic tape at a speed (including "stopping") different from the magnetic tape speed used in the recording, in a tape running direction which may be different from the tape running direction in a recording operation.

Further, a VTR is also available in which an event is recorded over a considerably long time while running a magnetic tape intermittently as so called "time-lapse" (intermittent) recording or frame-by-frame recording operation and the magnetic tape thus recorded is reproduced at an industry standard tape speed.

In FIGS. 1 and 2, there is shown an example of a general magnetic tape transporting system in the vicinity of a drum assembly 10 of the VTR.

FIG. 1 is a front view of general magnetic tape transporting system in the vicinity of a drum assembly of the VTR.

FIG. 2 is a plan view of FIG. 1 viewed from an upper side of the drum assembly, wherein a guide roller SGR provided at a supply side of a magnetic tape T and a guide roller TGR provided at a take-up side of the magnetic tape T are omitted for simplicity.

Further, in FIG. 2, a straight line L1 bisects a range of the magnetic tape T wrapped around the drum assembly 10, and a straight line L2 intersects perpendicularly to the straight line L1 at a drum axis 18 of the drum assembly 10. It is noted that a position with respect to a rotational direction around the drum axis 18 may be defined by designating an angle in a counterclockwise direction from a lefthand side of the straight line L2 as marked 0 degree in FIG. 2, which is regarded as a reference angle hereinafter.

In these FIGS. 1 and 2, the magnetic tape T supplied from a supply reel (not shown) is transported along a well known transporting system and then wound on the drum assembly 10 composed of an upper drum 10B and a lower drum 10A over a predetermined angle. The magnetic tape T is oriented oblique with respect to the drum 10 by being guided by a supply side guide roller SGR, a supply side slanted pole 1, a take-up side slanted pole 2 and a take-up side guide roller TGR. After passed through the take-up side guide roller TGR, the magnetic tape T is transported by means of a known tape transport system and taken up on a take-up reel (not shown).

During this transportation, a recorded track pattern (referred to as "tape pattern" or "track pattern", hereinafter) such as shown in FIG. 4 is formed on the magnetic tape T by rotary magnetic heads Ha and Hb mounted on the drum 10.

FIGS. 3(a) and 3(b) show a waveform of FM reproduced signals, respectively.

FIG. 4 illustrates a tape pattern.

FIGS. 5(a) and 5(b) illustrate another tape pattern.

In FIG. 4, a straight line connecting a "starting point" at a lower edge of the magnetic tape T to a point +1 and a number of lines parallel to the straight line are center lines of respective tracks. When the magnetic tape T having such track pattern as shown is reproduced while running it in the same direction as a recording direction at the same speed as a recording speed, the rotary magnetic heads Ha and Hb trace the respective tracks, resulting in a normal reproduction.

However, when the magnetic tape running direction and/ or its running speed during a reproducing operation are different from those in the recording operation, a locus of the magnetic heads Ha and Hb on the magnetic tape T becomes such as shown by FF(fast forward), STILL or FB(fast backward) in FIG. 4 since a relative linear speed of the magnetic tape T to the magnetic heads is changed.

In FIG. 4, straight lines connecting the starting point to respective points +2, +3, . . . +7 are loci of the magnetic heads Ha and Hb on the magnetic tape T when the magnetic tape runs in a forward direction, that is, the same direction (shown by a sign "+") as that in the recording operation at a speed twice, triplex, . . . or seven-times the recording magnetic tape speed, respectively (this will be referred to as "FF reproduction", hereinafter).

Similarly, straight lines connecting the starting point to respective points −2, −3, . . . −7 are loci of the magnetic heads Ha and Hb on the magnetic tape T when the magnetic tape runs in an opposite direction (shown by a sign "−") to that in recording operation at a speed twice, triplex, . . . seven-times the recording magnetic tape speed, respectively (this will be referred to as "FB reproduction", hereinafter).

Incidentally, a straight lines connecting the starting point to a point "0" in an upper edge of the magnetic tape T is a locus of the magnetic heads Ha and Hb on the magnetic tape T when a reproducing operation is performed while the magnetic tape T is stopped (this will be referred to as "still repro-duction", hereinafter).

For a VTR of VHS system (an industry standard system) which is a typical example of VTR system, it is general that a magnetic tape T runs while being helically wound on an outer peripheral surfaces of the drum assembly 10 composed of an upper rotary drum 10B having diameter of 62 mm and rotating at 1,800 rpm and a lower stationary drum 10A over an angular range of about 180°. In a recording of a standard mode (referred to as "SP mode", hereinafter), the magnetic tape is transported at a rate of 33.35 mm/second and a locus recorded with the rotary magnetic head having track width of 58 μm on the magnetic tape T forms a video track angle of 5°58'9.9" with respect to a reference edge Te of the magnetic tape T as shown in FIG. 4. In addition to the SP mode, the VTR of VHS system has a triplex mode (tape runs at ⅓ of the standard tape speed to prolong its play time to 3 times standard, and referred to as "EP mode", hereinafter) in which the magnetic tape T is transported at 11.12 mm/second and recorded with a rotary magnetic head having track width of 19 μm. In the EP mode in which the magnetic tape running speed and the track width are one-third those in the SP mode, respectively, a recording time becomes three times that in the SP mode. However, it is more difficult than in the case of the SP mode to exactly trace the respective tracks with the rotary magnetic heads Ha and Hb in the trick plays, due to the narrower track width recorded on the magnetic tape, as will be described later.

In a case where the magnetic tape T is made stationary, a locus of the rotary magnetic head on the magnetic tape T makes an angle of 5°56'7.4" with respect to the reference edge Te of the magnetic tape T. Further, in this case, a straight line connecting the starting point to the point +7 on the upper edge of the magnetic tape T in the SP mode shown in FIG. 4 makes an angle of 6°10'54" with respect to the reference edge Te of the magnetic tape T and the straight line connecting the starting point to the point −7 in the SP mode makes an angle of 5°42'25.7" with respect to the refer-ence edge Te.

As is clear from the track pattern shown in FIG. 4, the track pattern recorded on the magnetic tape T in the SP mode intersects the locus of the rotary magnetic heads Ha and Hb on the magnetic tape T in the trick plays. Therefore, a normal signal level of an FM signal as shown in FIG. 3(a) can not be obtained. Instead of that, a signal level of the FM signal reproduced in the trick play is considerably changed every time when the rotary magnetic heads Ha and Hb intersect the recorded tracks, resulting in an envelope of the FM signal in one vertical scan period as shown in FIG. 3(b), which exhibits a large variation. Due to this fact, an image reproduced in the trick plays contains noise and is low in quality.

Recently, a VTR of new type which is capable of recording/reproducing a High Definition TV (a trade name, referred to as "HDTV", hereinafter) image information has been proposed in which a magnetic tape T is recorded with 3 tracks simultaneously in parallel each being 19 μm wide to form a recorded pattern such as shown in FIG. 5(a). In this VTR, two adjacent tracks of the 3 tracks are used by two rotary magnetic heads whose azimuth angles are opposite each other, to perform a recording/reproducing of a video image signal and the remaining one track is used by another pair of rotary magnetic heads to perform a recording/reproducing of a sound signal.

In a case where a magnetic tape T recorded by the new type VTR is reproduced while feeding or rewinding the tape at a higher speed than a recording speed, a locus of the rotary magnetic heads on the magnetic tape T becomes a straight line connecting a "starting point" in FIG. 5(a) to a point on an upper edge of the tape indicated by +7 or −7, so that the rotary magnetic heads perform the reproducing operation while intersecting many of the "three-times" recorded tracks on the magnetic tape T causing a reproduced image to include noise-bars.

Further, there are many digital VTRs for home use which have been proposed recently, in which an image signal is recorded by compressing an amount of data thereof with using the High Efficiency Coding System. When, in such digital VTR, a rotary magnetic head performs a reproduction such as FF reproduction or FB reproduction in which the rotary magnetic head crosses recorded tracks of a magnetic tape, an image reproduction may become completely impossible dependent on orientation of data blocks arranged in a mosaic.

In order to solve such problem, it is enough to make the locus of the rotary magnetic head coincident with the recorded track of the magnetic tape T. In order to realize this, the following methods have been proposed:

(1) A rotary magnetic head is mounted on an electromechanical transducer as an actuator and the rotary magnetic head is displaced to a direction intersecting the recorded track of the tape by controlling the electromechanical transducer by means of an open or closed loop control circuit so that the magnetic head follows the recorded track; and (2) As disclosed in, for example, Japanese Utility Model Publication No. 63-34126 or Japanese Utility Model Laid-open No. 61-158633, a rotary drum on which magnetic heads are mounted and a lower drum are inclined together so that the rotary magnetic heads follow the recorded track of the magnetic tape T.

A description is given to a magnetic tape recording and reproducing apparatus (magnetic recording/reproducing apparatus) disclosed in the Japanese Utility Model Publication No. Sho 61-158633, which is filed by the present Applicant, referring to FIGS. 6 and 7.

FIG. 6 is a perspective view showing a whole construction of a magnetic recording and reproducing apparatus in the prior art.

FIG. 7 is a front view showing a magnetic tape transporting system in the vicinity of the drum assembly.

Referring to FIGS. 6 and 7, this apparatus comprises a drum assembly 10 inclined at an angle φ in a direction of an arrow A1, a supply side guide roller SGR and a slant pole 1 each provided at a tape inlet side of the drum assembly 10, a take-up side guide roller TGR and a slant pole 2 both provided at a tape exit side of the drum assembly 10, along a magnetic tape running direction. A magnetic tape T forms a tape path from a supply side reel 3 till a take-up reel 9 by contacting with an erase head 4 and an impedance roller 5 and being wound around the drum assembly 10 over a predetermined range and contacting with the audio control head 6 and being taken up with the take-up reel 9. The magnetic tape T is transformed by being driven and interposed between a pinch roller 8 and a capstan 7.

The drum assembly 10 comprises the lower stationary drum 10A and the upper rotary drum 10B with a magnetic head Ha and Hb. The upper drum 10A is rotated with respect to a drum shaft 18 of a drum motor 19 which is integrally provided on the lower stationary drum 10A. Under the lower stationary drum 10A, a drum support member 11 is fixed. The drum assembly 10 is obliquely provided on a chassis 14 in directions of arrows A1, A2 by causing a pair of pins (one of them is depicted) installed on the drum support member 11 to be pivoted on a pair of protruding holders 14a of the chassis 14.

A reference numeral 15 designates a stepping motor, which is fixed under the chassis 14. A reference numeral 16 designates a steel-belt having stiffness and one end of the steel-belt 16 is fixed at an arm member 11a of an arm 11 and another end thereof are fixed at a pulley 17 provided at a motor shaft 15a of the stepping motor 15, respectively. The drum assembly 10 changes its declined angle by a stepping rotation of the stepping motor 15. The declined angle is securely held at a position which is regulated by a stop position of the stepping motor 15.

An under portion of the lower stationary drum 10A comprises a smaller diameter part 10A-1 and a larger diameter part 10A-2. A reference numeral 12 designates a tape guiding member and it has about a half cylindrical shape, i.e., an arcuate shape. An upper edge of the tape guiding member functions as a lead 12a for guiding or regulating a reference edge Te of the magnetic tape T during tape transportation along the drum assembly 10. The tape guide member 12 is disposed around the lower stationary drum 10A and is fixed on the chassis 14 in such a manner as the pair of protruding holders 14a are accommodated within a cutout 12b of the tape guide member 10.

Thus, upon the FF or FB reproducing operation, it is possible to adjust the locus of the rotary magnetic heads Ha, Hb to the locus recorded on the magnetic tape T by inclining the drum assembly 10 in accordance with the transportation speed of the magnetic tape T.

However, in a VTR which employs the method (1) above, the electro-mechanical transducer must be provided in a small space within the rotary drum and, therefore, the electro-mechanical transducer must be small in size and compact in shape. It is difficult to sufficiently displace the rotary magnetic heads with such small electro-mechanical transducer. Further, it is necessary to maintain a head-touch state of the rotary magnetic heads with respect to the magnetic tape acceptably even if the rotary heads can be displaced considerably by the electro-mechanical transducer. However, it is difficult to always maintain such acceptable head-touch by using a small actuator having an acceptable operational characteristics. In addition, with such actuator, due to its limited frequency-amplitude response, capability of noiseless search is practically limited up to ±3 times speed in the SP mode, thus a ±5 times or a ±7 times speed noiseless search can not be realized.

In a VTR which employs the method (2), particularly, disclosed in Japanese Utility Model Publication No. 63-34126, an arc shaped tape lead for guiding the reference edge Te of the magnetic tape T substantially point-contacts with the reference edge Te. Therefore, a portion of the reference edge Te which does not contact with the tape lead becomes very unstable necessarily. Although the normal reproduction is possible when the magnetic tape T is recorded at relatively low recording density, that is, when the width of recorded track is relatively large, it is impossible to sufficiently remove noise-bars in the FF or FB reproduction. This problem becomes more severe when the magnetic tape T is recorded at relatively high density such as in EP mode operation of a VTR of the VHS system, that is, when the recording track width is relatively small.

On the contrary, in a VTR disclosed in Japanese Utility Model Laid-open No. 61-158633, in which the tape guide member 12 for guiding the reference edge Te of the magnetic tape T over a predetermined distance is provided in a fixed portion of the VTR arranged separately from the lower drum, it is possible to remove the positional deviation of the reference edge Te which may be caused in the magnetic recording/reproducing device disclosed in Japanese Utility Model Publication No. 63-34126, during at least the normal reproducing operation.

However, the VTR disclosed in Japanese Utility Model Laid-open No. 61-158633 has a problem as follows:

Since the tape guide member 12 is provided in a fixed portion of the VTR arranged separately from the lower stationary drum 10A and the upper rotary drum 10B and the lower stationary drum 10A are independently arranged on the chassis 14, respectively, it is very difficult to precisely coincide the center axis of the drum assembly 10 with the center axis of the tape guide drum 10.

Specifically, it is essential to maintain a setting accuracy of the tape guide member 12 to the chassis 14, a setting accuracy of the pair of pins 13 to the drum assembly 10 and a machining accuracy of a pair of holes in the protruding holder for pivoting the pins 13, otherwise, a linearity of the locus recorded on the magnetic tape T by the rotary magnetic heads Ha, Hb will not be obtained.

Further, the tape guide member 12 used herewith is usually made of an aluminum or an aluminum alloy, thus the stiffness of the tape guide member 12 is not strong enough to prevent a distortion from occurring in addition to the arcuate shape thereof.

SUMMARY OF THE INVENTION

Accordingly, it is a general object of the present invention to provide an improved magnetic recording/reproducing apparatus in which there is no noise-bar generated when a magnetic tape is reproduced at a speed different from a recording speed or the magnetic tape is reproduced while being fed in a reverse direction to the recording direction.

Another and specific object of the present invention is to provide a magnetic recording/reproducing apparatus in which a recording is made with such a drum of which the lead angle of the lower drum is made to 5°58'9.9" with respect to the reference edge Te of the magnetic tape, so that a recording of frame by frame picture in a unit of field or frame of television signal is performed, and that the pattern of the frame by frame recording satisfies the VHS industry standard, and when such recording is played back continuously at normal speed reproduction, continuously moving pictures such as for computer graphic pictures are obtained.

Still another and specific object of the present invention is to provide a magnetic recording/reproducing apparatus which includes a drum assembly composed of an upper drum and a lower drum having at least a lead portion for guiding a reference edge of a magnetic tape and a slide-contact surface portion adapted to be in slide-contact with the magnetic tape wound on a portion of a peripheral surface of the drum assembly in slanted state and recording a signal in slanted tracks on the magnetic tape and reproduces the signal therefrom by rotary magnetic heads provided on the peripheral surface of the drum assembly, the magnetic recording/reproducing apparatus comprises a pivot point provided on a straight line contained in a locus plane or in the vicinity of the locus plane of the magnetic heads and orthogonal to a center axis of the lower drum and locus plane tilting device for tilting the locus plane of the rotary magnetic heads about the straight line by a predetermined angle.

Other objects and further features of the present invention will be apparent from the following detailed description with respect to preferred embodiments of the invention when read in conjunction with the accompanying drawings.

BRIEF DESCRIPTION OF THE DRAWINGS

FIGS. 5(a) and 5(b) illustrate other tape track patterns;

DETAILED DESCRIPTION OF THE PREFERRED EMBODIMENTS

First to fourth embodiments of the present invention will be described with reference to the drawings.

First Embodiment

Figure 1:
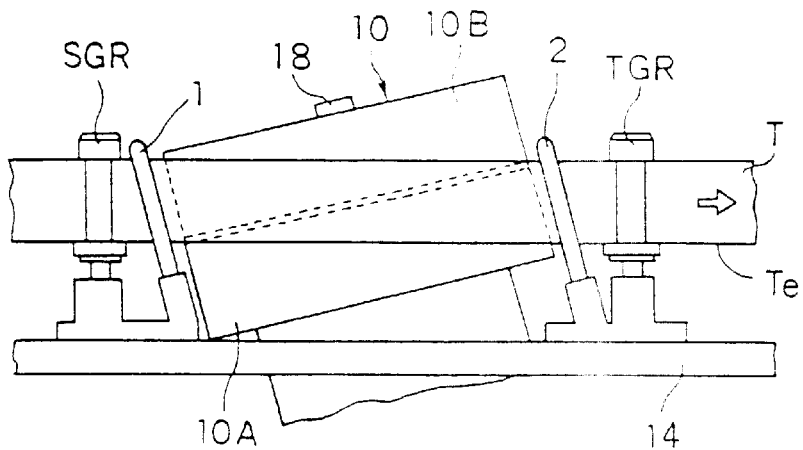
FIG. 1 is a front view of the conventional VTR, showing a magnetic tape running system in the vicinity of a tape guide drum.
Figure 2:
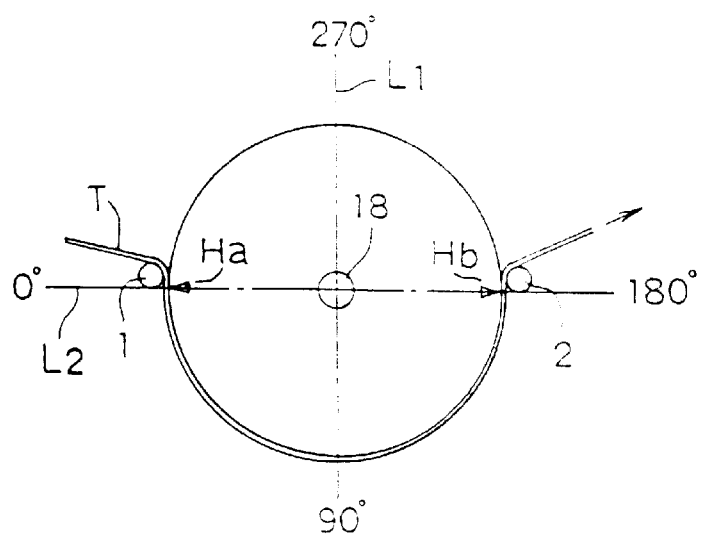
FIG. 2 is a plan view of the VTR in FIG. 1 when looked from a direction of a drum shaft.
Figure 8:
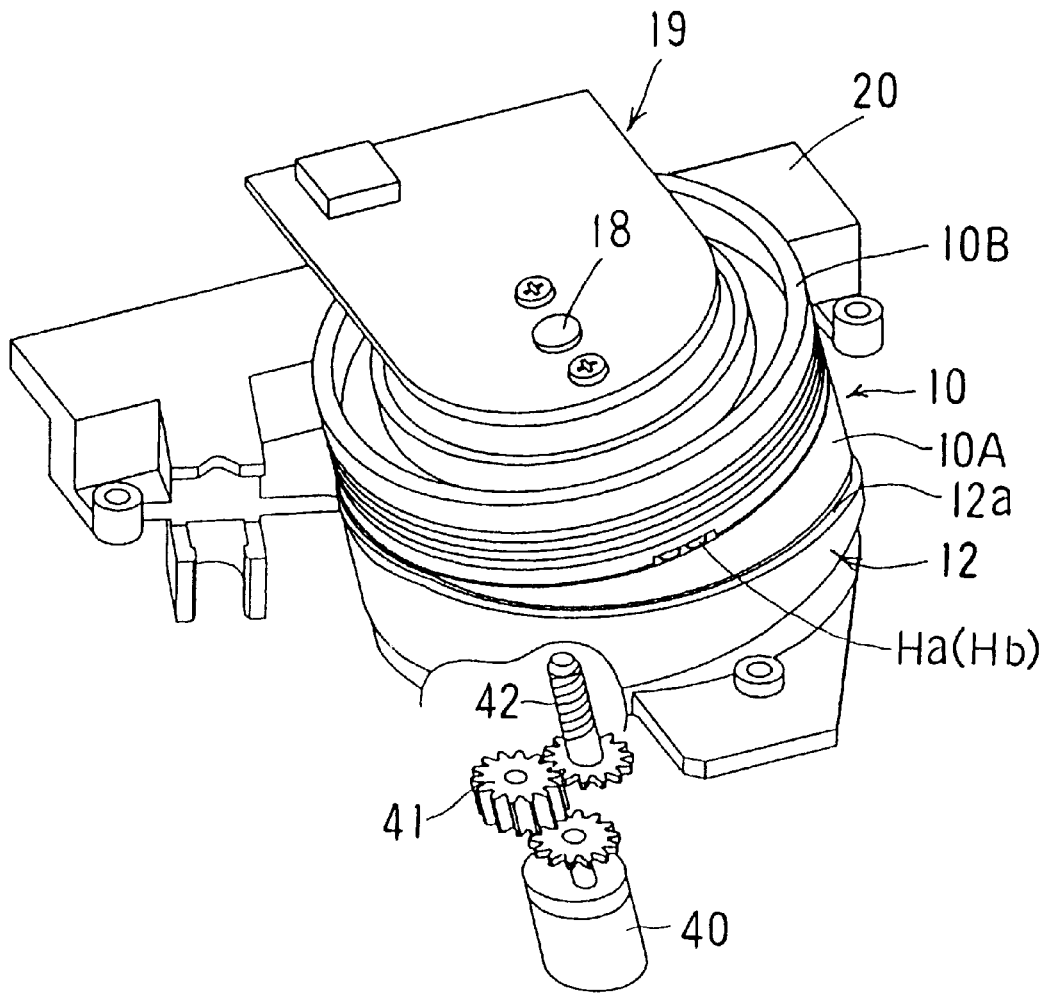
FIG. 8 is a perspective view showing a construction of a tape guide drum assembly and associated components of a first embodiment of the present invention.
Figure 9:
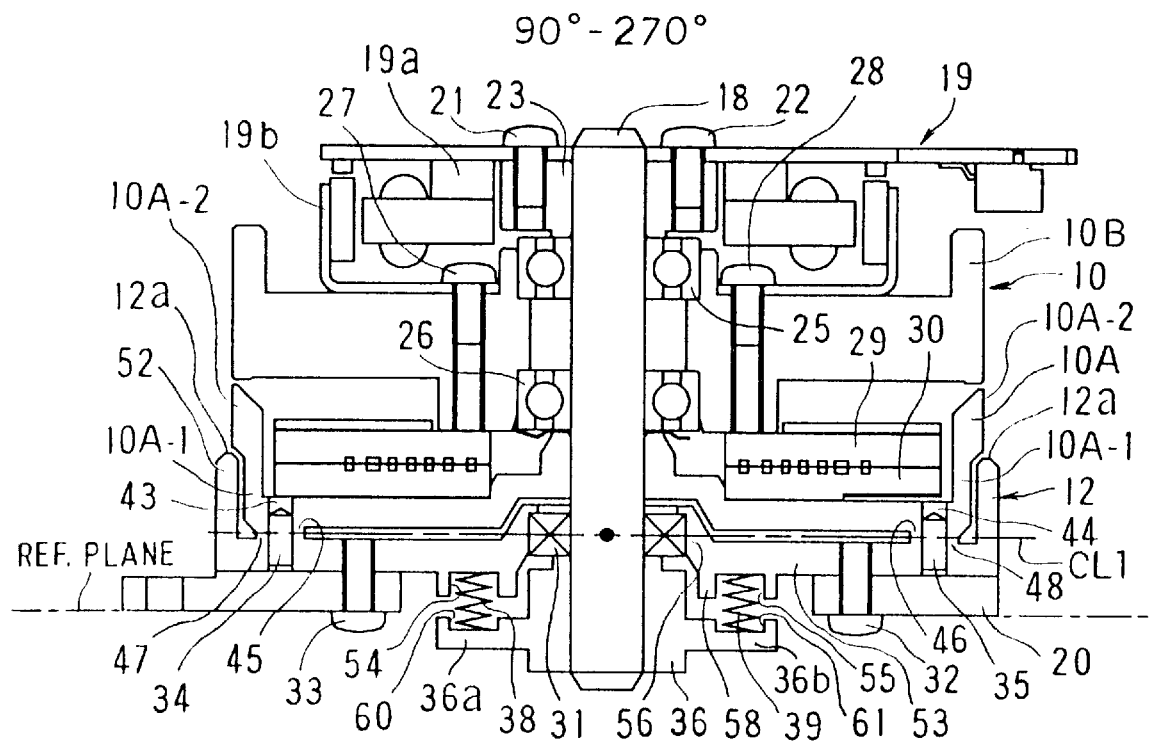
FIGS. 9(a) and 9(b) indicate cross sections of the tape guide drum and associated components of the first embodiment of the present invention in the normal reproducing mode.
Figure 9:
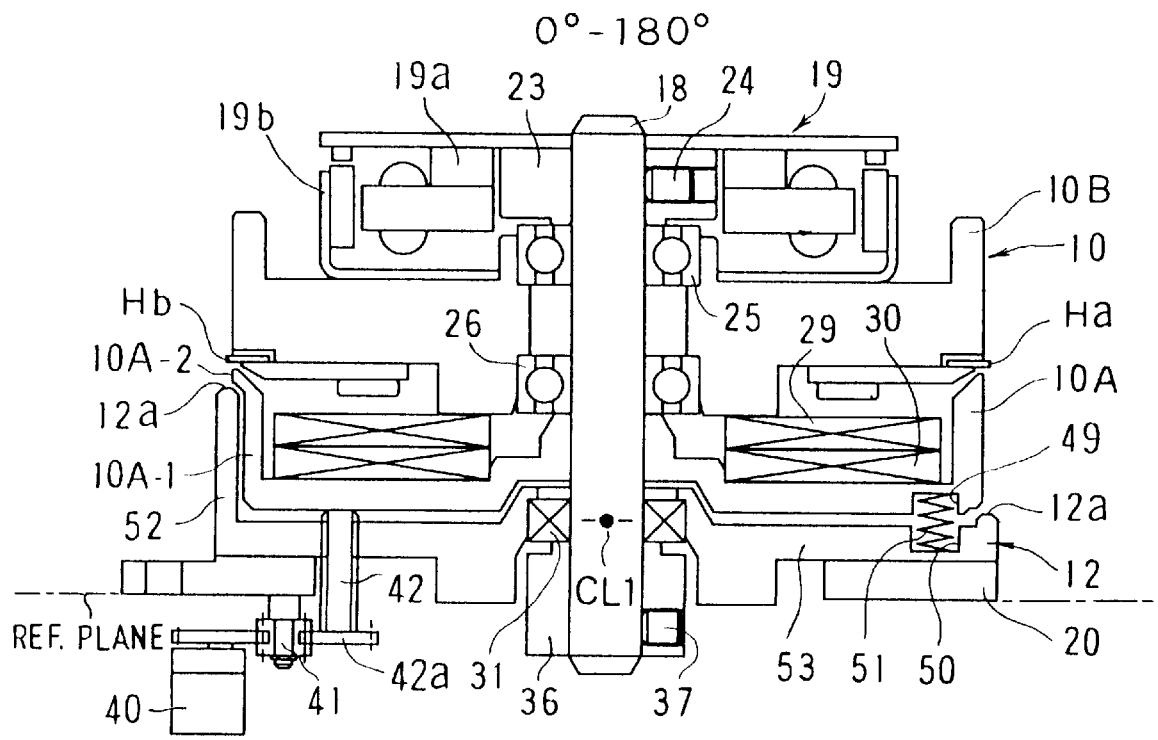
Figure 10:
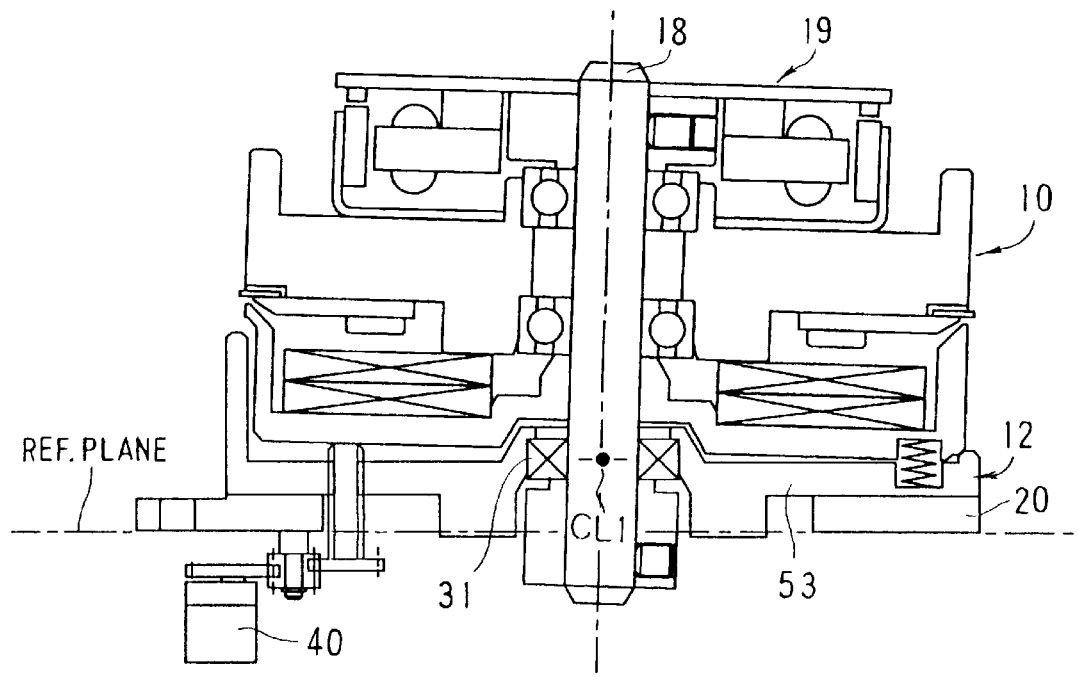
FIGS. 10(a) and 10(b) are cross sections of the tape guide drum and associated components of the first embodiment of the present invention in the trick play mode.
Figure 10:
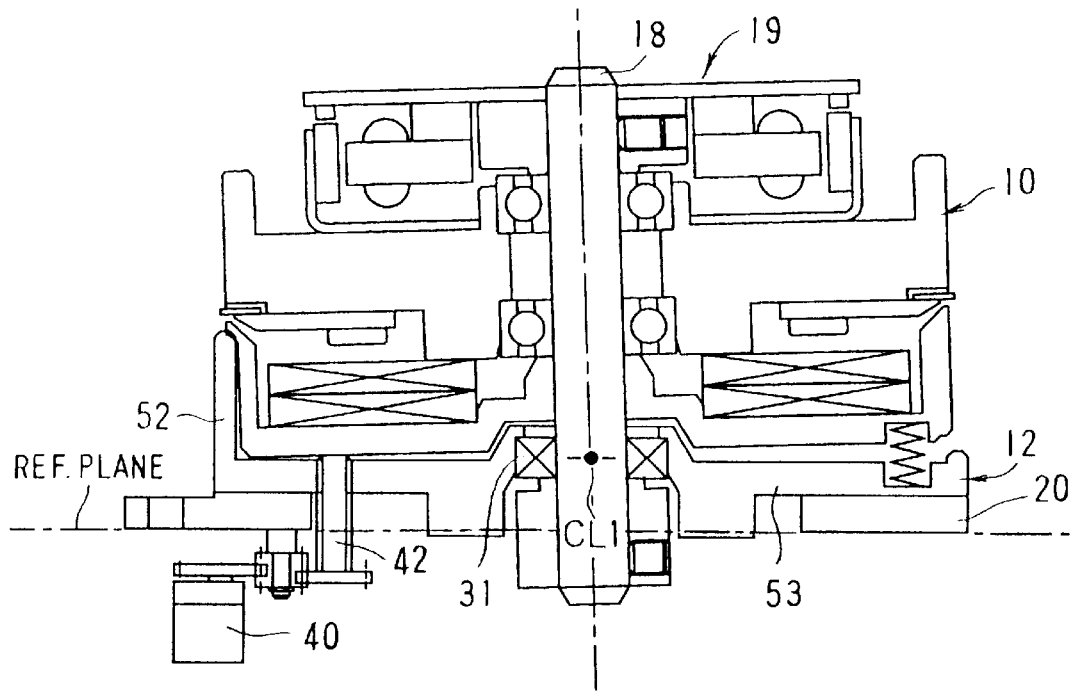
Figure 11:
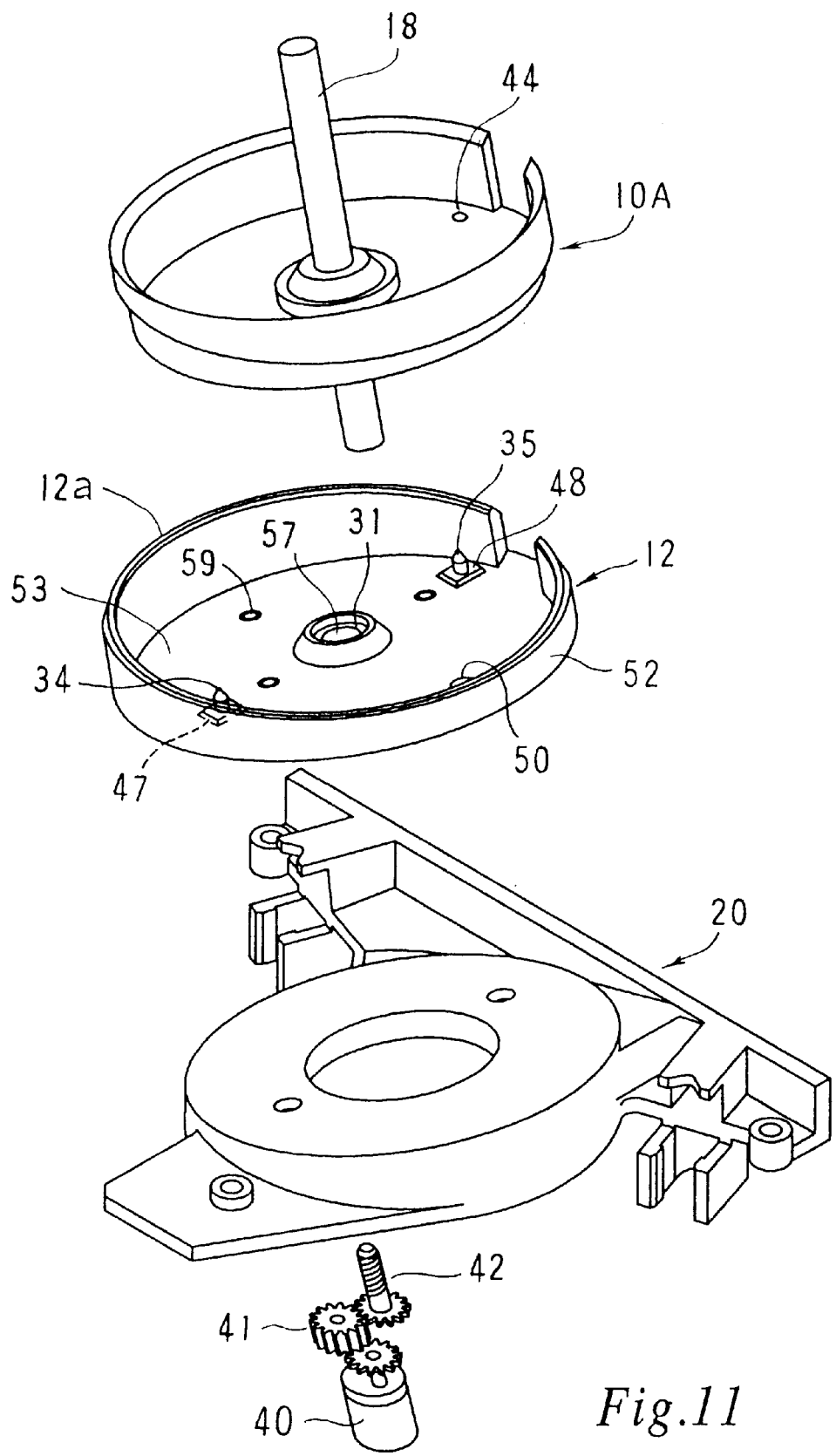
FIG. 11 is a disassembled perspective view of a lower stationary drum, a lead member and a drum base supporting them of the first embodiment.
Figure 12:
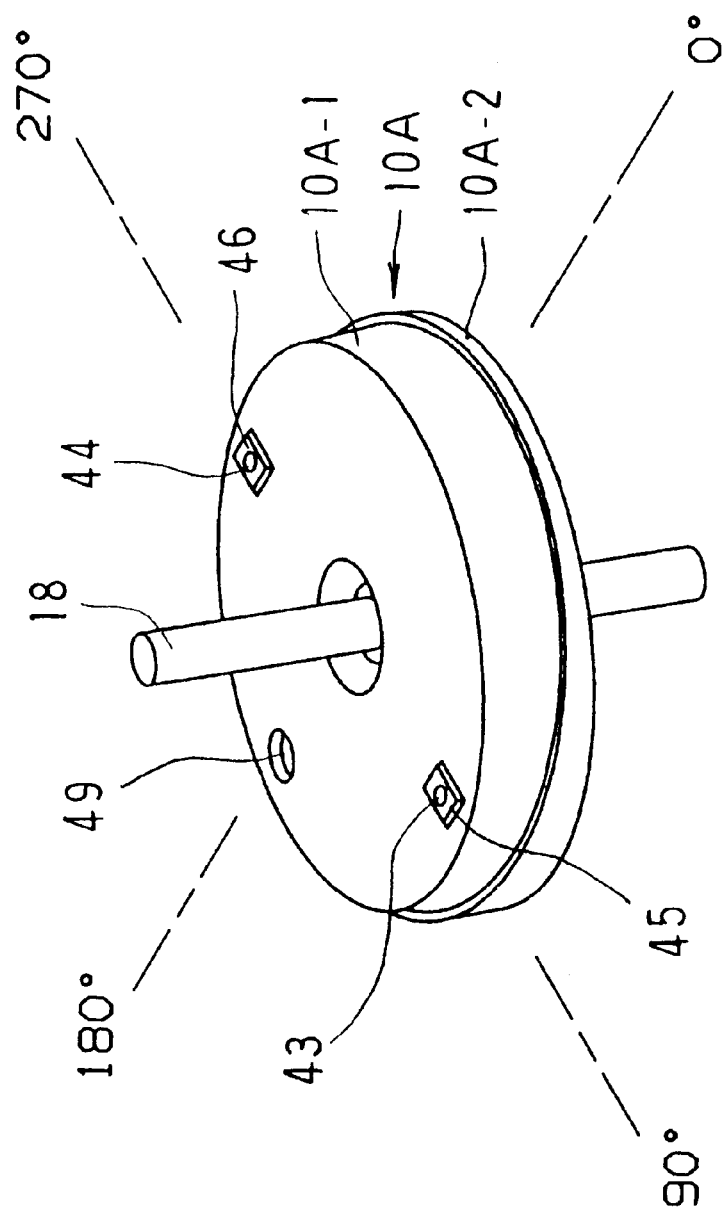
FIG. 12 is a perspective view of the lower stationary drum of the first embodiment when looked from in an opposite direction to that in FIG. 11.
Figure 13:
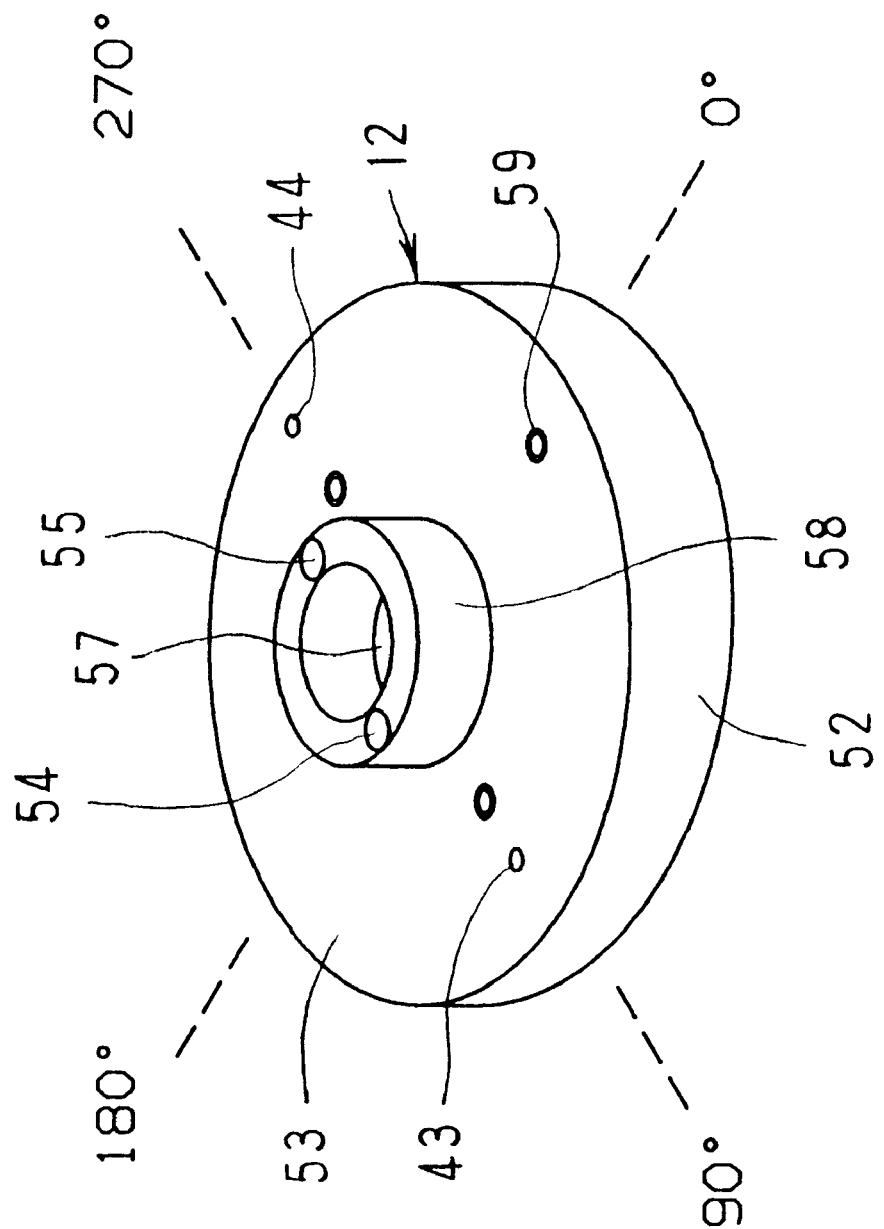
FIG. 13 is a perspective view of the lead member of the first embodiment when looked from in an opposite direction to that in FIG. 11.
Figure 14:
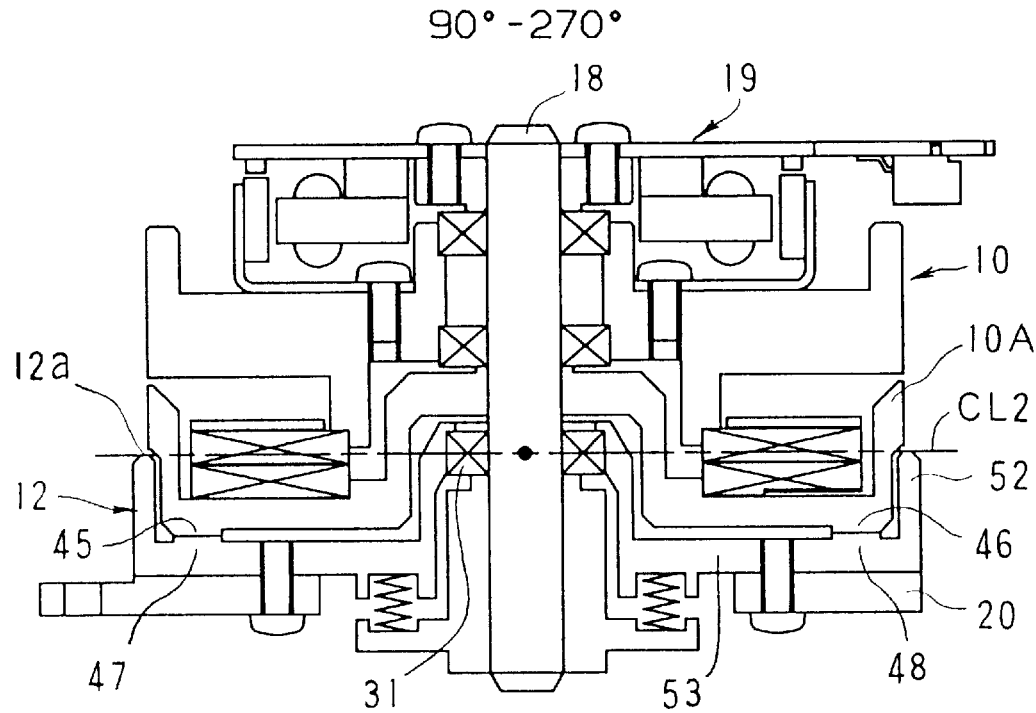
FIGS. 14(a) and 14(b) are cross sections of the tape guide drum and associated components of a first modification of the first embodiment of the present invention in the normal reproducing mode.
Figure 14:
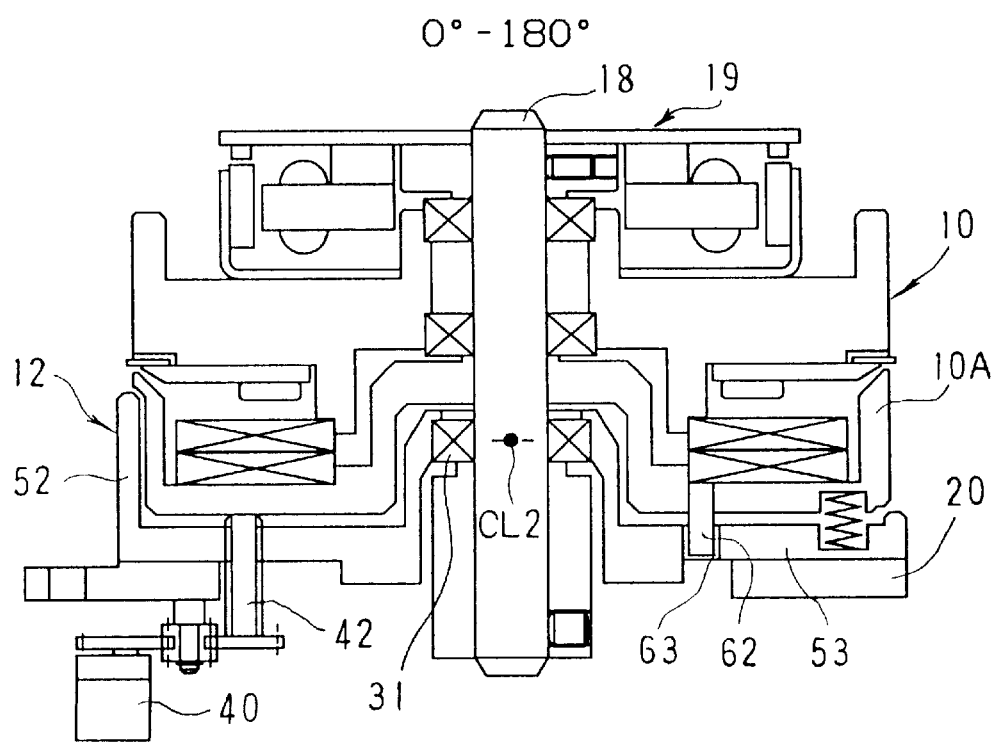
Figure 15:
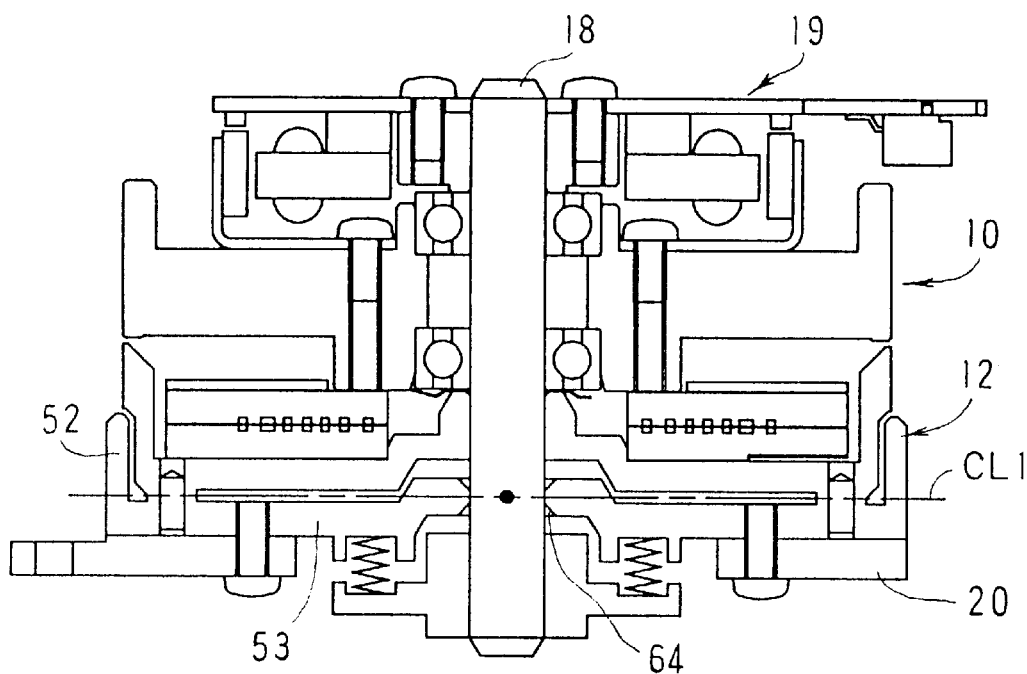
FIGS. 15(a) and 15(b) are cross sections of the tape guide drum and associated components of a second modification of the first embodiment of the present invention in the normal reproducing mode.
Figure 15:
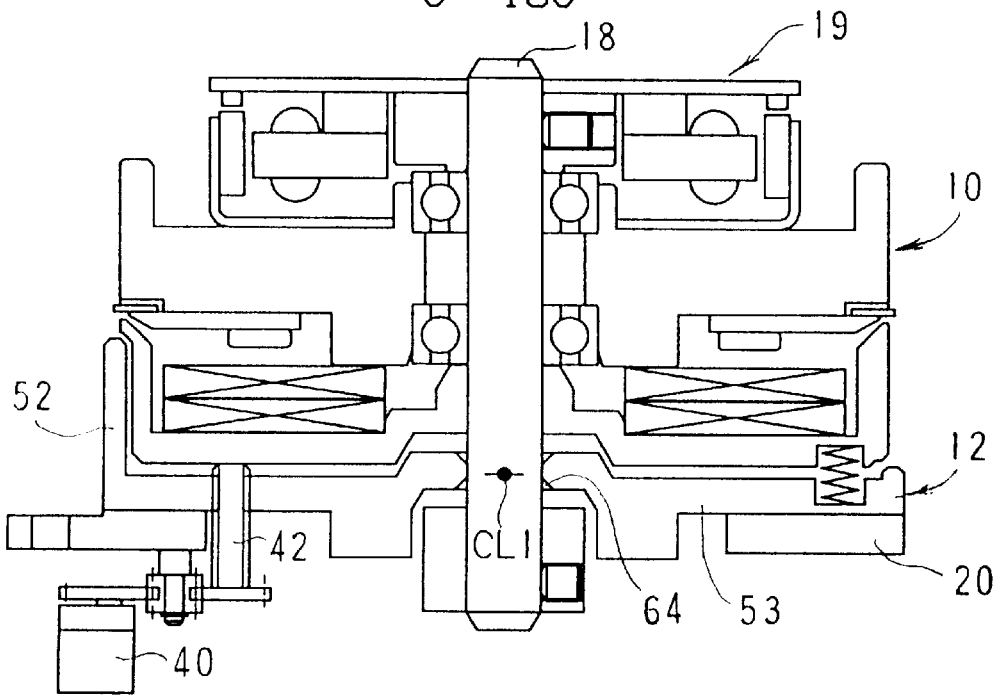

The first embodiment of the present invention will be described first with reference to FIGS. 8 through 13. FIG. 8 is a perspective view of a construction of the magnetic recording and reproducing apparatus according to the present invention including a tape guide drum assembly which is a main portion of the apparatus. FIGS. 9(a) and 9(b) are cross sections showing a construction of the apparatus including mainly a tape guide drum assembly 10 in a normal reproducing state, in which FIG. 9 (a) is a cross section taken along a straight line L1 in FIG. 2, and FIG. 9(b) is a cross section taken along a straight line L2 in FIG. 2. FIGS. 10(a) and 10(b) are cross sections of the construction of the apparatus taken along the straight line L2 in FIG. 2, including mainly a tape guide drum 10 in the FF reproducing state and the FB reproducing state, respectively. FIG. 11 is a disassembled, perspective view showing a lower stationary drum 10A of the tape guide drum 10, a tape guide member (referred to as "lead member" hereinafter) 12 and a drum base 20 for supporting them. FIGS. 12 and 13 are perspective views of the lower stationary drum 10A and the lead member 12 when looked in an opposite direction to that in FIG. 11, respectively.

This embodiment is constructed with the drum base 20 fixed to a chassis (not shown) of the apparatus, the lead member 12 fixed to the drum base 20 by means of screws 32 and 33, a tape guide drum 10 and a drum motor 19 which are mounted on the lead member 12 by means of fulcrum pins 34 and 35 and a motor 40 which is a driving source for tilting the tape guide drum 10 with respect to the lead member 12.

A top surface of the chassis above is regarded as a reference plane for various components described in this specification, which are inclined with respect to the chassis.

In an outer peripheral surface of the lower stationary drum 10A, a portion 10A-2 which provides a sliding contact guide surface for a magnetic tape and a portion 10A-1 having a smaller diameter than that of the portion 10A-2 are formed. The lower stationary drum 10A has protruding abutment faces 45 and 46 on a base thereof and through-holes 43 and 44 each defined on the protruding abutment faces 45 and 46 in a direction of 90 degrees and in a direction of 270 degrees, and has a spring retaining hole 49 in a direction of 180 degrees.

It is preferable to machine the large diameter portion 10A-2 with which the magnetic tape contacts slidingly and the protruding abutment faces 45 and 46 on the basis of a drum shaft 18 press-fitted in the lower stationary drum 10A. This is because it is easy to keep the large diameter portion 10A-2 coaxially with the drum shaft 18 and keep heights of the abutment faces 45 and 46 same.

The lead member 12 has an annular portion 52 and a bottom portion 53 as shown in FIG. 11 or FIG. 13 and one edge portion of the annular portion 52 constitutes a lead 12a for guiding a reference edge Te of a magnetic tape T. In the bottom surface portion 53 of the lead member 12, there are provided a protruding abutment face 47 and a fulcrum pin 34 in a 90 degree direction, a protruding abutment face 48 and a fulcrum pin 35 in a 270 degree direction, a threaded hole 59 to be screwed with a gear screw 42 to be described later in a 0 degree direction and a spring retaining hole 50 in a 180 degree direction.

A diameter of each of the fulcrum pins 34 and 35 is slightly smaller than a diameter of the holes 43 and 44 of the lower stationary drum 10A as such that the fulcrum pins 34 and 35 are loosely fitted in the respective holes 43 and 44 to allow the lower stationary drum 10A and an upper rotary drum 10B which are supported by the drum shaft 18 to slightly rotate about a straight line CL1 connecting the fulcrum pins 34 and 35. Therefore, in order to precisely regulate a tilting position of the lower stationary drum 10A with respect to a center axis (see FIG. 10) of the lead member 12 with a fitting clearance necessary for the fulcrum pins 34 and 35 with respect to the respective holes 43 and 44, it is preferable to separate each other the fulcrum pins 34 and 35 or the holes 43 and 44 as far as possible and provide them in the outer peripheral portion of the lead member 12 or the lower stationary drum 10A.

Further, an annular collar portion 58 surrounding a through-hole 57 formed along a center of the bottom surface portion 53 is formed on a rear surface of the bottom surface portion 53 of the lead member 12 and spring retaining holes 54 and 55 are formed in the 90 and 270 degrees directions on an end face of the annular collar portion 58, respectively.

A bearing retaining portion 56 is formed around the through-hole 57, in which a ball bearing 31 is fitted with a height of the bearing being flush with the protruding abutment faces 47 and 48.

The ball bearing 31 may be one such as single deep groove ball bearing which allows a center axis of an outer ring to relatively incline with respect to that of an inner ring. It is preferable to machine the lead 12a, the protruding abutment faces 47 and 48 and the bearing retaining portion 56 at a time in view of achieving desired coaxial accuracy, configuration and dimensional accuracies of the respective portions.

The drum shaft 18 is press-fitted to the lower stationary drum 10A and rotatably supports the upper rotary drum 10B with a rotary transformer 29 by means of ball bearings 25 and 26. A rotor 19b of a drum motor 19 is fixed to the upper rotary drum 10B on which magnetic heads Ha and Hb are mounted, by screws 27 and 28 such that it can rotate with respect to a stator 19a of the drum motor 19. The stator 19a is fixed to a collar 23 by screws 21 and 22. The collar 23 is fixed to the drum shaft 18 by a set screw 24 and the ball bearings 25 and 26 are axially and inwardly preloaded by being interposed between the collar 23 and the lower stationary drum 10A.

On the other hand, a lower portion of the drum shaft 18 is fitted in the inner ring of the ball bearing 31 and a lower end portion thereof is fixed to a collar 36 by a set screw 37 causing a preloading pressure to the ball bearing 31. Arm portions 36a and 36b are provided on the collar 36 in the 90 and 270 degrees directions, respectively, and the arm portions 36a and 36b are formed with spring retaining holes 60 and 61, respectively. In spaces defined between the spring retaining holes 54 and 60 of the lead member 12 and the collar 36 and between the spring retaining holes 55 and 61 of the lead member 12 and the collar 36, springs 38 and 39 are provided, respectively. The springs 38 and 39 bias the lower stationary drum 10A downwardly through the drum shaft 18 to urge the protruding abutment faces 45 and 46 of the lower stationary drum 10A to the respective abutment faces 47 and 48 of the lead member 12.

Further, a spring 51 is provided in a space defined between the spring retaining hole 49 of the lower stationary drum 10A and the spring retaining hole 50 of the lead member 12, which biases the lower stationary drum 10A and the upper rotary drum 10B supported by the drum shaft 18 to rotate in counter clockwise direction in FIG. 9(b) about the straight line CL1. The gear screw 42 having one end formed with a gear 42a is screwed to a screw hole 59 formed in the lead member 12 on an opposite side thereof to the spring 51, that is, formed in a 0 degree direction such that the gear screw 42 is driven vertically in FIG. 9(b) by the motor 40 through an intermediate gear 41. That is, when the gear screw 42 is driven upwardly in FIG. 9(b) by the motor 40 through the drive circuit thereof which is not shown, the tape guide drum 10 and the drum motor 19, etc., constructed as a unit through the drum shaft 18 are tilted clockwise direction about the straight line CL1 against the spring 51 to bring the apparatus in to an FF reproducing mode (see FIG. 10(a)). On the contrary, when the gear screw 42 is retracted downwardly in FIG. 9(b), the tape guide drum 10 and the drum motor 19, etc., constructed as a unit through the drum shaft 18 are tilted counterclockwise direction about the straight line CL1 by the biasing force of the spring 51 and the apparatus is brought to an FB reproducing mode (see FIG. 10(b)).

It should be noted that a degree of the tilt angle of the tape guide drum 10 and the drum motor 19, etc., constructed as a unit through the drum shaft 18, depends upon the running speed of the magnetic tape T in the FF or FB reproducing mode primarily and it is suitably determined by changing an amount of protrusion of the gear screw 42.

Figure 3:
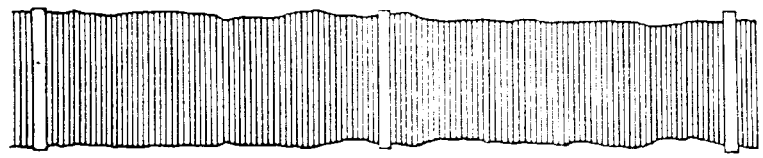
FIGS. 3(a) and 3(b) show FM reproduced signal envelope waveforms.
Figure 3:
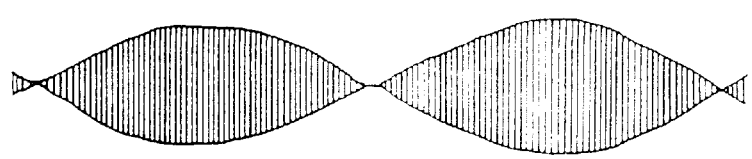
Figure 4:
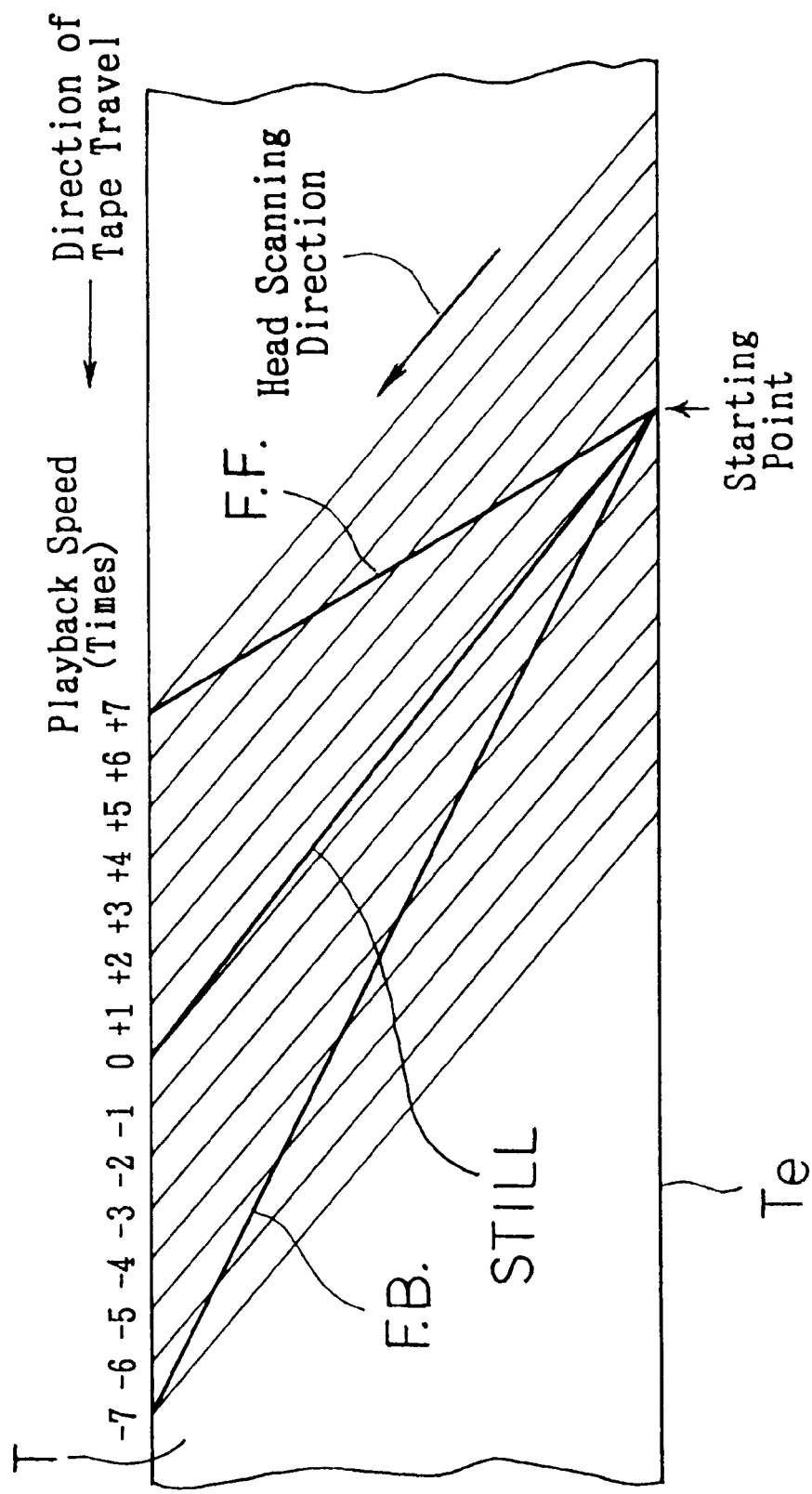
FIG. 4 illustrates a tape track pattern.
Figures 6, 7:
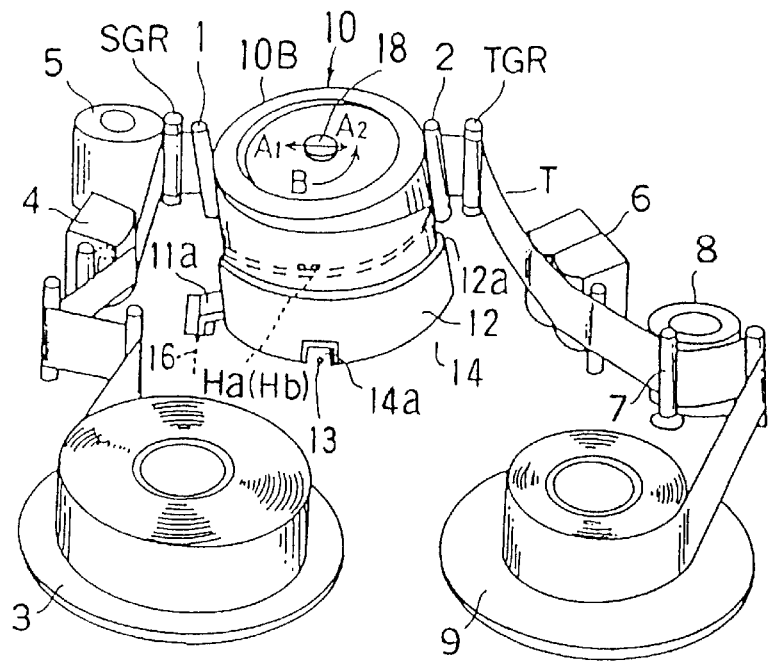
FIG. 6 is a perspective view showing a whole construction of a conventional magnetic recording and reproducing apparatus.
FIG. 7 is a front view of the conventional magnetic recording and reproducing apparatus shown in FIG. 6, showing a magnetic tape running system in the vicinity of a tape guide drum.
Figure 36:
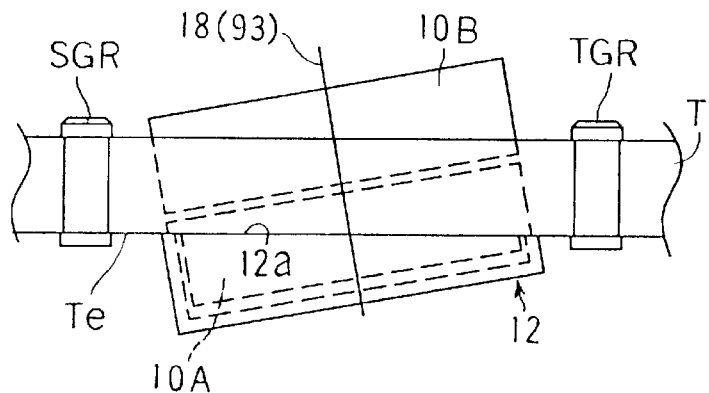
FIGS. 36(a) through 36(d) show a relation between the track compensation and the lead compensation in the second or third embodiment.
Figure 36:
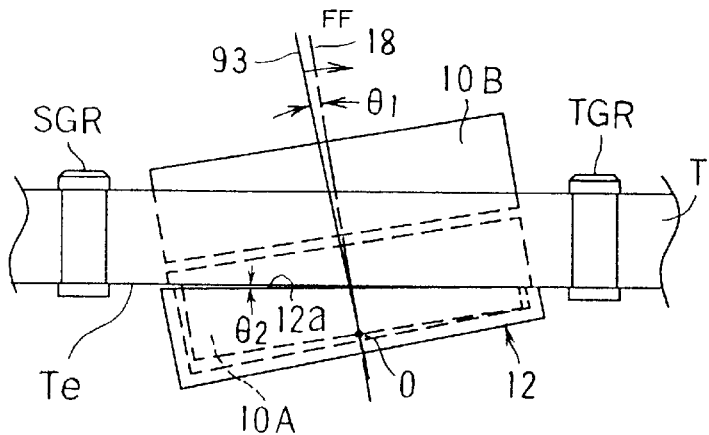
Figure 36:
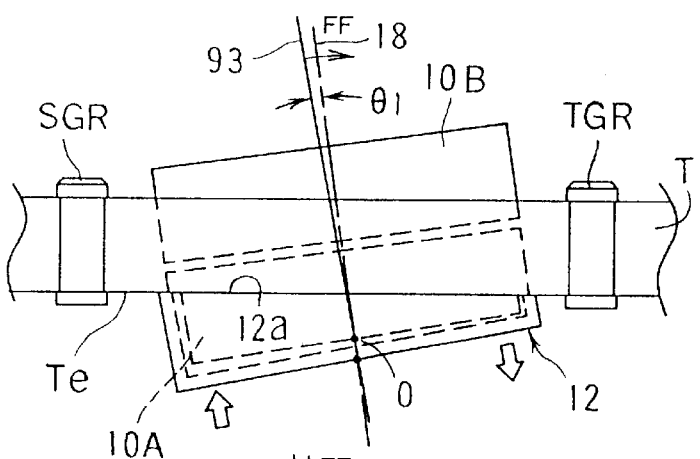
Figure 36:
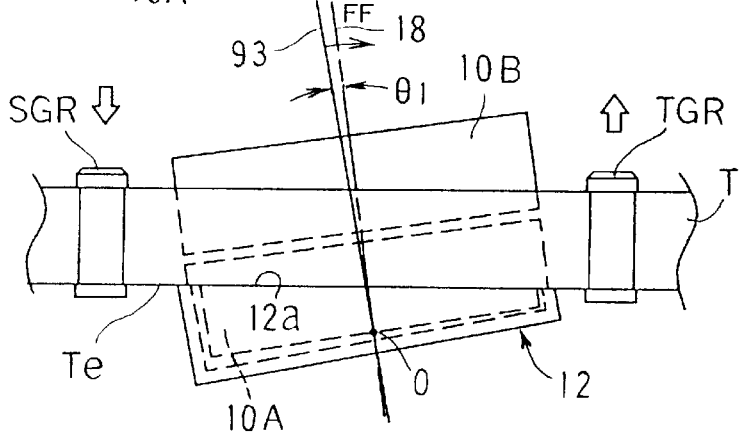

As described in the foregoing, according to this embodiment, the drum shaft 18 which supports the tape guide drum 10, etc., is supported by the ball bearing 31 provided in the bearing retaining portion 56 formed in the bottom surface portion 53 of the lead member 12. Therefore, it is possible to keep the coaxial accuracy of the center axis (see FIGS. 36(c) and 37(c)) of the lead member 12 and the drum shaft 18 quite precisely in the normal reproducing mode or the recording mode of operation and, even in the trick play mode such as the FF or FB reproducing mode, the straight line CL1 which is a center axis of the tilt of the drum shaft 18 is maintained in a constant position and thus the rotary loci of the magnetic heads Ha and Hb formed on the magnetic tape T exhibits good linearity. Accordingly, an envelope of an FM signal reproduced in such a trick play mode becomes uniform in every vertical scanning period as shown in FIG. 3(a) and thus it is possible to obtain a good reproduced image without presenting a noise bar.

Further, since the lead member 12 of this embodiment which is constituted with the annular portion 52 and the bottom surface portion 53 has a substantial cup shape, its stiffness is high, thus no deformation upon machining such as the lead 12a will develop.

Additionally in this embodiment, since the center of the ball bearing 31 provided in the lead member 12 is arranged flush with the protruding abutment faces 47 and 48, there is no slide friction presented between the abutment face 45 of the lower stationary drum 10A and the abutment face 47 and between the abutment face 46 of the lower stationary drum 10A and the abutment face 48 during the rotary motion of the tape guide drum 10, there is an advantage that friction hardly presents these abutment faces.

Now, a first to third modifications of the first embodiment will be described with reference to FIGS. 14 to 18 while comparing them with the first embodiment.

First Modification

FIGS. 14(a) and 14(b) are cross sections of the first modification taken along the respective straight lines L1 and L2 in FIG. 2, which correspond to FIGS. 9(a) and 9(b) and show the tape guide drum 10 and peripheral components associated therewith in the normal reproducing mode.

Comparing with the first embodiment in which the ball bearing 31 is flush with the abutment faces 47 and 48 of the lead member 12, the first modification differs from the first embodiment in that the ball bearing 31 is located higher than the abutment faces 47 and 48 and in a level of the straight line CL2 which is flush with the lead 12a of the lead member 12 in the 90 degrees direction. Further, although in the first embodiment, the tilting direction of the lower stationary drum 10A with respect to the center axis (see FIG. 36(b)) of the lead member 12 is positioned and the tilting direction of the tape guide drum 10, etc., with respect to the lead member 12 is regulated by the fulcrum pins 34 and 35 implanted on the respective abutment faces 47 and 48 of the lead member 12 and loosely filled in the respective holes 43 and 44 of the lower stationary drum 10A, the same effect is obtained in the first modification by not the fulcrum pins 34 and 35 and the holes 43 and 44 but a loose fitting of a round pin 62 implanted in the bottom surface of the lower stationary drum 10A in a slot 63 formed in the bottom surface portion 53 of the lead member 12.

That is, the round pin 62 fits in the slot 63 with a relatively large clearance in a 0–180 degrees direction and, with this clearance, the tape guide drum 10, etc., can be rotated (tilted) around the straight line CL2. On the other hand, although not shown, the clearance is sufficiently small in a direction perpendicular to the 0–180 degrees direction, that is, a 90–270 degrees direction, with which the tilting direction of the lower stationary drum 10A with respect to the center axis 93 of the lead member 12 is positioned and the tilting direction of the tape guide drum 10, etc., with respect to the lead member 12 is regulated.

In the first modification, an axis of rotation of the tape guide drum 10A, etc., is the straight line CL2 and is flush with the lead 12a of the lead member 12 in the 90 degrees direction (the center of the area of the tape guide drum 10 on which the magnetic tape T is wound). Therefore, it is possible to restrict a swing motion of the tape guide drum 10 with respect to the lead member 12 to a relatively small when the tape guide drum 10, etc., is tilted.

Second Modification

FIGS 15(a) and 15(b) correspond to FIGS. 9(a) and 9(b), and are cross sections of the second modification taken along the respective straight lines L1 and L2 in FIG. 2, showing the tape guide drum 10 and the associated members in the normal reproducing mode.

Comparing with the first embodiment in which the drum shaft 18 is allowed to tilt by being supported by the ball bearing 31 such as single deep groove ball bearing which allows a center axis of an outer ring to relatively incline with respect to that of an inner ring, the second modification differs from the first embodiment in that the drum shaft 18 is allowed to tilt by being supported by not the ball bearing 31 but a hole having knife edge shaped cross section.

That is, in the second modification, the hole 64 having a knife edge shaped cross section is formed at a center of the bottom surface portion 53 of the lead member 12 and the drum shaft 18 is supported to tilt by a direct fitting of the drum shaft 18 in the hole 64.

According to the second modification, there is no need of using the ball bearing 31, and the drum shaft 18 which supports the tape guide drum 10, etc. integrally, is directly supported at the hole 64 formed in the bottom surface portion 53 of the lead member 12. Therefore, it is possible to maintain the coaxial accuracy of the center axis 93 of the lead member 12 and the drum shaft 18 precisely and, in the trick play such as in the FF or FB reproducing mode, the straight line CL1 which is the center axis of the swing motion of the drum shaft 18 is kept in a constant position, so that the loci of the magnetic heads Ha and Hb on the magnetic tape T exhibit a good linearity.

In the second modification, it may be possible to obtain this fitting by downwardly protruding the fitting portion 65 of the lower stationary drum to which the drum shaft 18 is press-fitted and fitting the fitting portion 65 in the hole 64 as shown in FIGS. 16(a) and 16(b). Further as shown in FIG. 16(c), it is possible, in order to prevent the fitting region between the hole 64 and the fitting portion 65 from being worn, to provide a bushing 66 of a hard material on an outer peripheral surface of the fitting portion 65. FIGS. 16(a) and 16(b) correspond to FIGS. 9(a) and 9(b) and are cross sections taken along the respective straight lines L1 and L2 in FIG. 2, showing the tape guide drum 10 and the associated members in the normal reproducing mode. Further, FIG. 16(c) is a partial cross section of another construction of the portion encircled in FIG. 16(a), showing the busing 66 on the fitting portion 65.

Third Modification

Figure 18:
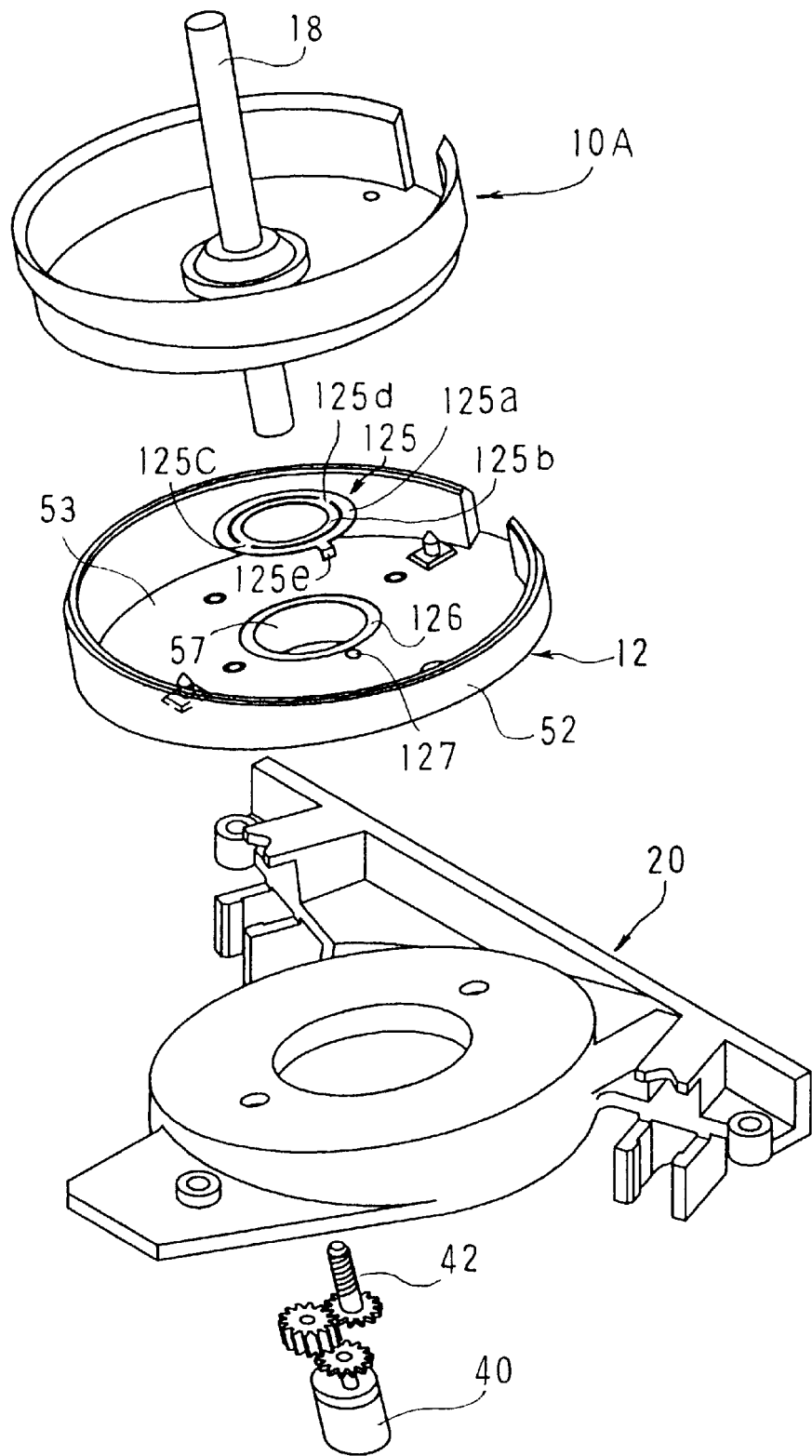
FIG. 18 is a disassembled perspective view of the lower stationary drum, the lead member and the drum base supporting them of the third modification of the first embodiment of the present invention.

FIGS. 17(a) and 17(b) are cross sections corresponding to FIG. 9(a) and 9(b), taken along the straight lines L1 and L2 in FIG. 2, showing the tape guide drum 10 and peripheral components associated therewith in the normal reproducing mode, and FIG. 17(c) is a plan view of a suspension used instead of the ball bearing 31 in the first embodiment. FIG. 18 is a disassembled perspective view of the lower stationary drum 10A of the tape guide drum 10, the lead member 12 and the base 20 supporting them.

Comparing with the first embodiment in which the drum shaft 18 is supported to tilt by the ball bearing 31 such as single deep groove ball bearing which allows a center axis of an outer ring to relatively incline with respect to that of an inner ring, the third modification differs from the first embodiment in that the drum shaft 18 is supported to tilt by not the ball bearing 31 but a suspension diaphragm (flexible diaphragm) 125 as shown in FIG. 17(c) or in FIG. 18.

The suspension diaphragm 125 takes in the form of a leaf spring of a resilient material such as stainless steel or phosphor bronze and includes an outer ring portion 125a, an inner ring portion 125b, connecting portions 125c and 125d which connect the outer ring portion 125a to the inner ring portion 125b at positions of 90 and 270 degrees as shown and an engaging protrusion 125e.

The engaging protrusion 125e is adapted to be fitted in an engaging hole 127 formed in an edge of a through-hole 57 in the bottom surface portion 53 of the lead member 12 to position it in a circular direction. The outer ring portion 125a of the suspension diaphragm 125 is fitted in an annular recess portion 126 formed around the through-hole 57 so that the lead member 12, the outer ring portion 125a and the inner ring portion 125b are kept coaxially. Further, the reduced diameter portion 65a of the fitting portion 65 of the lower stationary drum 10A to which the drum shaft 18 is press-fitted is fitted in the inner ring portion 125b of the suspension diaphragm 125.

Therefore, the lower stationary drum 10A and the lead member 12 are coaxially connected through the suspension diaphragm 125 and the tape guide drum 10 is able to tilt with respect to the lead member 12 due to flexibility of the connecting portions 125c and 125d.

As described, in the third modification, the drum shaft 18 is positioned by the suspension diaphragm 125 and the tape guide drum 10 is tilted around the straight line CL1 extending through the fulcrum pins 34 and 35 with the connecting portions 125c and 125d being flexed. Therefore, there is no sliding portion between the drum shaft 18 or its fitting portion 65 and the through-hole 57 of the lead member 12 and hence there is no abrasion, etc., therebetween.

The suspension diaphragm 125 may be directly screwed to the lead member 12 or the lower stationary drum 10A.

According to experiments conducted by the present inventors by applying the first embodiment and the modifications thereof to a VTR of VHS system, it has been confirmed that, by tilting the upper rotary drum 10B on which the magnetic heads are mounted and the lower stationary drum 10A as a single unit with respect to the lead member 12 (the compensation by changing a relative angle of the rotary loci of the magnetic heads Ha and Hb and the lead 12a of the lead member 12 according to a running speed of the magnetic tape T in order to adapt the rotary loci of the magnetic heads Ha and Hb with respect to the lead 12a of the lead member 12 will be sometime referred to as "track compensation"), a trick play in which the magnetic tape T runs at a relatively high multiple speed is possible in the SP mode.

However, in the EP mode, it has been found that there may be noise bars appeared in a reproduced image even in a trick play mode in which the magnetic tape T runs at a low multiple speed.

In order to clarify the reason for this phenomenon, the present inventors have observed the running state of the magnetic tape T around the tape guide drum 10 by using an endoscope camera, etc., and have found that the magnetic tape T is slightly separated from the lead 12a or is pressed to the lead 12a with the rotation of the tape guide drum 10 during the FF reproducing or FB reproducing operation. This phenomenon will be described with reference to FIGS. 36(a) through 37(d).

FIG. 36(a) shows a running state of the magnetic tape T during the normal reproducing mode. In this state, the drum shaft 18 and the center axis 93 of the lead member 12 are common each other and the reference edge Te of the magnetic tape T runs along the lead 12a of the lead member 12. Therefore, there is no abnormal movement of the magnetic tape T with respect to the lead 12a.

However, in a running state of the magnetic tape T during the FF reproducing mode shown in FIG. 36(b), the drum shaft 18 is tilted in clockwise direction around a center point 0 with respect to the center axis 93 of the lead member 12 as shown by a chain line toward an arrow indicated direction. Therefore, the magnetic tape T is attracted by the tape guide drum 10 at the tape inlet portion of the tape guide drum 10 (on the side of the guide roller SGR on the supply side) and the reference edge Te of the magnetic tape T tends to be separated from the lead 12a of the lead member 12. On the other hand, there is a tendency that the magnetic tape T is pressed to the lead 12a of the lead member 12 by the tape guide drum 10 at the tape exit portion of the tape guide drum 10 (on the side of the guide roller TGR on the take-up side). As a result, the magnetic tape T inclines with respect to the lead 12a of the lead member 12 by a slight angle ($\theta_2$).

Due to this fact, the magnetic heads Ha and Hb can not trace the track pattern of the magnetic tape T precisely even when the track compensation is performed by rotating the tape guide drum 10 with respect to the lead member 12 by an angle ($\theta_1$) corresponding to the FF reproducing operation at a predetermined speed.

In order to solve this problem, there may be two methods shown in FIGS. 36(c) and 36(d). In the first method shown in FIG. 36(c), the lead 12a of the lead member 12 is abutted on to the reference edge Te of the magnetic tape T by tilting the tape guide drum 10 and the lead member 12 in a clockwise direction as a single unit while keeping the relative angle ($\theta_1$) between the tape guide drum 10 and the lead member 12 constant.

In the second method shown in FIG. 36(d), the supply side guide roller SGR and the take-up side guide roller TGR are constructed such that they are made movable in the width direction of the magnetic tape T. In the FF reproducing mode, the running path of the magnetic tape T is corrected such that the path changes to extend along the lead 12a of the lead member 12 by displacing the supply side guide roller downwardly and the take-up side guide roller TGR upwardly as shown by the arrows in FIG. 36(d) during the FF reproducing mode. This compensation for removing the disagreement between the reference edge Te of the magnetic tape T and the lead 12a of the lead member 12 which is caused by the track compensation will be referred to as "lead compensation". Since this tendency in the FF reproducing mode is also true in the FB reproducing mode except that tilting direction of the magnetic tape T and moving directions of the related members which are necessary for the lead compensation are opposite, it is shown in FIGS. 37(a) to 37(d) without detailed description thereof.

As mentioned previously, such lead compensation is not always necessary for all of the trick plays such as FF reproducing and FB reproducing or frame by frame recording.

According to experiments, there is almost no case where noise bar develops in a reproduced image even if a track compensation is performed by considerably tilting the tape guide drum 10 in order to perform the FF or FB reproducing operation by running the magnetic tape T at a relatively high speed in the SP mode. This is because, even when a deviation of angle between the reference edge Te of the magnetic tape T and the lead 12a of the lead member 12 by $\theta_2$ due to a tilt of the tape guide drum 10 occurs, an effectiveness of its amount with respect to the track pitch of 58 μm is small. On the contrary, in EP mode in which the track pitch is 19 μm which is one third of the track pitch in SP mode, this deviation of angle ($\theta_2$) is not negligible and there may be noise bar appearing in a reproduced image.

This deviation of angle ($\theta_2$) depends upon the construction of the tape transport system of the magnetic tape T of the apparatus and the angle ($\theta_1$) by which the tape guide drum 10 is to be tilted. Even in the SP mode, when the magnetic tape T runs at a very high speed with the considerably tilted tape guide drum 10, that is, in the FF or FB reproducing operation at very high speed, there may be a case where the deviation of the angle ($\theta_2$) is not negligible and so the lead compensation is necessary. On the other hand, even in the EP mode, when the magnetic tape T runs at ±2 times speed (twice speed) or ±3 times speed (triple speed) with the slightly tilted tape guide drum 10, there may be a case where the lead compensation is unnecessary.

Second Embodiment

A second embodiment to be described relates to a magnetic recording and reproducing apparatus which employs the lead compensation according to the first method mentioned previously and a third embodiment to be described relates to a magnetic recording and reproducing apparatus which employs the lead compensation according to the second method mentioned previously.

Figure 19:
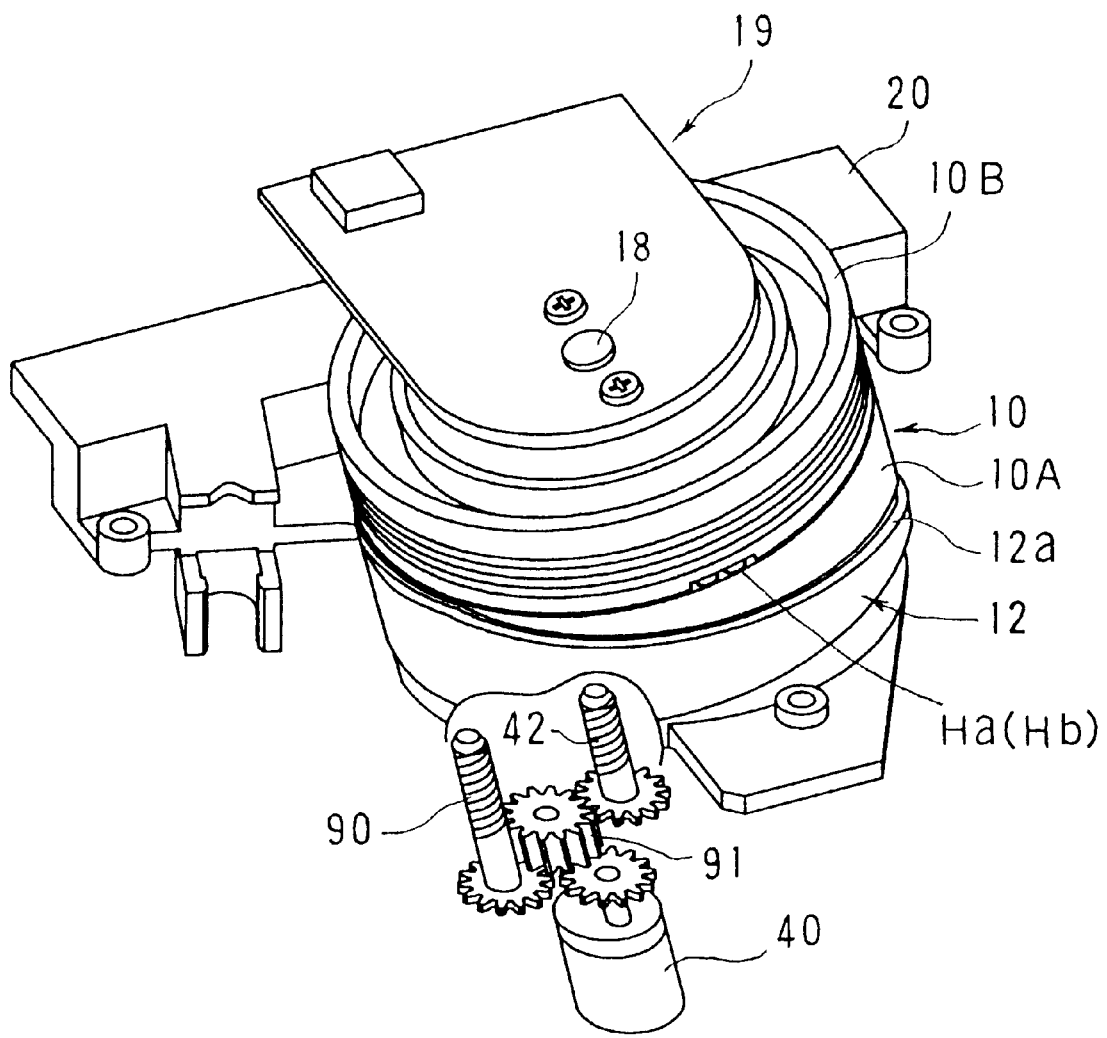
FIG. 19 is a perspective view showing a construction of a tape guide drum and associated components of a second embodiment of the present invention.
Figure 20:
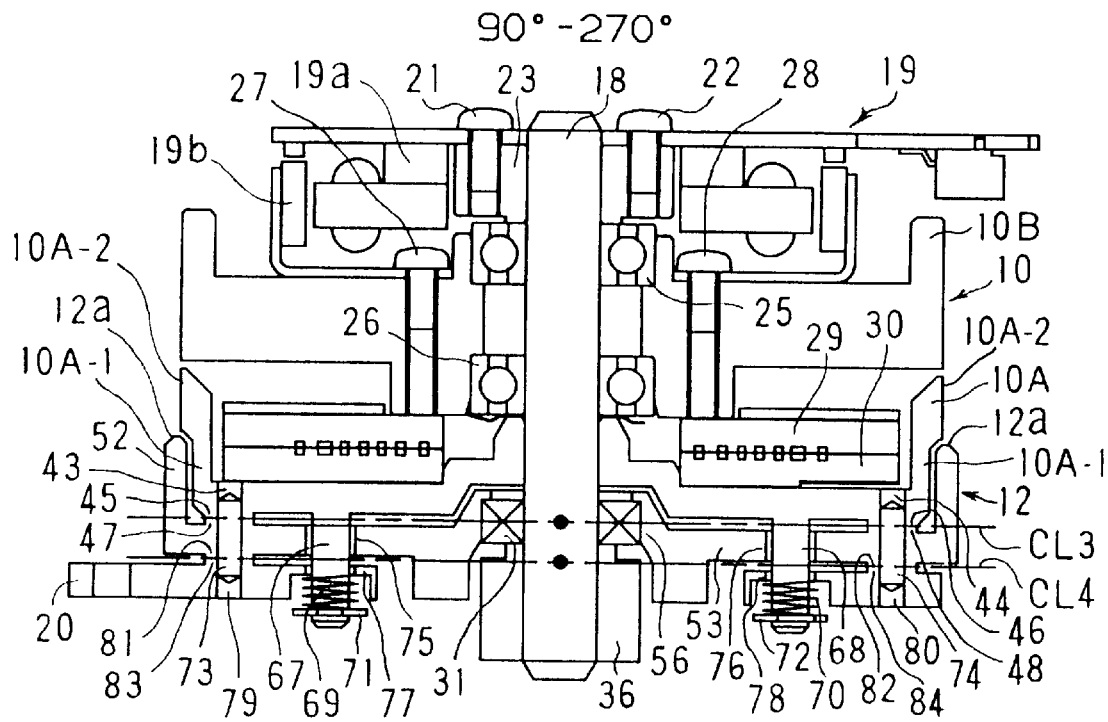
FIGS. 20(a) and 20(b) are cross sections of the tape guide drum and associated components of the second embodiment of the present invention in the normal reproducing mode.
Figure 20:
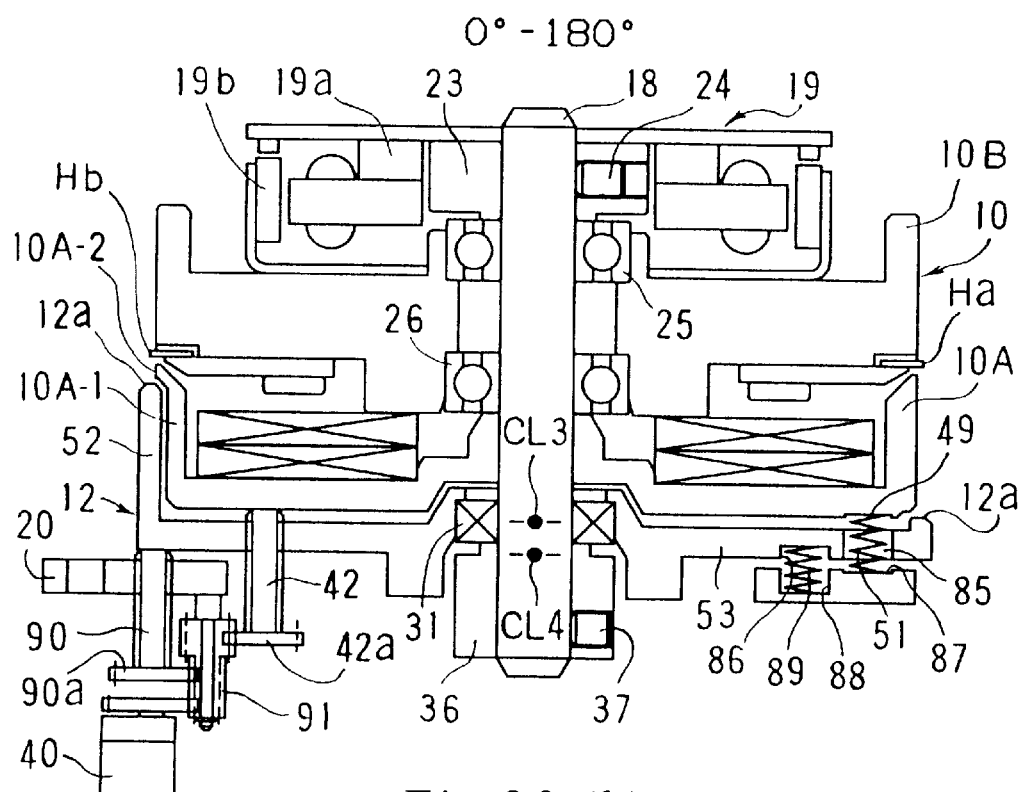
Figure 21:
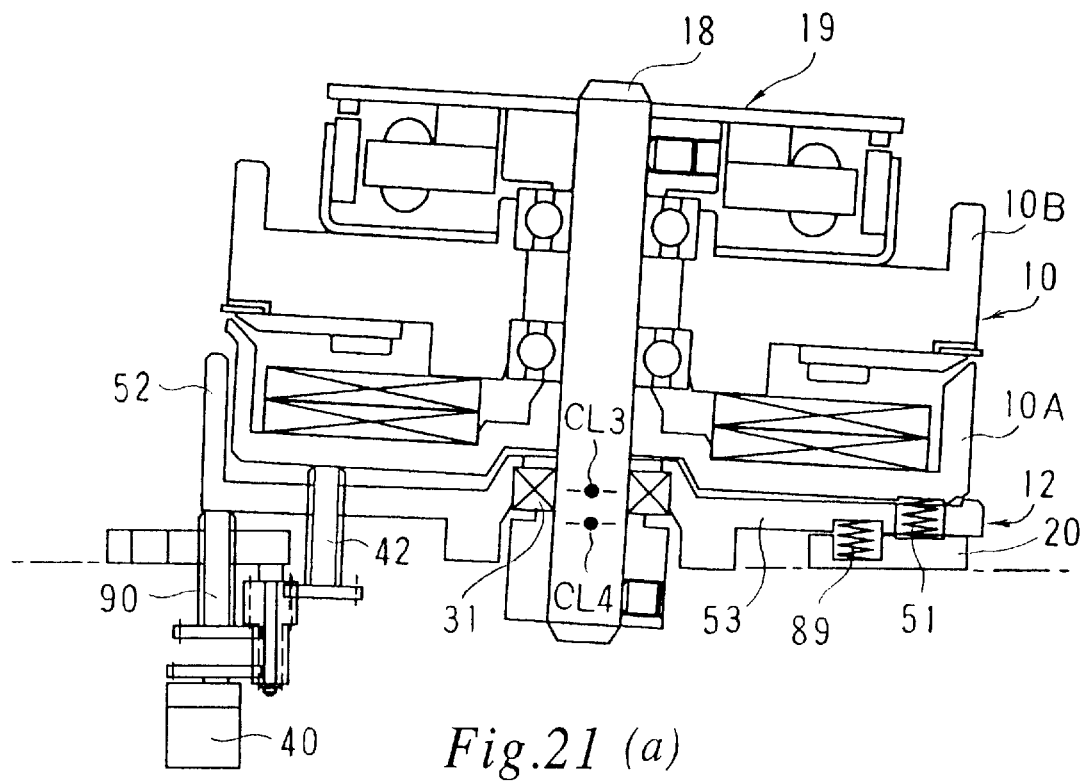
FIGS. 21(a) and 21(b) are cross sections of the tape guide drum and associated components of the second embodiment of the present invention in the trick play mode.
Figure 21:
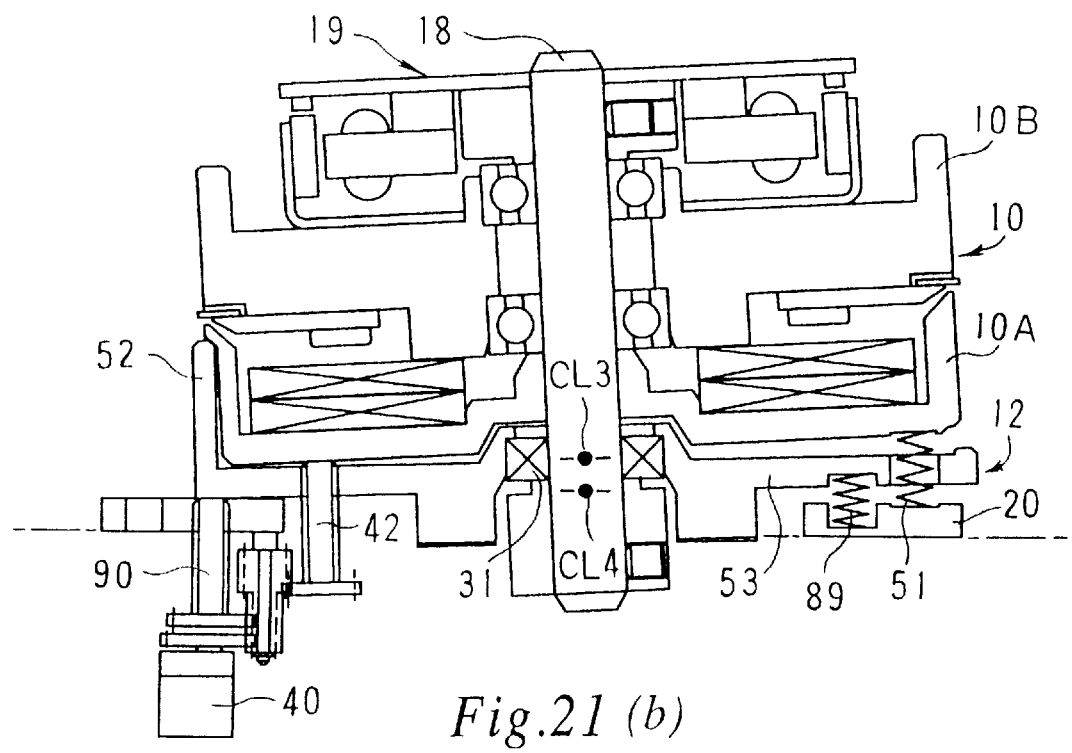
Figure 22:
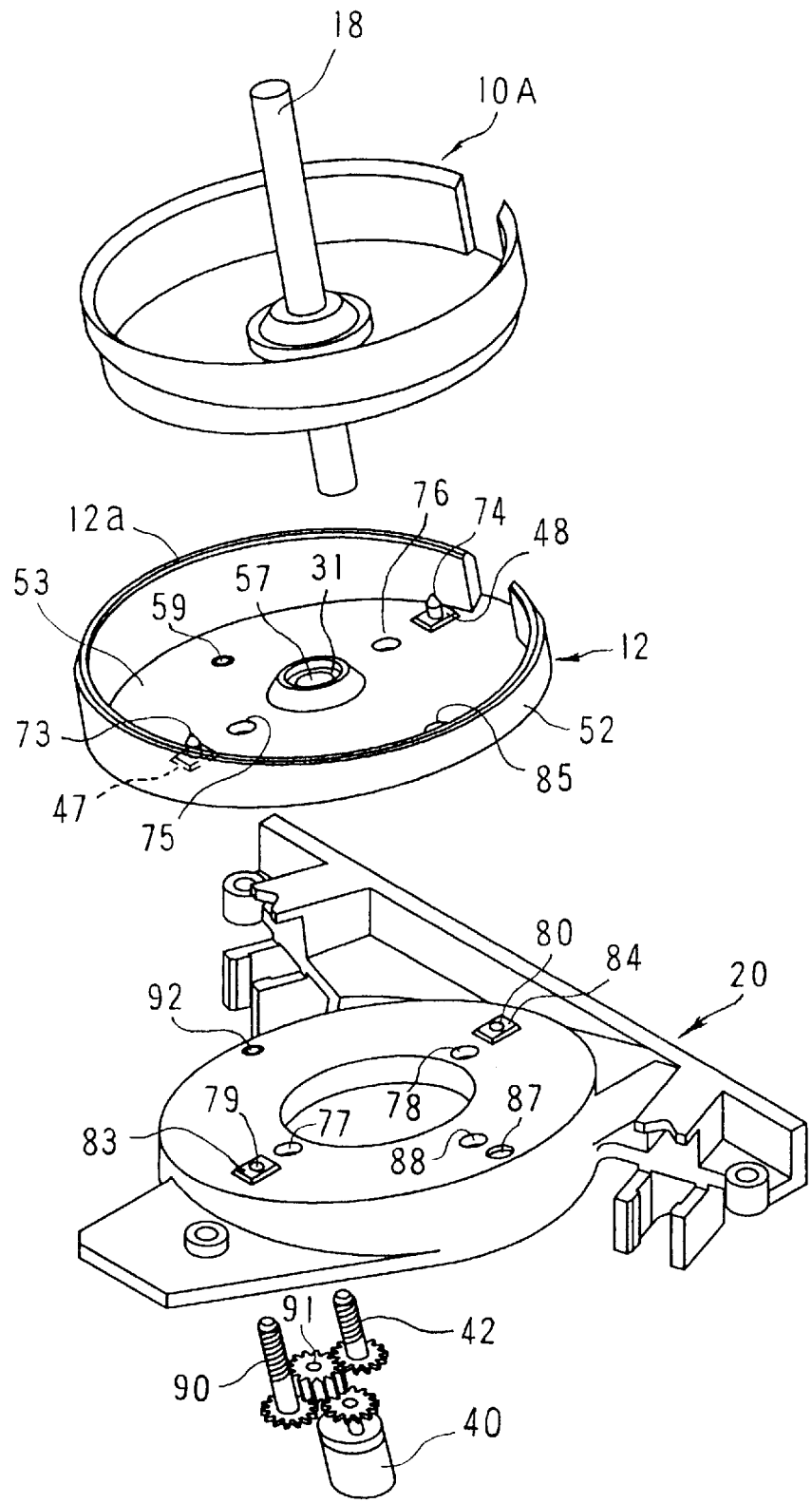
FIG. 22 is a disassembled perspective view of a lower stationary drum, a lead member and a drum base supporting them of the second embodiment.
Figure 23:
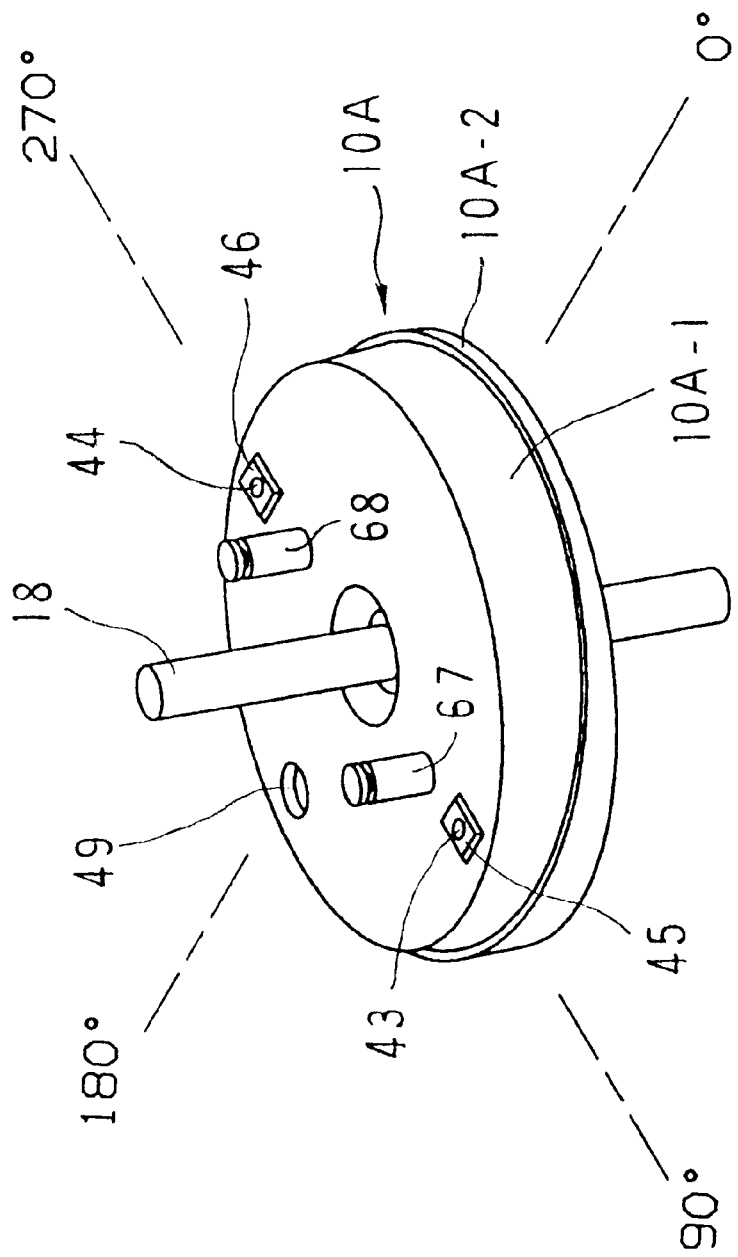
FIG. 23 is a perspective view of the lower stationary drum of the second embodiment when looked from in an opposite direction to that in FIG. 22.
Figure 24:
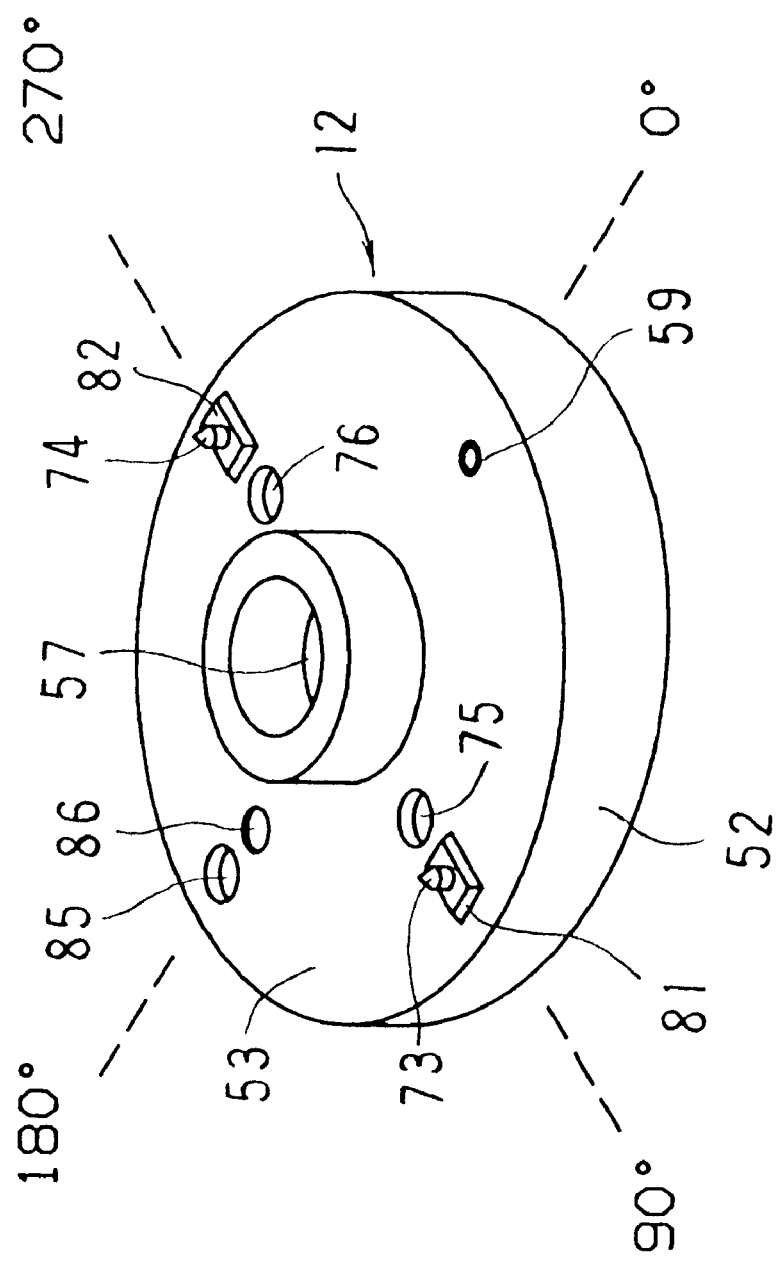
FIG. 24 is a perspective view of the lead member of the second embodiment when looked from in an opposite direction to that in FIG. 22.

The second embodiment will be described with reference to FIGS. 19 to 24. FIG. 19 is a perspective view of a construction of the magnetic recording and reproducing apparatus according to the present invention including a tape guide drum which is a major portion of the apparatus. FIGS. 20(a) and 20(b) are cross sections showing a construction of the apparatus including mainly a tape guide drum 10 in a normal reproducing state, in which FIG. 20(a) is a cross section taken along a straight line L1 in FIG. 2 and FIG. 20(b) is a cross section taken along a straight line L2 in FIG. 2. FIGS. 21(a) and 21(b) are cross sections of the construction of the apparatus taken along the straight line L2 in FIG. 2, including mainly a tape guide drum 10 in the FF reproducing state and the FB reproducing state, respectively. FIG. 22 is a disassembled, perspective view showing a lower stationary drum 10A of the tape guide drum 10 and a lead member 12 and a drum base 20 for supporting them. FIGS. 23 and 24 are perspective views of the lower stationary drum 10A and the lead member 12 when looked in an opposite direction to that in FIG. 22, respectively.

This embodiment is constructed with the drum base 20 fixed to a chassis, not shown, of the apparatus, the lead member 12 fixed to the drum base 20 by means of fulcrum pins 73 and 74, a tape guide drum 10 and a drum motor 19 which are mounted on the lead member 12 by means of the fulcrum pins 73 and 74 and a motor 40 which is a drive source for tilting the tape guide drum 10 with respect to the lead member 12 and tilting the lead member 12 with respect to the drum base 20. That is, in this embodiment, the lead member 12 is made movable to tilt with respect to the drum base 20 in order to perform both the track compensation and the lead compensation as mentioned previously.

In an outer peripheral surface of the lower stationary drum 10A, a portion 10A-2 which provides a sliding contact guide surface for a magnetic tape and a portion 10A-1 having a smaller diameter than that of the portion 10A-2 are formed. As shown in FIG. 20(a) or FIG. 23, the lower stationary drum 10A has protruding abutment faces 45 and 46 on a base thereof and through-holes 43 and 44 each defined on the protruding abutment faces 45 and 46 in a direction of 90 degrees and in a direction of 270 degrees, and has a spring retaining hole 49 in a direction of 180 degrees, as in the first embodiment. In the second embodiment, the lower stationary drum 10A is further provided in the bottom surface thereof with spring retaining pins 67 and 68 in the 90 and 270 degrees directions, respectively. It is preferable to machine the large diameter portion 10A-2 on which the magnetic tape contacts slidingly and the protruding abutment faces 45 and 46 on the basis of a drum shaft 18 pressure-fitted in the lower stationary drum 10A as in the first embodiment.

The lead member 12 has an annular portion 52 and a bottom portion 53 as shown in FIG. 22 or 24 and one edge portion of the annular portion 52 constitutes a lead 12a for guiding a reference edge Te of a magnetic tape T. In the bottom surface portion 53 of the lead member 12, there are provided a screw hole 59 which a gear screw 42 is screwed in and a through-hole 85 in 0 and 180 degrees directions respectively, on the lead member 12, there are further provided a protruding abutment face 47 and an abutment face 81 on opposite surfaces thereof in the 90 degrees direction and the fulcrum pins 73 are implanted in the faces 47 and 81 and there are provided a protruding abutment face 48 and an abutment face 82 on opposite surfaces thereof in the 270 degrees direction and the fulcrum pin 74 are implanted in the faces 48 and 82.

The fulcrum pins 73 and 74 are press-fitted in the abutment faces 47, 81, 48 and 82 with top ends thereof being protruded therefrom. A diameter of each of the fulcrum pins 73 and 74 is slightly smaller than a diameter of the holes 43 and 44 of the lower stationary drum 10A and the holes 79 and 80 of the drum base 20 such that tilt of the drum shaft 10 about a straight line CL3 extending through the fulcrum pins 73 and 74 and the tilt of the lead member 12 about a straight line CL4 are allowed by loose fitting of them in the holes 43, 44, 79 and 80. It is preferable to separate the fulcrum pins 73 and 74 or the holes 43 and 44 and the holes 79 and 80 as far as possible and provide them in the outer peripheral portion of the respective members as in the first embodiment.

Further, a bearing retaining portion 56 surrounding a through-hole 57 formed at a center of the bottom surface portion 53 is formed, in which a ball bearing 31 is fitted with a height of a center of the bearing being flush with the protruding abutment faces 47 and 48.

The ball bearing 31 may be a type allowing a center axis of an outer ring to relatively incline with respect to that of an inner ring and it is preferable to machine the lead 12a, the protruding abutment faces 47 and 48 and the bearing retaining portion 56 at a time as in the first embodiment.

The drum shaft 18 is press-fitted to the lower stationary drum 10A and rotatably supports the upper rotary drum 10B with the rotary transformer 29 by means of ball bearings 25 and 26. A rotor 19b of a drum motor 19 is fixed to the upper rotary drum 10B on which magnetic heads Ha and Hb are mounted, by screws 27 and 28 such that it can rotate with respect to a stator 19a of the drum rotor 19, which is fixed to a collar 23 by screws 21 and 22. The collar 23 is fixed to the drum shaft 18 by a set screw 24 and the ball bearings 25 and 26 are preloaded axially inwardly by being interposed between the collar 23 and the lower stationary drum 10A.

On the other hand, a lower portion of the drum shaft 18 is fitted in the inner ring of the ball bearing 31 and a lower end portion thereof is fixed to a collar 36 by a set screw 37 while exerting a preload to the ball bearing 31. Spring retaining pins 67 and 68 provided on the lower stationary drum 10A loosely penetrate the through-holes 75 and 76 of the lead member 12 and the through-holes 77 and 78 of the drum base 20 and springs 69 and 70 are engaged with top ends of the respective pins through C-rings 71 and 72. That is, the springs 69 and 70 depress the abutment faces 45 and 46 of the lower stationary drum 10A to the abutment faces 47 and 48 of the lead member 12 and depress the abutment faces 81 and 82 of the lead member 12 to the abutment faces 83 and 84 of the drum base 20.

Further, a spring 51 is provided in a space defined by the spring retaining hole 49 of the lower stationary drum 10A, the spring retaining hole 87 of the drum base 20 and the through hole 85 of the lead member 12, the spring 51 biases the lower stationary drum 10A and the upper rotary drum 10B supported by the drum shaft 18 to tilt in the counterclockwise direction in FIG. 20(b) around the straight line CL3. In this embodiment, a spring 89 is further provided between the spring retaining hole 86 of the lead member 12 and the spring retaining hole 88 of the drum base 20 for biasing the lead member 12 toward the drum base 20 in the counterclockwise direction around the straight line CL4 as shown in FIG. 20 (b). The gear screws 42 and 90 having one ends formed with gears 42a and 90a, respectively, are screwed into screw holes 59 and 92 formed in the lead member 12 on an opposite side thereof to the spring 51 or the spring 89, that is, formed in a 0 degree direction such that the gear screws 42 and 90 are driven vertically in FIG. 20(b) by the motor 40 through an intermediate gear 91.

That is, when the gear screws 42 and 90 are driven upwardly in FIG. 20(b) by the motor 40 through the drive circuit thereof which is not shown, the tape guide drum 10 and the drum motor 19, etc., constructed as a single unit by means of the drum shaft 18 are tilted in the clockwise direction about the straight line CL3 against the spring 51 to perform the track compensation and, simultaneously, the lead member 12 is tilted in the clockwise direction about the straight line CL4 against the spring 89 to perform the lead compensation and the apparatus becomes the FF reproducing mode (see FIG. 21(a)). On the contrary, when the gear screw 42 is retracted downwardly in FIG. 20(b), the tape guide drum 10 and the drum motor 19, etc., constructed as a single unit by means of the drum shaft 18 are tilted in the counterclockwise direction about the straight line CL3 by the biasing force of the spring 51 to perform the track compensation and, simultaneously, the lead member 12 is tilted in the clockwise direction about the straight line CL4 by the spring 89 to perform the lead compensation and the apparatus becomes the FB reproducing mode (see FIG. 21(b)).

It should be appreciated that an angle ($\theta_1$) of the tilt of the tape guide drum 10 and the drum motor 19, etc., constructed as the single unit by means of the drum shaft 18 is determined depending upon the running speed of the magnetic tape T in the FF or FB reproducing mode primarily and it is suitably set by changing an amount of protrusion of the gear screw 42 as in the first embodiment. However, the angle ($\theta_2$) of the tilt of the center axis 93 of the lead member 12 for the lead compensation should be preliminary set by experiments.

As described, according to this embodiment, when there is an angle deviation ($\theta_2$) between the reference edge Te of the magnetic tape T and the lead 12a of the lead member 12 due to the inclination of the tape guide drum 10 in performing the track compensation, the lead member 12 is tilted around the straight line CL4 by this angle ($\theta_2$) and the lead compensation is performed. Therefore, it is possible to make the rotary loci of the magnetic heads Ha and Hb consistent with the track patterns of the magnetic tape T correctly even for the magnetic tape T recorded with relatively narrow pitch in such as in the EP mode in the VHS system.

Further, according to this embodiment, the drum shaft 18 which supports the tape guide drum 10, etc., is supported by the ball bearing 31 provided in the bearing retaining portion 56 formed in the bottom surface portion 53 of the lead member 12. Therefore, it is possible to keep the coaxial accuracy of the center axis 93 of the lead member 12 and the drum shaft 18 quite precisely in the normal reproducing mode or in the recording mode of operation and, even in the trick plays such as the FF or FB reproducing mode, the straight line CL3 which is a center axis of tilt of the drum shaft 18 is kept in a constant position as mentioned previously with respect to the first embodiment.

Now, a first to fourth modifications of the second embodiment will be described with reference to FIGS. 25 to 33(b) while comparing them with the second embodiment.

First Modification

Figure 25:
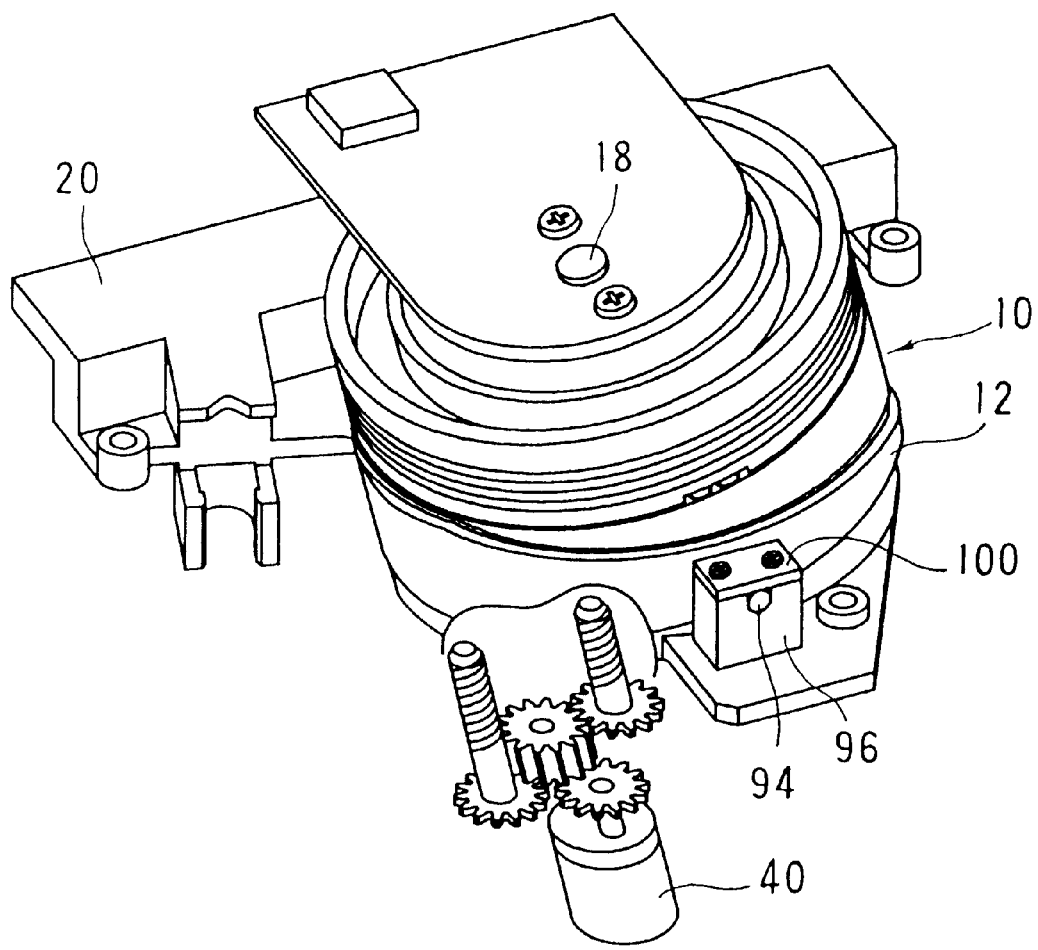
FIG. 25 is a cross section of the tape guide drum and associated components of a first modification of the second embodiment of the present invention.
Figure 28:
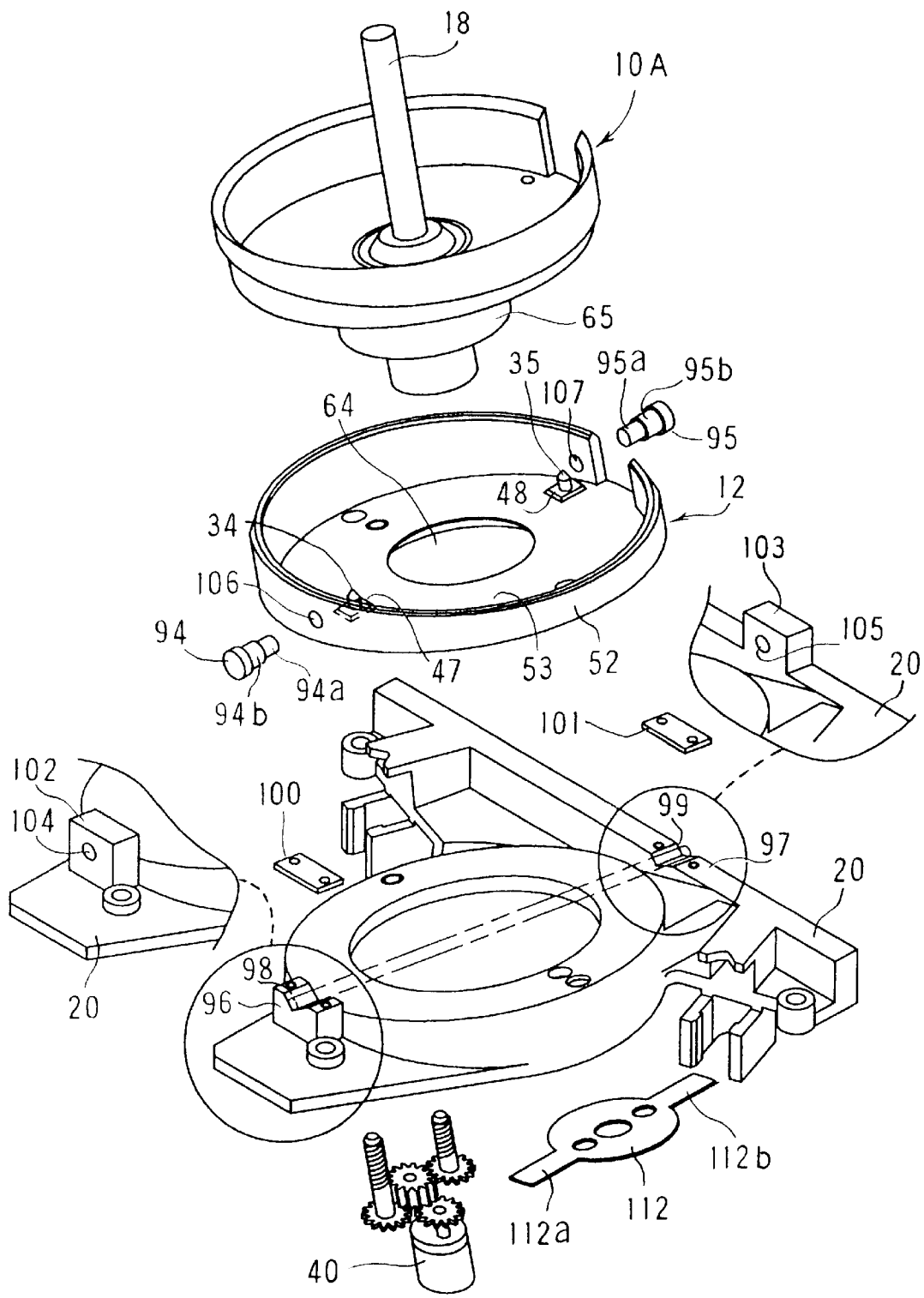
FIG. 28 is a disassembled perspective view of the lower stationary drum, the lead member and the drum base supporting them of the first modification of the second embodiment of the present invention.
Figure 29:
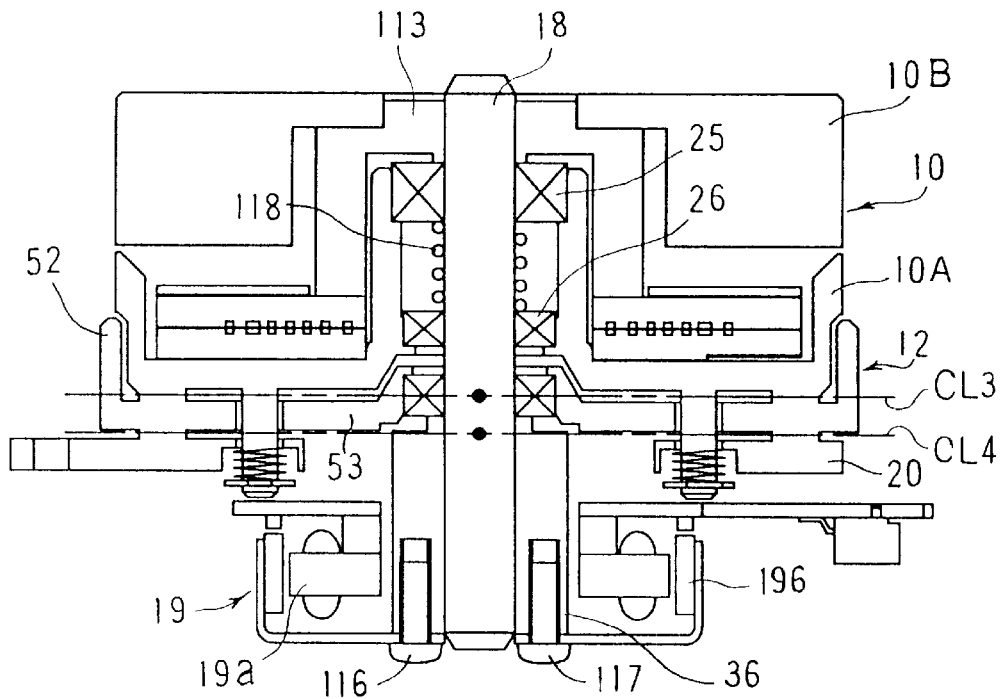
FIGS. 29(a) and 29(b) are cross sections of a tape guide drum and associated components of a second modification of the second embodiment of the present invention.
Figure 29:
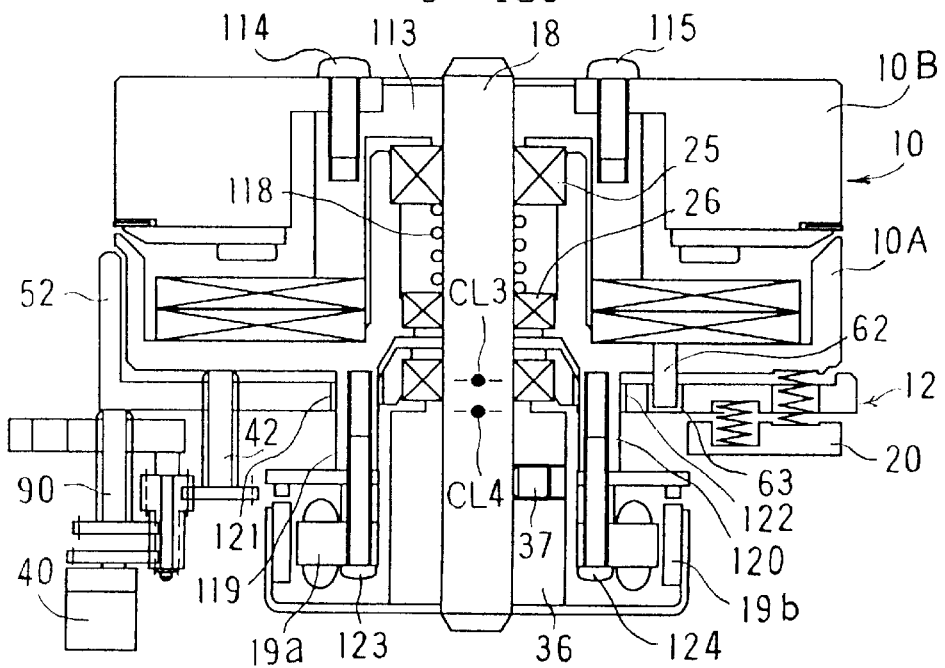
Figure 30:
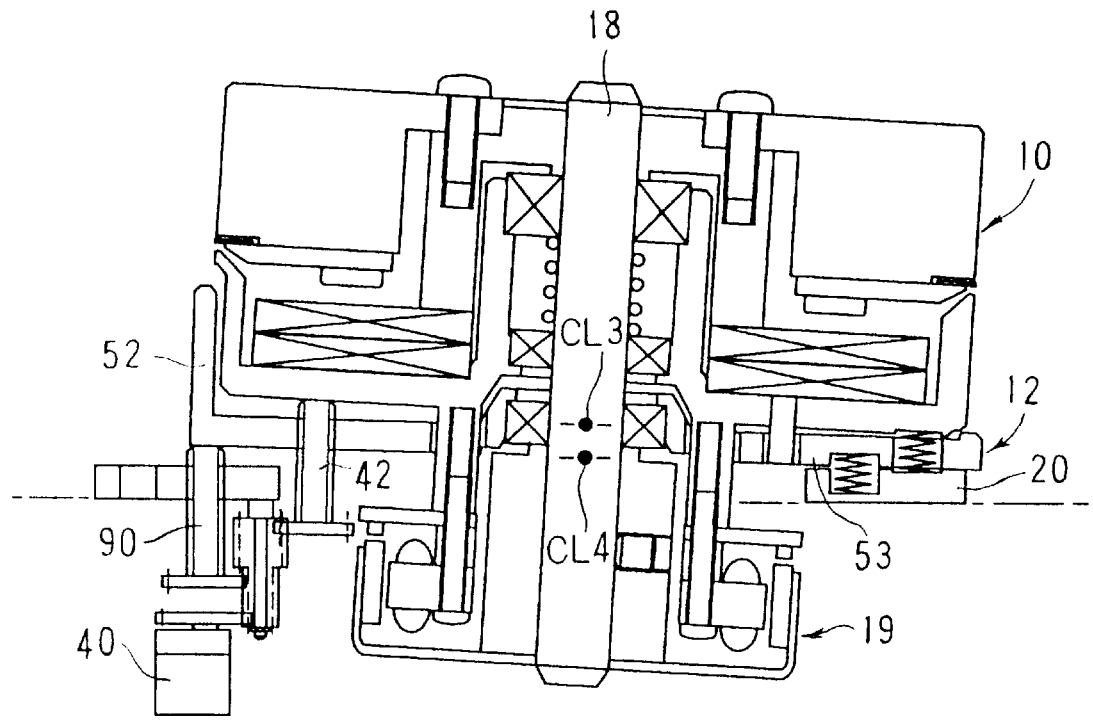
FIGS. 30(a) and 30(b) are cross sections of the tape guide drum and associated components of the second modification of the second embodiment of the present invention in the trick play.
Figure 30:
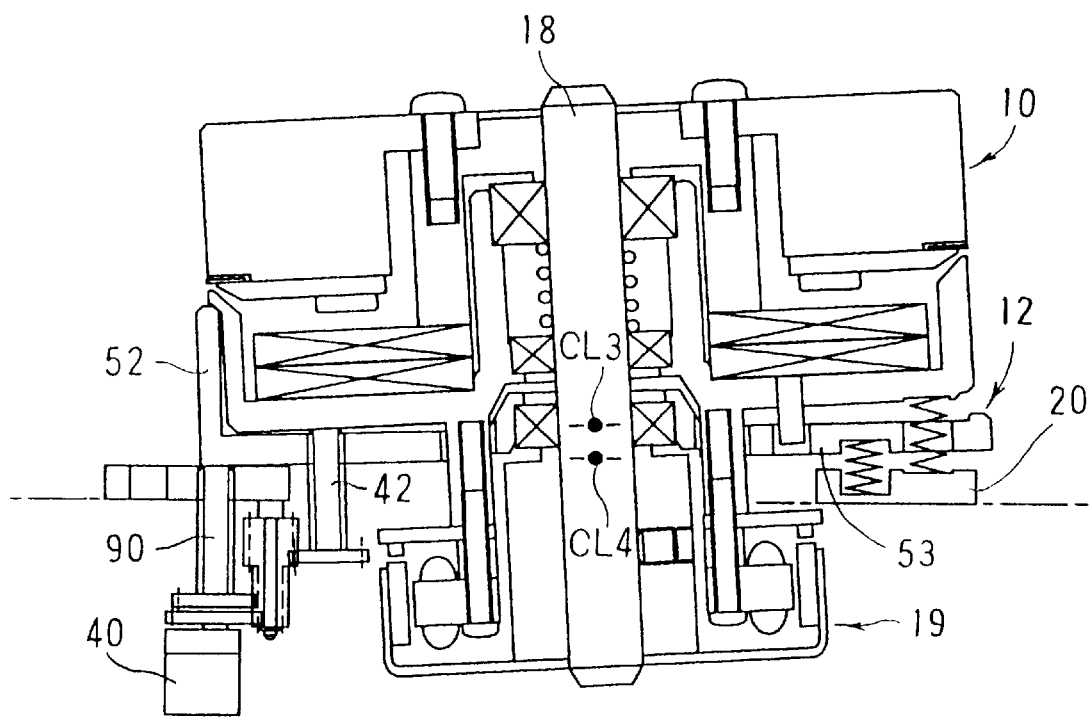
Figure 31:
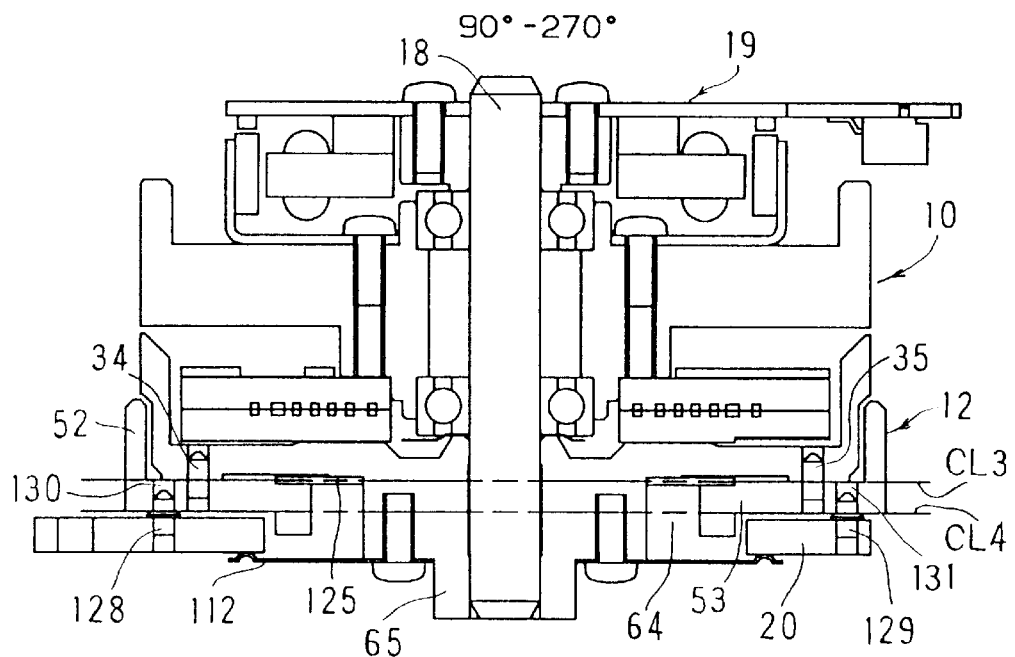
FIGS. 31(a) and 31(b) are cross sections of the tape guide drum and associated components of a third modification of the second embodiment of the present invention in the normal reproducing mode.
Figure 31:
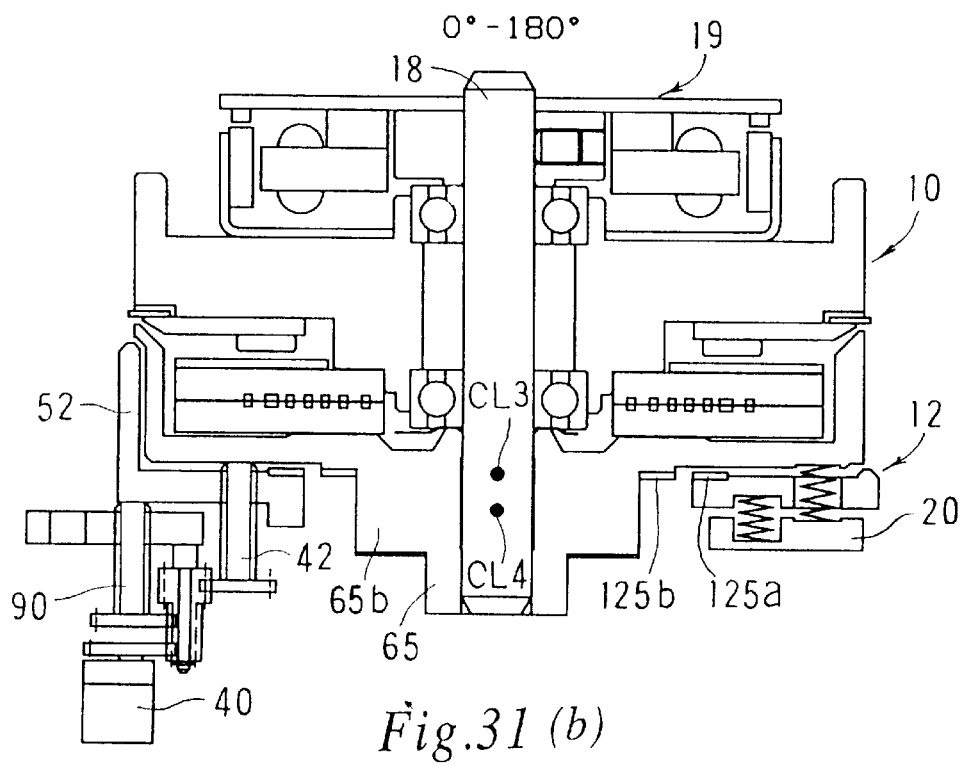

FIG. 25 is a perspective view of a first modification, showing the tape guide drum 10 mainly and FIGS. 26(a), 26(b) and 26(c) are cross sections of the first modification taken along the respective straight lines L1 and L2 in FIG. 2, and show the tape guide drum 10 and peripheral components associated therewith in the normal reproducing mode. FIGS. 27(a) and 27(b) are cross sections of the tape guide drum 10 and peripheral components associated therewith in the FF and FB reproducing modes, taken along the straight line L2 in FIG. 2. FIG. 28 is a perspective disassembled view of the lower stationary drum 10A of the tape guide drum 10, the lead member 12 and the drum base 20 supporting them.

Comparing with the second embodiment in which the drum shaft 18 is supported to tilt by the bearing (ball bearing 31) such as a single deep groove ball bearing which allows a center axis of an outer ring to relatively incline with respect to that of an inner ring, the first modification differs from the second embodiment in that, instead of the ball bearing 31, the drum shaft 18 is supported to tilt by a hole having a knife edge cross section.

Figure 16:
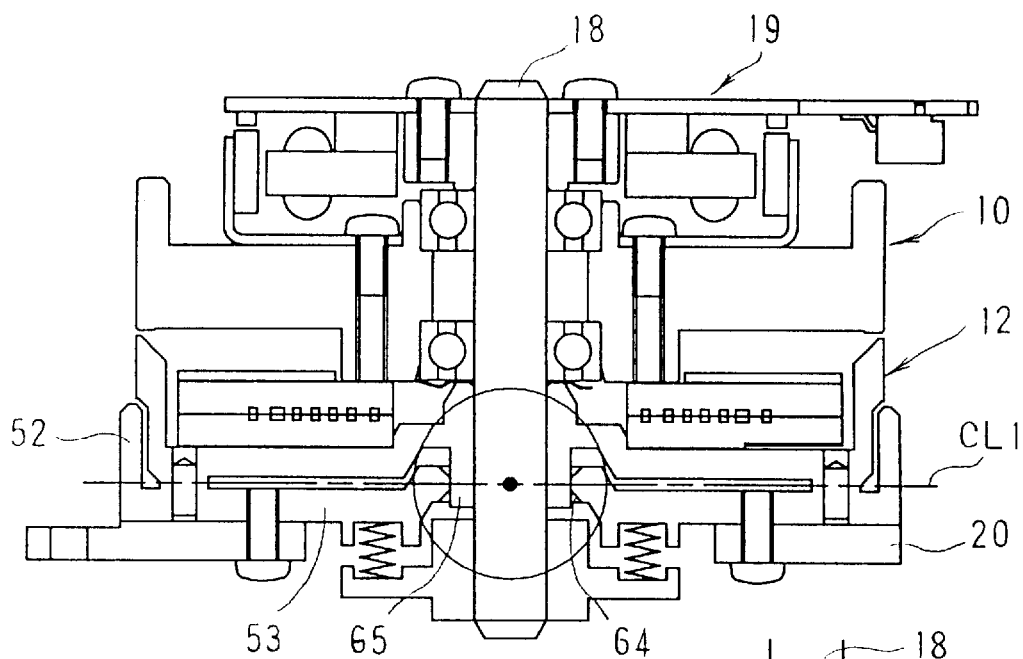
FIGS. 16(a) to 16(c) illustrate cross sections of the tape guide drum and associated components of a second modification of the first embodiment of the present invention in the normal reproducing mode.
Figure 16:
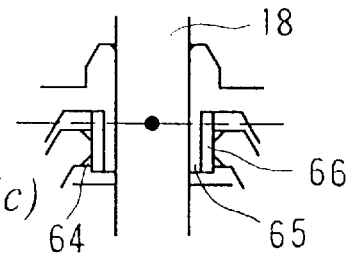
Figure 16:
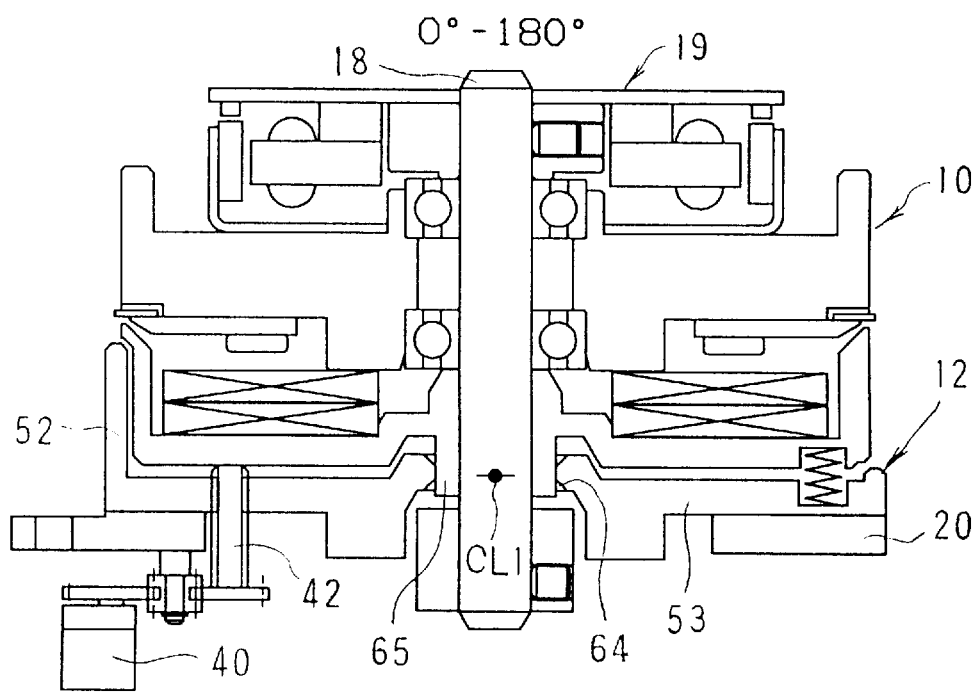
Figure 17:
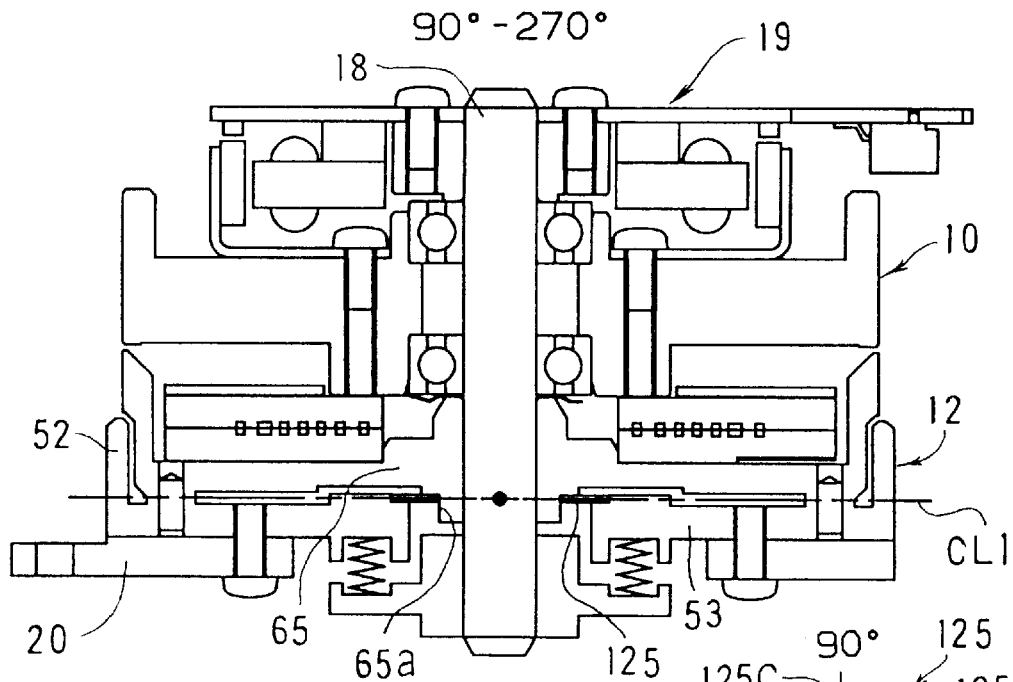
FIGS. 17(a) to 17(c) illustrate cross sections of the tape guide drum and associated components of a third modification of the first embodiment of the present invention in the normal reproducing mode.
Figure 17:
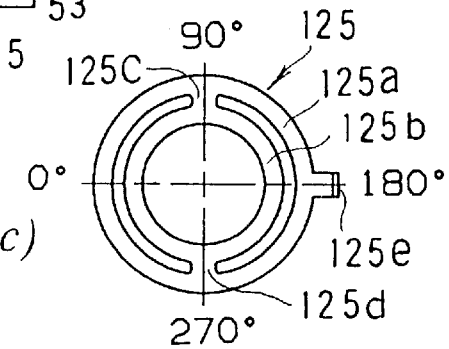
Figure 17:
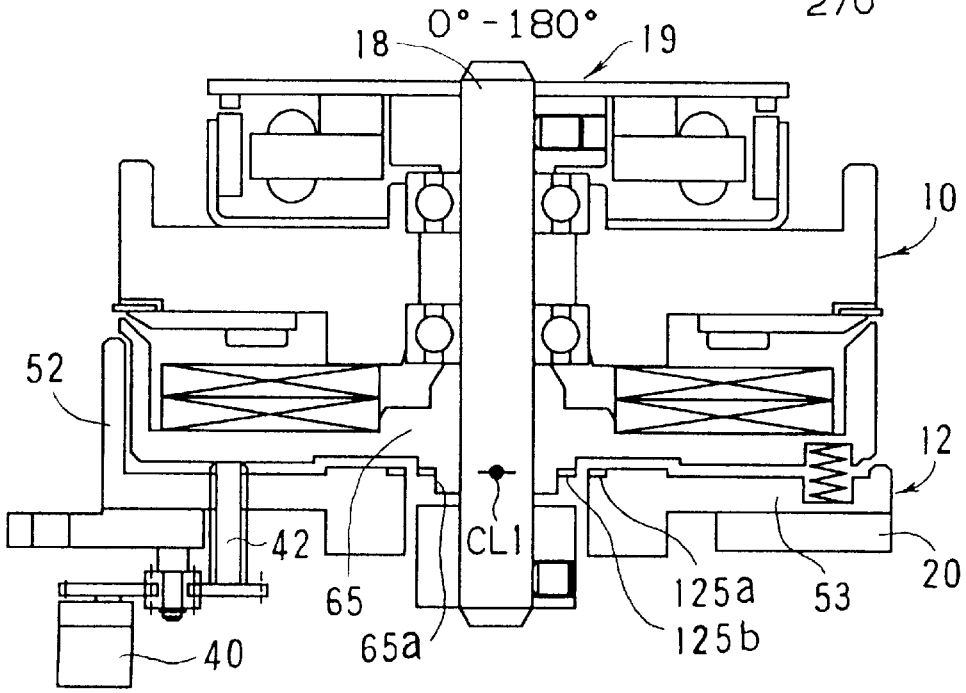

This relationship is similar to the one between the first embodiment and the second modification of the first embodiment which was described with reference to FIGS. 16(*a*) and 16(*b*).

Further comparing this modification with the second embodiment, it differs from the second embodiment in the supporting system of the lead member 12 which is allowed to tilt with respect to the drum base 20 for lead compensation. That is, in the second embodiment, the straight line CL4 is determined by loosely fitting the fulcrum pins 73 and 74 implanted in the lead member 12 in the holes 79 and 80 formed in the drum base 20 and the lead member 12 is supported to tilt about the straight line CL4 by the biasing forces of the springs 69 and 70. On the contrary, in this modification, the lead member 12 is supported to tilt by stepped shafts 94 and 95 provided in the drum base 20.

A supporting mechanism for supporting the tape guide drum 10 with respect to the lead member 12 and a supporting mechanism for supporting the lead member 12 with respect to the drum base 20 will be described in detail. Since the other portions of this modification are substantially the same as those of the second embodiment, details thereof are omitted.

In this modification, the lead member 12 is supported by the stepped shafts 94 and 95. That is, small diameter portions 94*a* and 95*a* of the stepped shafts 94 and 95 are fitted in through-holes 106 and 107 formed in the lead member 12 in 90 and 270 degrees directions and large diameter portions 94*b* and 95*b* thereof are fixed by mounting plates 100 and 101 mounted in V grooves 98 and 99 formed in bearing portions 96 and 97 of the drum base 20 respectively. Alternatively, the large diameter portions 94*b* and 95*b* of the stepped shafts 94 and 95 may be press-fitted in through-holes 104 and 105 formed in the bearing portions 102 and 103 of the drum base 20 as shown in FIG. 28. The small diameter portions 94*a* and 95*a* of the stepped shafts 94 and 95 are fitted in the through-holes 106 and 107 of the lead member 12 with small enough clearance and the lead member 12 is supported to tilt about a straight line CL6 extending through the small diameter portions 94*a* and 95*a*. Horizontal position of the lead member 12 and the drum base 20 in FIG. 26(*a*) is restricted by the length of the large diameter portions 94*b* and 95*b* of the stepped shafts 94 and 95.

On the other hand, a hole 64 having a knife edge cross section is formed at a center of the bottom surface portion 53 of the lead member 12 and the drum shaft 18 is supported to tilt by the fitting of the fitting portion 65 of the lower stationary drum to which the drum shaft 18 is press-fitted in the hole 64. In this case, the straight line CL5 which is a center axis of the tilt of the drum shaft 18 and the associated members such as the tape guide drum 10, is determined by the loose fitting of the fulcrum pins 34 and 35 implanted in the lead member 12 in the holes 43 and 44 formed in the lower stationary drum 10A as in the second embodiment. As shown in FIG. 26(C), a bushing 108 may be fitted on the fitting portion 65, and the hole 64 formed in the center portion of the lead member 12 and having the knife edge cross section may be constructed by mounting a separate collar 109. When the bushing 108 and the collar 109 are made of a material such as bronze or oilless metal which is capable of providing a relatively smooth sliding surface and is abrasion-resistant, the tilting movement of the tape guide drum 10 during the track compensation becomes smooth and abrasion of the fitting portion can be prevented.

The tape guide drum 10 is biased downwardly by a leaf spring 112 mounted on the lower stationary drum 10A by screws 110 and 111. That is, the leaf spring 112 has arm portions 112*a* and 112*b* in 90 and 270 degree directions thereof, which press the bottom surface of the drum base 20 to urge the abutment faces 45 and 46 of the lower stationary drum 10A to the abutment faces 47 and 48 of the lead member 12.

Figure 26:
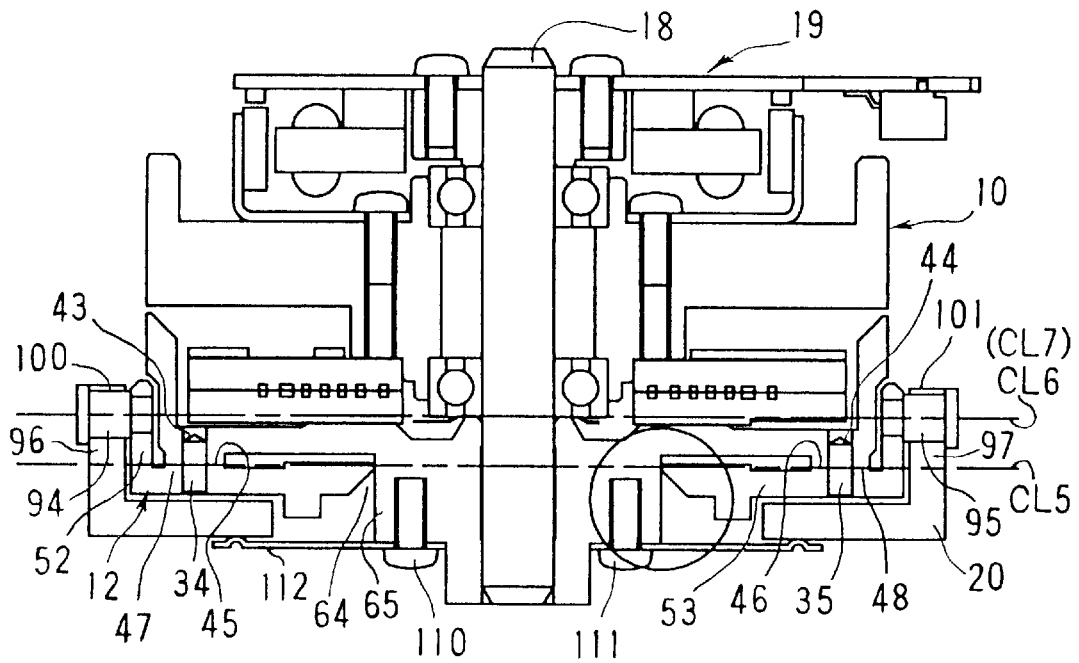
FIGS. 26(a) to 26(c) illustrate cross sections of the tape guide drum and associated components of the first modifications of the second embodiment of the present invention in the normal reproducing mode.
Figure 26:
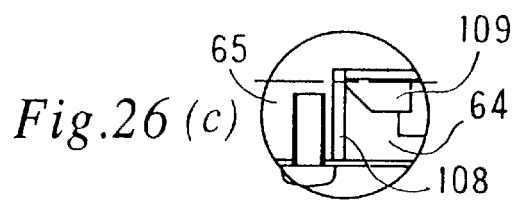
Figure 26:
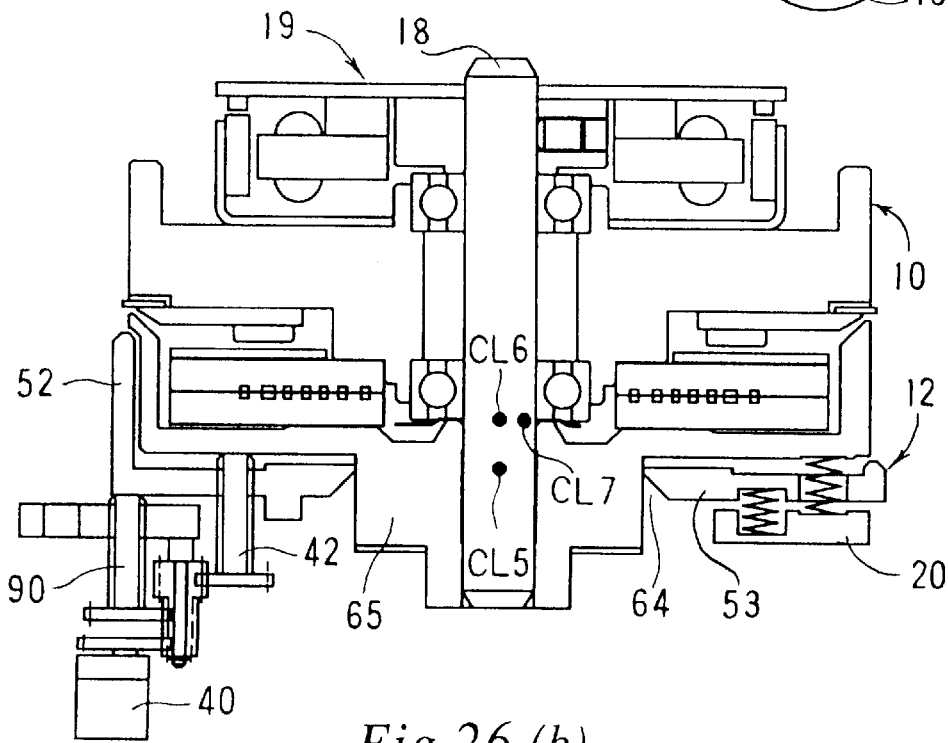
Figure 27:
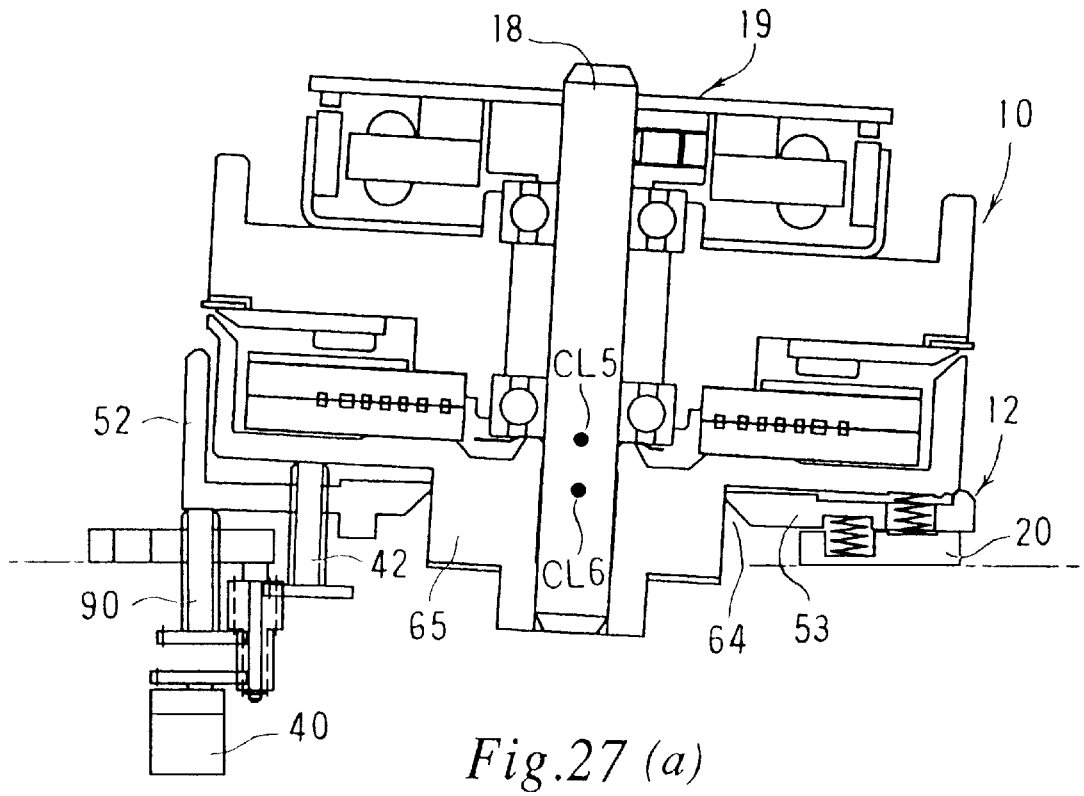
FIGS. 27(a) and 27(b) are cross sections of the tape guide drum and associated components of the first modification of the second embodiment of the present invention in the trick play.
Figure 27:
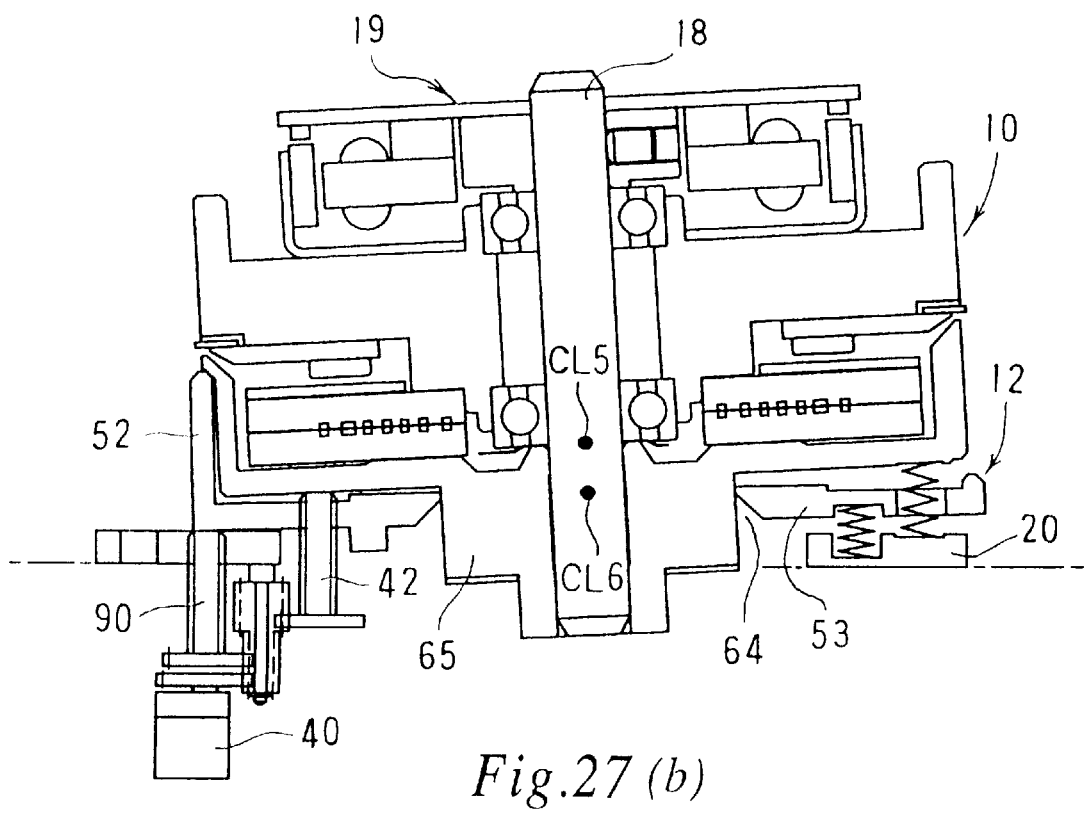

When the supporting structure for supporting the lead member 12 allowing its tilt and the support structure for supporting the tape guide drum allowing its tilt, etc., are provided separately as in this modification, it is preferable to arrange a straight line to be used as a center axis of inclination of the lead member 12 in a position displaced from the straight line CL6 by a predetermined amount in 180 degrees direction as shown by CL7 in FIG. 26(*b*). With such construction, when the lead member 12 is tilted about the straight line CL7 for the lead compensation, an amount of shift of the lead 12*a* at a tape inlet portion thereof becomes larger than the amount of shift of the lead 12*a* at a tape exit portion thereof.

The reason why such construction is employed in this modification will be described. The present inventors have prepared a VTR of VHS system to which the first modification of the second embodiment is applied and have conducted evaluation experiments at various tape speeds in FF and FB reproducing modes of the VTR. As a result, it has been confirmed that, in either of SP and EP modes in the FF reproducing mode, it is possible to perform a noise-less search operation without the so-called noise bar up to a considerable high speed. However, it has also been confirmed that, although there is no problem in the FB reproducing mode at a relatively low tape speed, a reproduced output becomes uneven at high speed and, when the tape speed exceeds a certain constant value, there developed noise bars. This tendency is particularly conspicuous in the EP mode (original recording is made in the EP mode).

In order to clarify the reason for this tendency, the present inventors modified the VTR by cutting off the lead 12*a* of the lead member 12 so that the reference edge Te of the magnetic tape T is substantially free from the lead 12*a* and have observed a behavior of the magnetic tape T in both the tape inlet and exit regions of the tape guide drum 10. As a result, it has been clarified that, in the FF reproducing mode, an amount of rise of the magnetic tape T at the tape inlet region is substantially the same as an amount of drop of the magnetic tape T at the tape exit region and, in the FB reproducing mode, the amount of drop of the magnetic tape T at the tape inlet region is larger than the amount of rise of the magnetic tape T at the tape exit region. Although a mechanism with which such phenomenon occurs is not very clear, it is considered that the phenomenon is closely related to the facts that the magnetic tape T is obliquely wound on the tape guide drum 10 and that the position in which the magnetic tape T is wound on the tape guide drum 10 is separated from the position of the fulcrum (straight line CL5) in the direction of drum shaft 18 for the track compensation.

As will be clear from the experimental results described above, with using the construction mentioned above, it becomes possible to displace the lead 12*a* of the lead member 12 responsive to the unbalance of the rise and drop of the magnetic tape T at the tape inlet and exit regions of the tape guide drum 10 in the FB reproducing mode. Therefore, the lead 12a can stably guide the reference edge Te of the magnetic tape T throughout the winding range thereof.

As described previously, in the FF reproducing mode, there is no need of displacing the fulcrum for the lead compensation from CL6 to CL7.

Therefore, the amount of displacement of the fulcrum for the lead compensation from CL6 to CL7 should be determined by taking the performance in the FF reproducing mode and the performance in the FB reproducing mode into consideration. Incidentally, the displacement of the straight line around which the lead member 12 tilts, from CL6 to such as CL7, can be achieved by displacing correspondingly the bearing portions 96 and 97 (or the bearing portions 102 and 103), the V grooves 98 and 99 (or the through-holes 104 and 105), and the through-holes 106 and 107.

Second Modification

FIGS. 29(a) and 29(b) are cross sections of the second modification taken along the respective straight lines L1 and L2 in FIG. 2, and show the tape guide drum 10 and peripheral components associated therewith in the normal reproducing mode. FIGS. 30(a) and 30(b) are cross sections of the tape guide drum 10 and peripheral components associated therewith in the FF and FB reproducing modes, taken along the straight line L2 in FIG. 2.

Comparing this modification with the second embodiment, the second modification differs from the second embodiment mainly in that the drum motor 19 is provided on a lower end of the drum shaft 18 and the upper rotary drum 10B mounted on the drum shaft 18 through a flywheel 113, is driven by the rotation of the drum shaft 18.

This difference from the second embodiment will be described in detail without description of other points.

In this modification, the flywheel 113 is fixed to an upper portion of the drum shaft 18 by adhesive and the upper rotary drum 10B is fixed to the flywheel 113 by screws 114 and 115. A collar 36 is fixed to a lower portion of the drum shaft 18 by a set screw 37 to preload the ball bearing 31. A rotor 19b of the drum motor 19 is fixed to the collar 36 by screws 116 and 117. A spring 118 provided between the bearings 25 and 26 preload these bearings.

Bosses 119 and 120 are provided on the bottom surface of the lower stationary drum 10A so that they penetrate through holes 121 and 122 provided in the bottom surface of the lead member 12 and protrude from the drum base 20 downwardly. The stator 19a of the drum motor 19 is fixed to the protruded ends of the bosses 119 and 120 by screws 123 and 124.

A round pin 62 is implanted in the bottom surface of the lower stationary drum 10A and loosely fits in a slot 63 formed in the bottom surface portion 53 of the lead member 12 to position the rotating direction of the lower stationary drum 10A about the center axis 93 of the lead member 12, and the tilting direction of the tape guide drum 10, etc., with respect to the lead member 12, is restricted, as in the first modification of the first embodiment.

Third Modification

Figure 32:
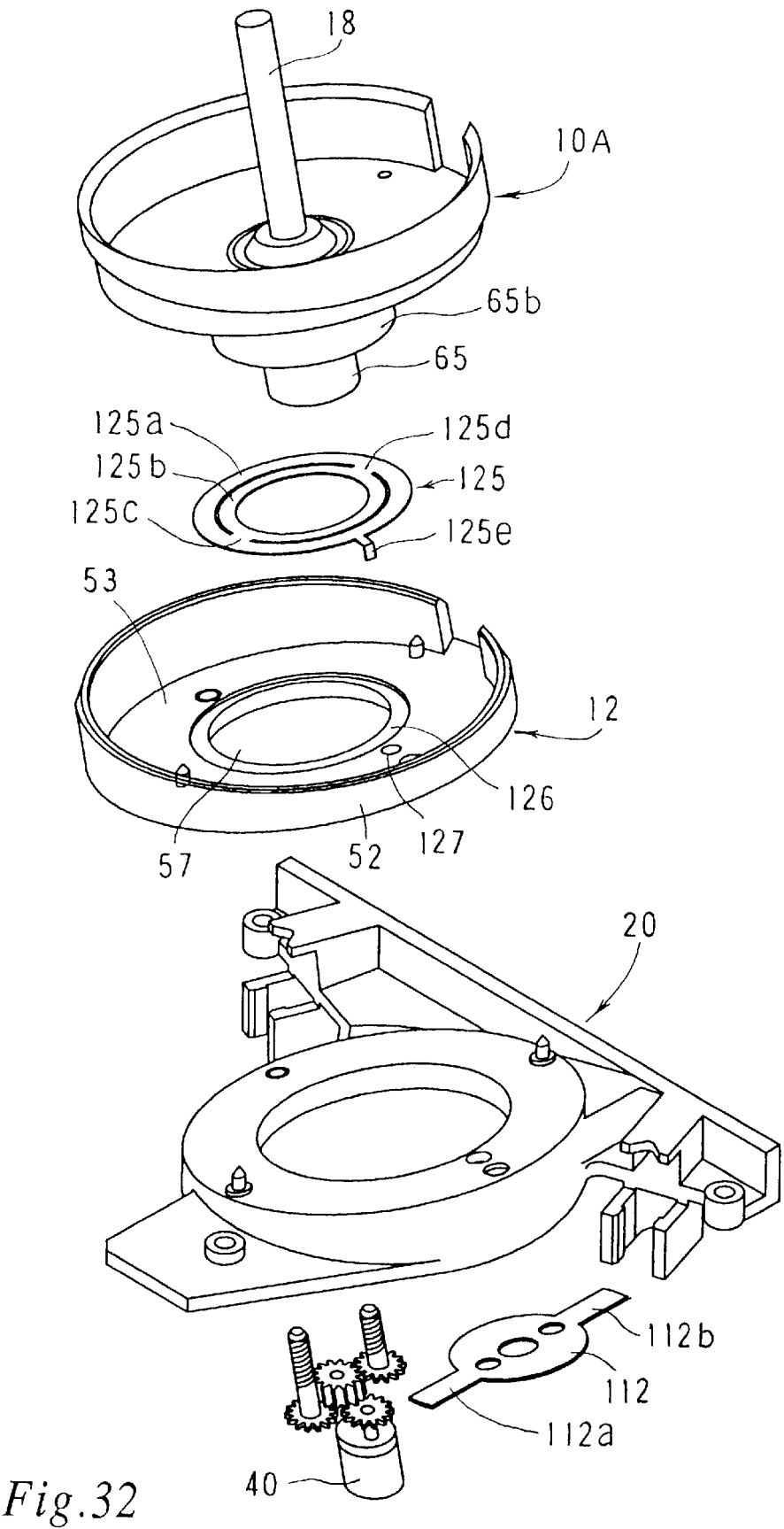
FIG. 32 is a disassembled perspective view of the lower stationary drum, the lead member and the drum base supporting them of the third modification of the second embodiment of the present invention.
Figure 33:
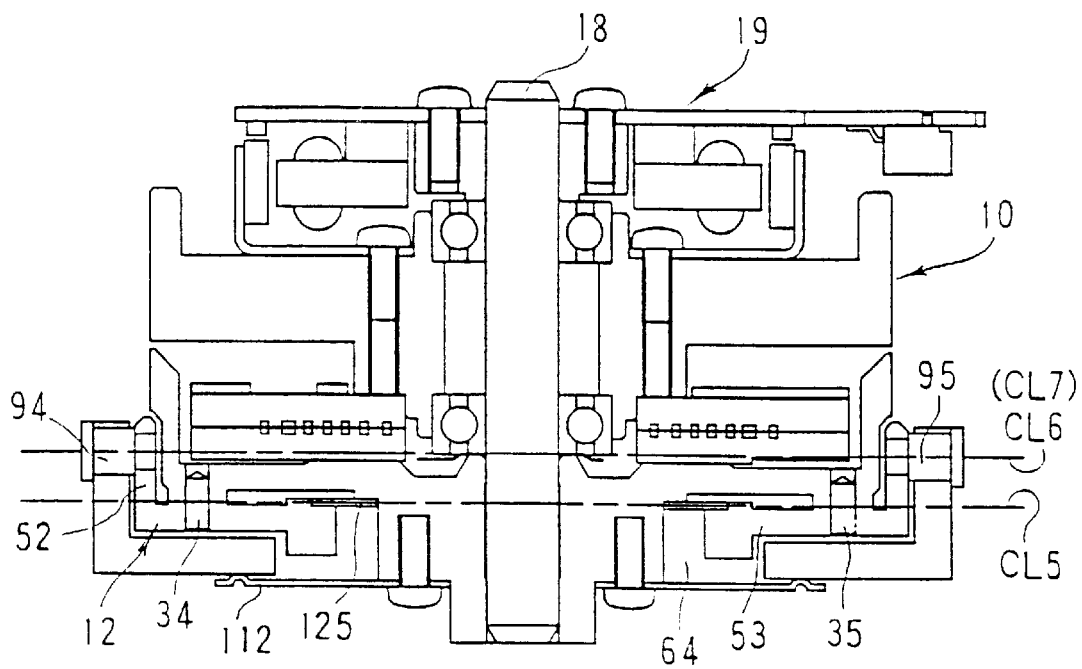
FIGS. 33(a) and 33(b) are cross sections of the tape guide drum and associated components of a fourth modification of the second embodiment of the present invention in the normal reproducing mode.
Figure 33:
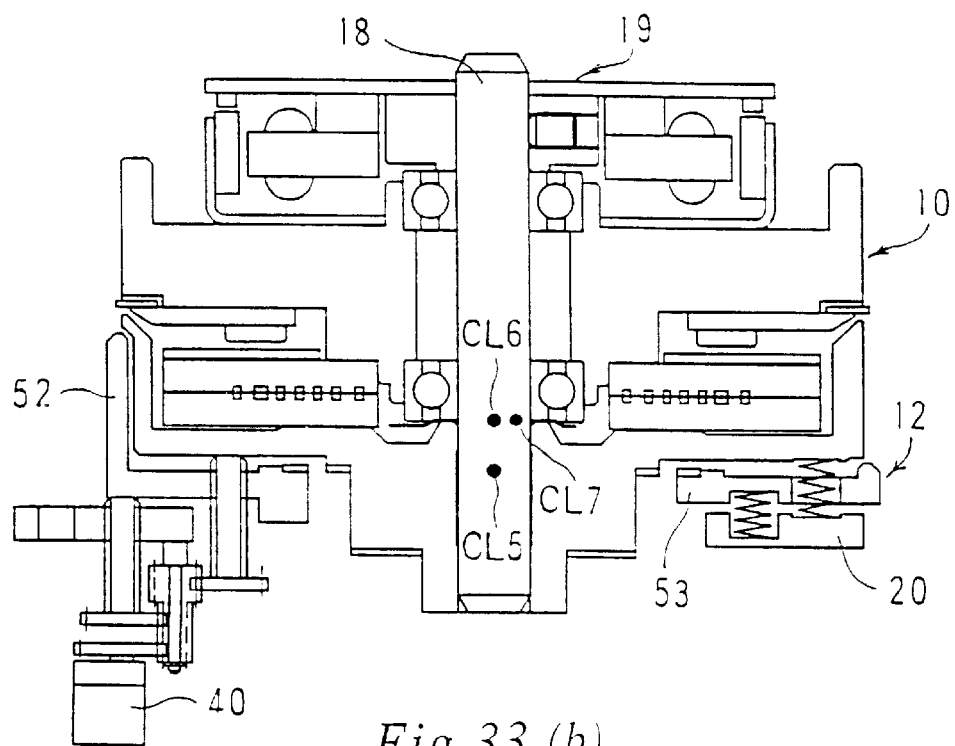

FIGS. 31(a) and 31(b) are cross sections of the third modification corresponding to FIGS. 20(a) and 20(b), taken along the straight lines L1 and L2 in FIG. 2, showing the tape guide drum 10 and peripheral components associated therewith in the normal reproducing mode, and FIG. 32 is a disassembled perspective view of the lower stationary drum 10A of the tape guide drum 10, the lead member 12 and the base 20 supporting them.

Comparing the third modification with the second embodiment in which the drum shaft 18 is supported to tilt by the ball bearing 31 such as single deep groove ball bearing which allows a center axis of an outer ring to relatively incline with respect to that of an inner ring, the third modification differs from the second embodiment in that the drum shaft 18 is supported to tilt by not the ball bearing 31 but a suspension diaphragm 125 as shown in FIG. 32.

This relation therebetween is substantially the same as that between the first embodiment (magnetic recording and reproducing apparatus in which only the track compensation is made) and the third modification of the first embodiment.

Fulcrum pins 128 and 129 with spacers are implanted in the drum base 20 in 90 and 270 degrees directions and loosely fit in through-holes 130 and 131 formed in the lead member 12 to give a freedom of the lead member 12 tilting about the straight line CL4 passing through tops of the pins 128 and 129.

In this modification, the lead spring 112 mounted on a lower surface of the large diameter portion 65b of the fitting portion 65 of the lower stationary drum 10A biases the drum base 20 to depress the lower stationary drum 10A and the lead member 12 downwardly.

Further, in this modification, the fitting length of the fitting portion 65 of the lower stationary drum 10A is large and the drum shaft 18 is press-fitted in the fitting portion 65 with sufficient press-fitting strength with a high vertical accuracy.

Fourth Modification

FIGS. 33(a) and 33(b) are cross sections of the fourth modification corresponding to FIGS. 20(a) and 20(b), taken along the straight lines L1 and L2 in FIG. 2, showing the tape guide drum 10 and peripheral components associated therewith in the normal reproducing mode.

This modification is a combination of the first modification and the third modification of the second embodiment. That is, the lead member 12 for the lead compensation is supported to tilt about the straight line CL6 or CL7 by the stepped shafts 94 and 95 and the tape guide drum 10 for the track compensation is supported to tilt about the straight line CL5 by the suspension diaphragm 125 and the fulcrum pins 34 and 35.

Third Embodiment

A third embodiment of the present invention will be described with reference to FIGS. 34 to 35(f). As described previously with reference to FIGS. 36(a) through 37(d), the third embodiment employs the lead compensation according to the second method. That is, the supply side guide roller SGR and the take-up side guide roller TGR are provided such that they can be displaced in the width direction of the magnetic tape T. For example, in the FF reproducing mode, the running path of the magnetic tape T is corrected by displacing the supply side guide roller SGR downwardly and the take-up side guide roller TGR upwardly so that the running path extends along the lead 12a of the lead member 12. The track compensation in this embodiment can be done by using any of the first embodiment and its modifications. Therefore, in order to avoid duplication, a structure for performing only the lead compensation will be described hereunder.

Figure 34:
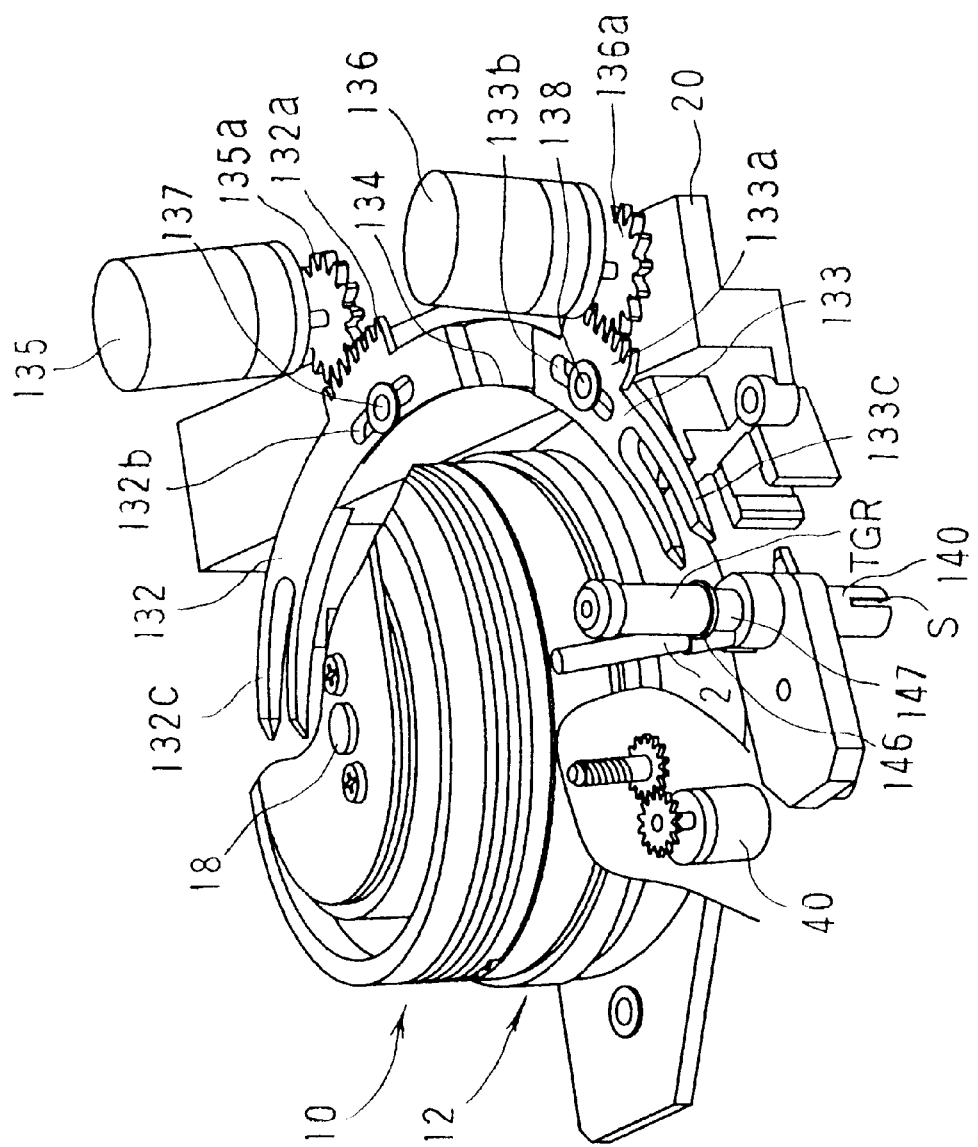
FIG. 34 is a perspective view of a tape guide drum and associated components of a third embodiment of the present invention.
Figure 35:
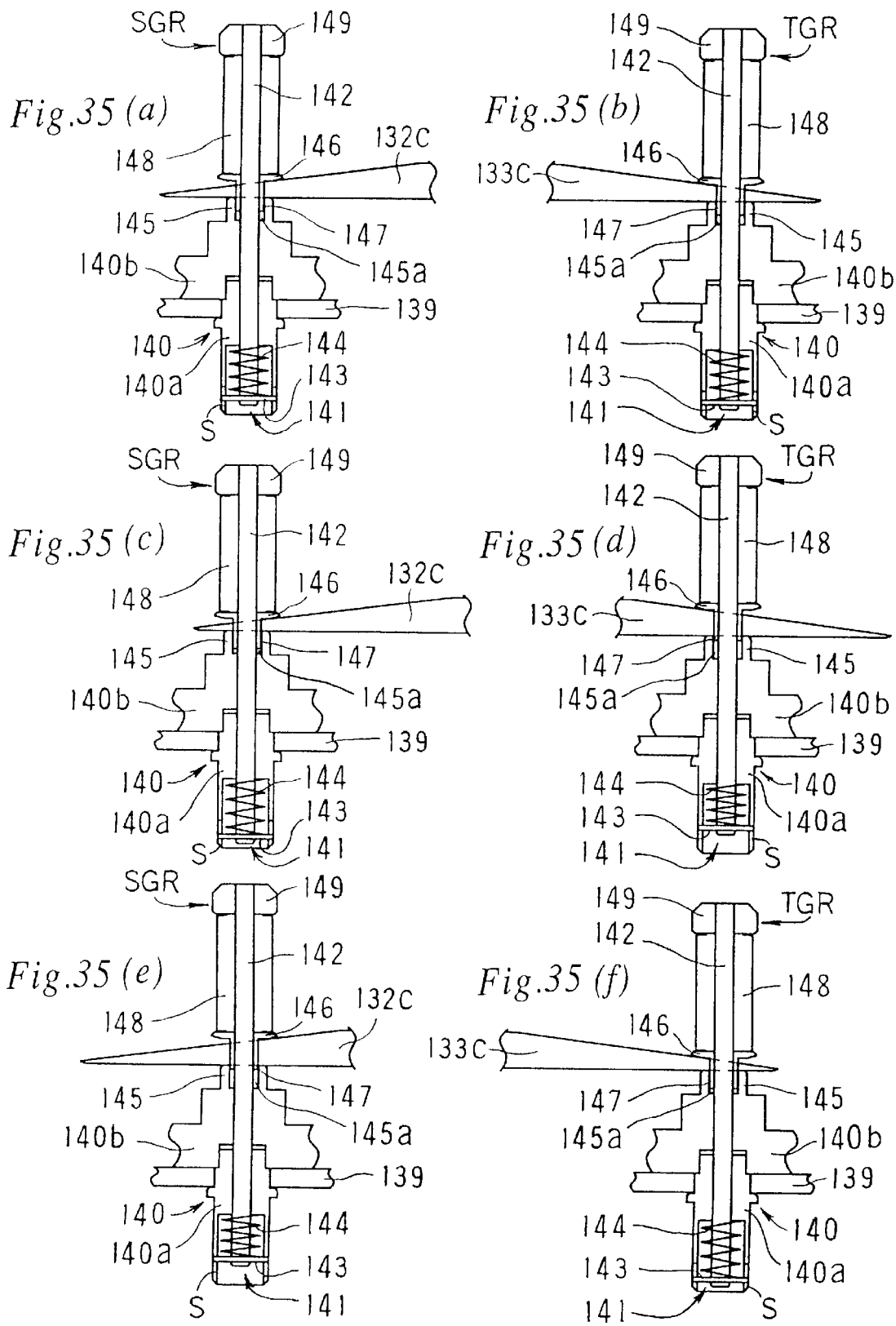
FIGS. 35(a) through 35(f) are cross sections showing guide rollers and cam portions of actuators in the third embodiment.

FIG. 34 is a perspective view of the third embodiment of the present invention, showing a construction of a portion of the magnetic recording and reproducing apparatus including the tape guide drum and other peripheral components associated therewith and a mechanism for displacing the supply side guide roller SGR (not shown) and the take-up side guide roller TGR vertically.

The mechanism for displacing the guide rollers SGR and TGR vertically is constituted with a pair of arc shaped actuators 132 and 133 and motors 135 and 136 for driving the actuators 132 and 133 along a guide groove 134 formed in the drum base 20. Pinions 135a and 136a are mounted on output shafts of the motors 135 and 136, respectively, and the actuators 132 and 133 are driven along the guide groove 134 by meshing of the pinions 135a and 136a with gears 132a and 133a provided on the actuators 132 and 133. Slots 132b and 133b are formed in the actuators 132 and 133 along the guide groove 134 and the actuators 132 and 133 are supported by collared pins 137 and 138 implanted in the drum base 20 and penetrating the slots 132b and 133b, so that the actuators 132 and 133 are allowed to slide smoothly in the guide groove 134.

Fork shaped cam portions 132c and 133c are provided at top ends of the actuators 132 and 133, respectively. The cam portions 132c and 133c take in the form of wedges having thickness gradually reducing toward top ends thereof, respectively. The cam portions 132c and 133c provide the vertical deviation of the respective guide rollers SGR and TGR.

The operation of this mechanism will be described in detail with reference to FIGS. 35(a) to 35(f). FIG. 35(a) and 35(b) are cross sections showing the respective guide rollers SGR and TGR and the cam portions 132c and 133c of the actuators 132 and 133 in the normal reproducing mode. Similarly, FIGS. 35 (c) and 35(d) are cross sections of these components in the FF reproducing mode and FIGS. 35(e) and 35(f) are cross sections in the FB reproducing mode.

First, the structure of the supply side guide roller SGR and the take-up side guide roller TGR will be described.

The supply side guide roller SGR and the take-up side guide roller TGR are displaceable in the width direction of the magnetic tape T (vertically in the figures) with respect to a support portion 140 mounted on a base plate 139 of a tape loading mechanism. The support portion 140 is constituted with holding portions 140a and 140b provided on both sides of the base plate 139 and, by a coupling of the base plate 139 and the holding portions 140a and 140b, the support portion 140 is movable with respect to the base plate 139 upon loading the tape. In a lower portion of the holding portion 140a a hollow portion 141, and on a part of an outer wall of which, slits "S" are formed. A shaft 142 penetrates holes formed in center portions of the holding portions 140a and 140b of the support portion 140 and a pin 143 is fixed to an end of the shaft 142. Since opposite end portions of the pin 143 are guided by the slits "S", the shaft 142 does not rotate when the shaft 142 moves vertically. Further, a spring 144 is provided between the pin 142 and the bottom portion of the hollow portion 141 for biasing the shaft 142 downwardly.

Therefore, when the arc shaped actuators 132 and 133 slide, their bottoms are in slide contact with end faces of reduced diameter portions 145 provided in upper portions of the holding portions 140a and 140b of the guide rollers SGR and TGR, respectively. The actuators 132 and 133 are guided in the guide groove 134 provided in the drum base 20 with cylinder portions 147 provided in lower portions of lower flanges 146 of the guide rollers SGR and TGR being held by the forked cam portions 132c and 133c thereof, respectively.

In the reduced diameter portions 145, hollow portions 145a having diameter larger than the diameter of the shaft 142 are formed for guiding the cylinder portions 147 vertically and respectively.

A roller 148 having length corresponding to the width of the magnetic tape T is rotatably mounted on the shaft 142. An upper flange 149 is fixed to an upper end of the shaft 142. The magnetic tape T is in slide-contact with a peripheral surface of the roller 148 provided between the upper surface of the lower flange 146 and a lower surface of the upper flange 149 and runs while its vertical position is restricted by the upper surface of the lower flange 146 and the lower surface of the upper flange 149.

FIGS. 35(a) and 35(b) show a state of the magnetic recording and reproducing apparatus in the normal reproducing mode in which the height of the guide rollers SGR and TGR are restricted by the cam portions 132c and 133c of the arc shaped actuators 132 and 133.

Figure 37A:
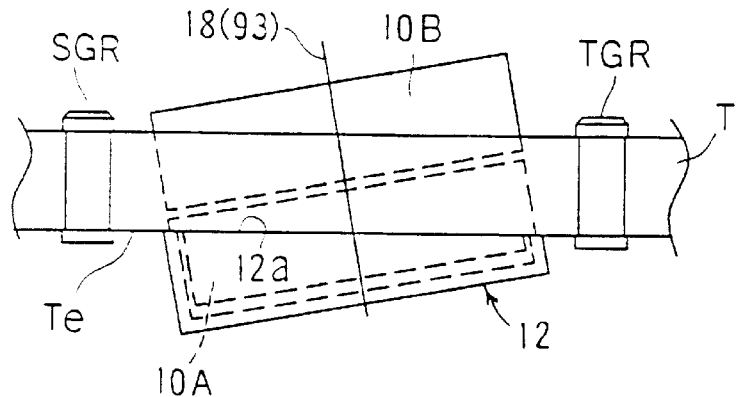
FIGS. 37 (a) through 37(d) show a relation between the track compensation and the lead compensation in the second or third embodiment.

That is, in the normal reproducing mode, the center axis 93 of the lead member 12 and the drum shaft 18 are coincident as shown in FIG. 36(a) or 37(a) and the guide rollers SGR and TGR are not displaced relatively.

FIGS. 35(c) and 35(d) show a state of the magnetic recording and reproducing apparatus in the FF reproducing mode in which the height of the guide rollers SGR and TGR are restricted by the cam portions 132c and 133c of the arc shaped actuators 132 and 133.

That is, in the FF reproducing mode, the drum shaft 18 is tilted in clockwise direction with respect to the center axis 93 of the lead member 12 as shown in FIG. 36(b) and the track compensation is performed. Therefore, the reference edge Te of the magnetic tape T tends to tilt with respect to the lead 12a of the lead member 12 by an angle ($\theta_2$). In order to correct this, the supply side guide roller SGR and the take up side guide roller TGR respectively displace downwardly and upwardly, and the reference edge Te of the magnetic tape T is guide throughout the lead 12a. Thus, the running of the magnetic tape T is stabilized, resulting in a good reproducing signal.

FIGS. 35(e) and 35(f) show a state of the magnetic recording and reproducing apparatus in the FB reproducing mode in which the height of the guide rollers SGR and TGR are restricted by the cam portions 132c and 133c of the arc shaped actuators 132 and 133.

Figure 37B:
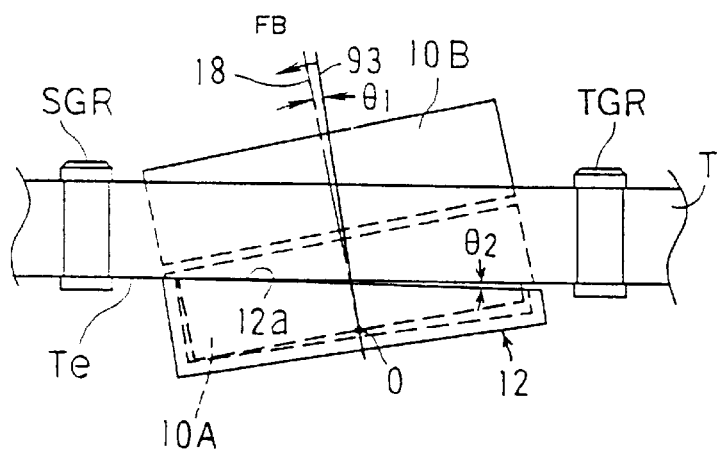
Figure 37C:
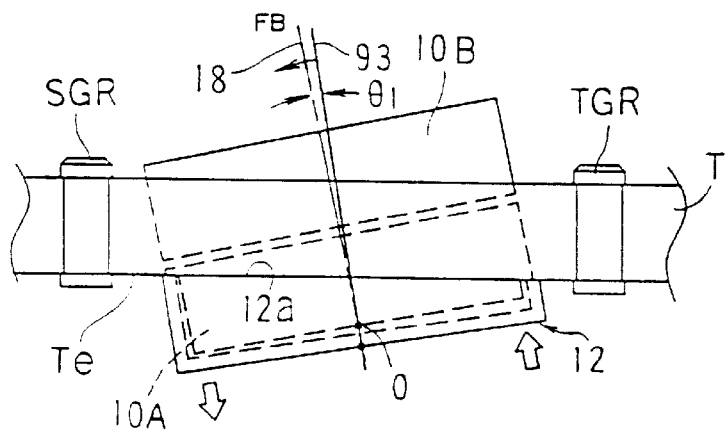
Figure 37D:
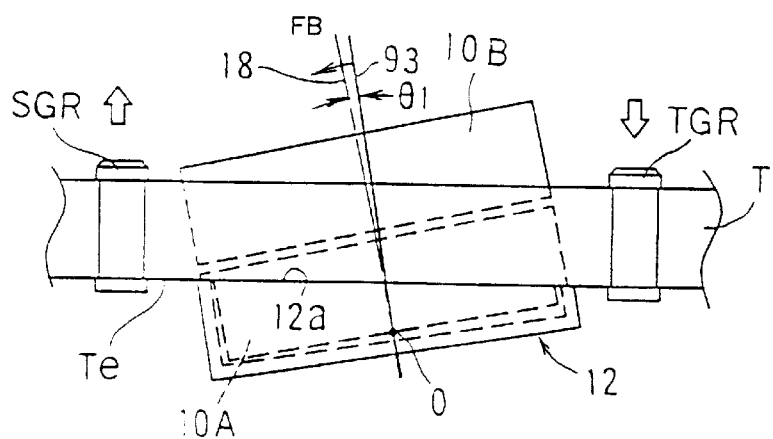
Figure 38:
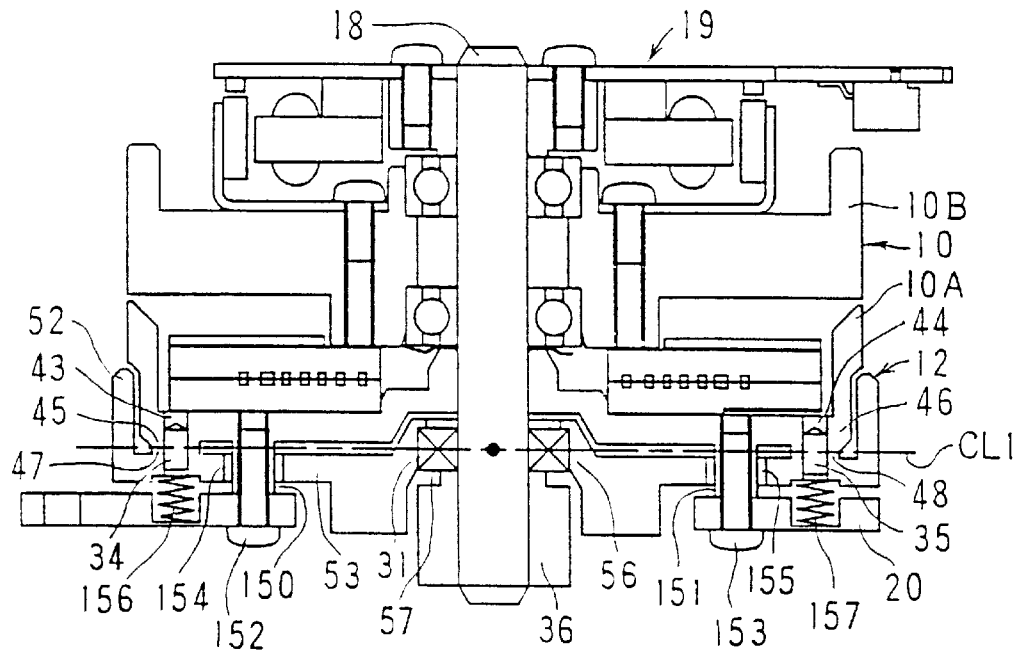
FIGS. 38(a) and 38(b) are cross sections of the tape guide drum and associated components of a fourth embodiment of the present invention in the normal reproducing mode.
Figure 38:
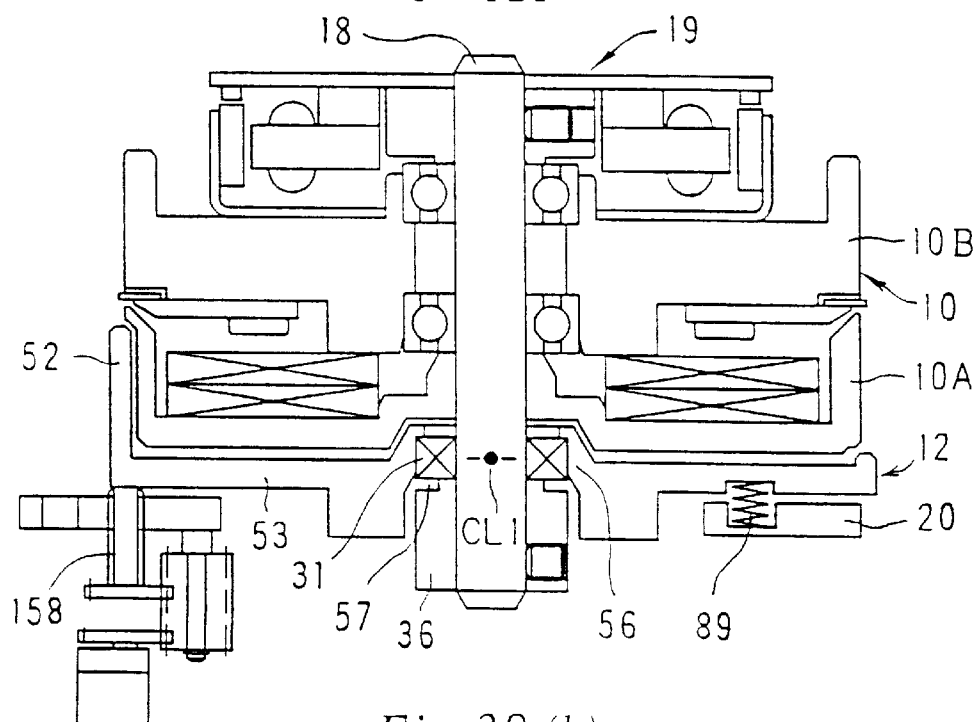
Figure 39:
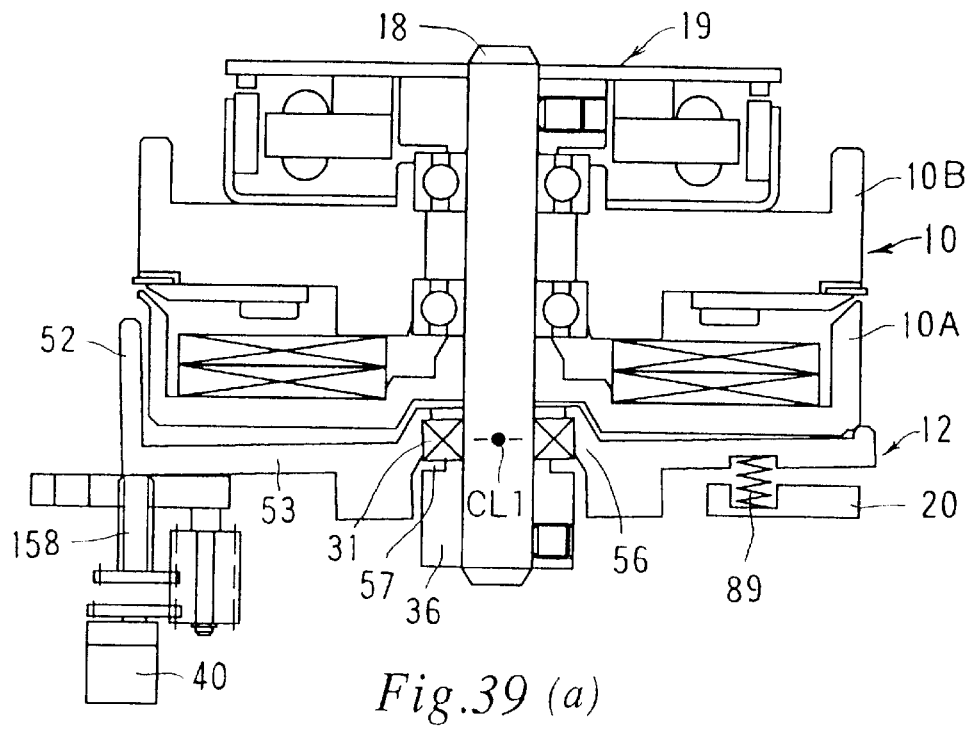
FIGS. 39(a) and 39(b) are cross sections of the tape guide drum and associated components of the fourth embodiment of the present invention in the trick play.
Figure 39:
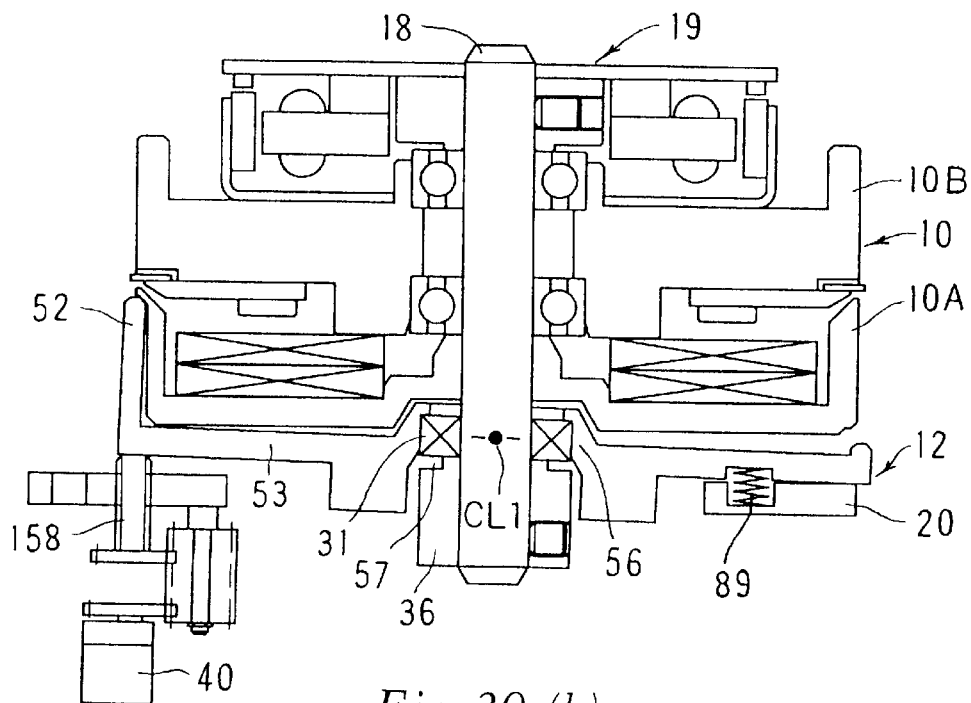

That is, in the FB reproducing mode, the drum shaft 18 is tilted in counterclockwise direction with respect to the center axis 93 of the lead member 12 as shown in FIG. 37(b) and the track compensation is performed. Therefore, the reference edge Te of the magnetic tape T tends to tilt with respect to the lead 12a of the lead member 12 by an angle ($\theta_2$). In order to correct this, the supply side guide roller SGR and the take-up side guide roller TGR displace upwardly and downwardly, respectively, and the reference edge Te of the magnetic tape T is guided throughout the lead 12a as shown in FIG. 37(d). Thus, the running of the magnetic tape T is stabilized, resulting in a good reproducing signal.

Fourth Embodiment

A fourth embodiment of the present invention will be described with reference to FIGS. 38(a) to 41(c). Although, in the first to third embodiments, the track compensation is performed by tilting the tape guide drum 10 with the drum shaft 18 with respect to the lead member 12, the track compensation in the fourth embodiment is performed by tilting the lead member 12 while the tape guide drum 10 is fixed to the drum base 20. The lead compensation is performed by using the second method used in the third embodiment. A principle of operation of this embodiment will be described in detail with reference to FIGS. 40(a) to 41(c).

Figure 40A:
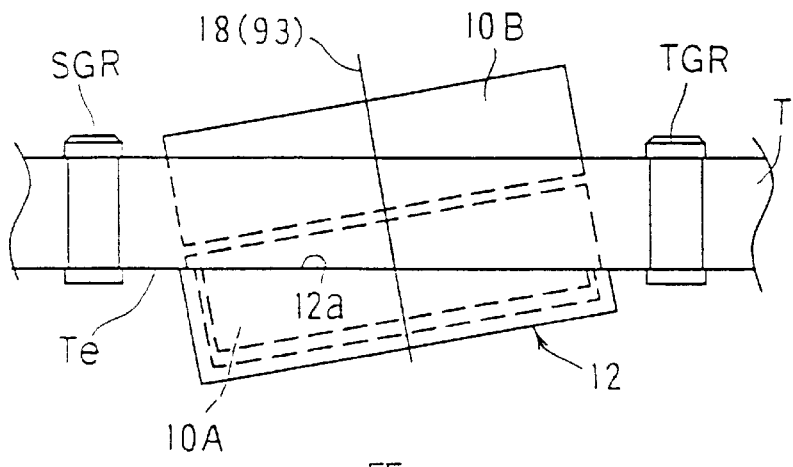
FIGS. 40(a) through 40(c) show a relation between the track compensation and the lead compensation in the fourth embodiment.

FIG. 40(a) shows a running state of the magnetic tape T in the normal reproducing mode. In this state, the drum shaft 18 and the center axis 93 of the lead member 12 coincide each other and the reference edge Te of the magnetic tape T runs along the lead 12a of the lead member 12 without floating away from the lead 12a or being depressed to the lead 12a.

Figure 40B:
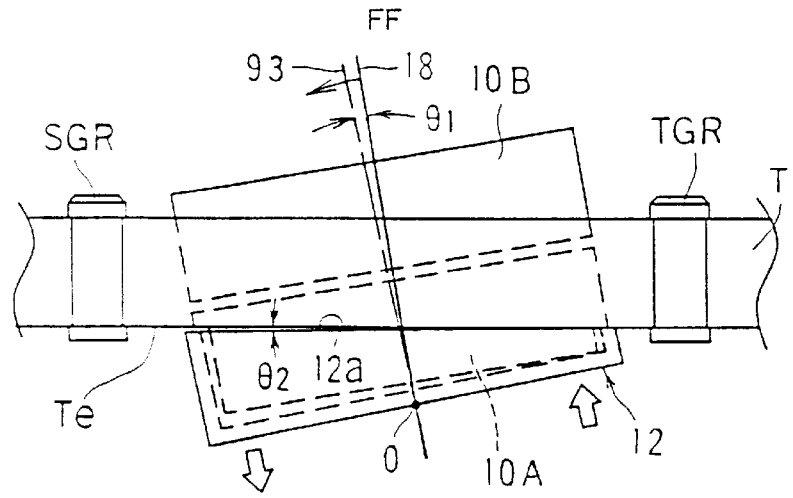

On the contrary, in the running state of the magnetic tape T in the FF reproducing mode shown in FIG. 40(b), the drum shaft 18 is tilted about a point "O" in counterclockwise direction with respect to the center axis 93 of the lead member 12 as shown by a chain line in FIG. 40(b). Therefore, in the exit side of the tape guide drum 10 (take-up side guide roller TGR side), the lead 12a of the lead member 12 tends to push up the reference edge Te of the magnetic tape T. On the other hand, on the inlet side of the tape guide drum 10 (supply side guide roller SGR side), the lead 12a of the lead member 12 tends to be separated from the reference edge Te of the tape T. As a result, the magnetic tape T is low at the inlet side and high on at the exit side compared with the running state shown in FIG. 40(a) and the reference edge Te does not meet completely with the lead 12a due to friction with the tape guide drum 10 and other reason, resulting in that the edge Te is tilted slightly by an angle ($\theta_2$) with respect to the lead 12a.

Figure 40C:
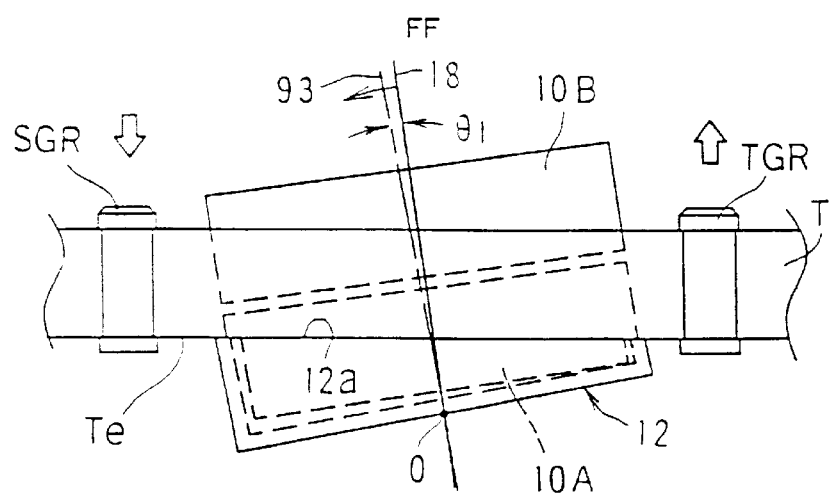
Figure 41A:
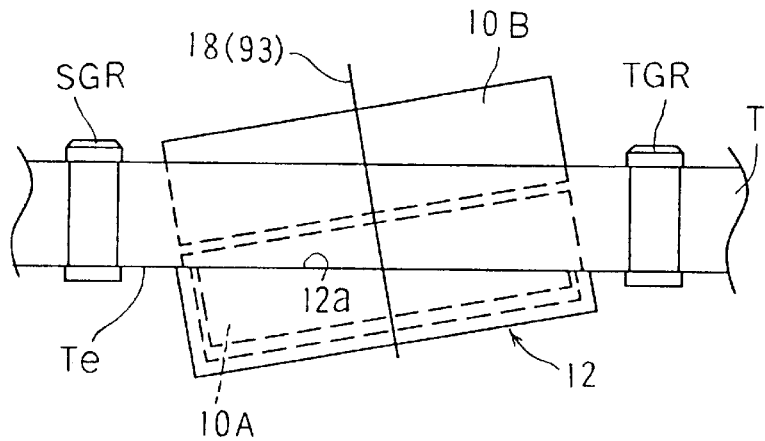
FIGS. 41(a) through 41(c) show a relation between the track compensation and the lead compensation in the fourth embodiment.
Figure 41B:
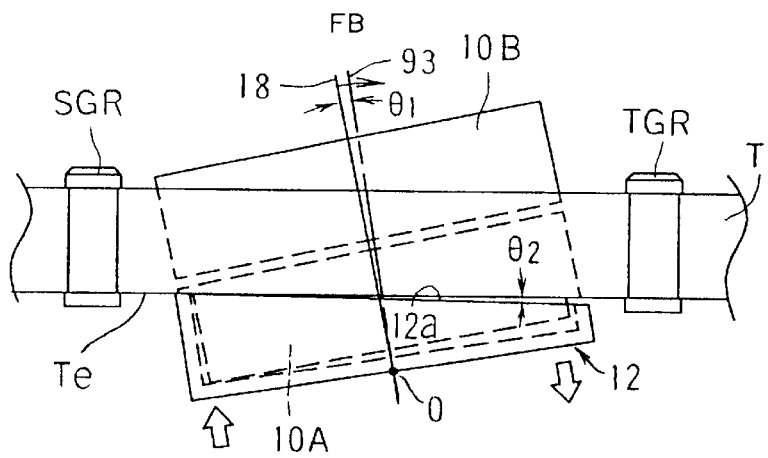
Figure 41C:
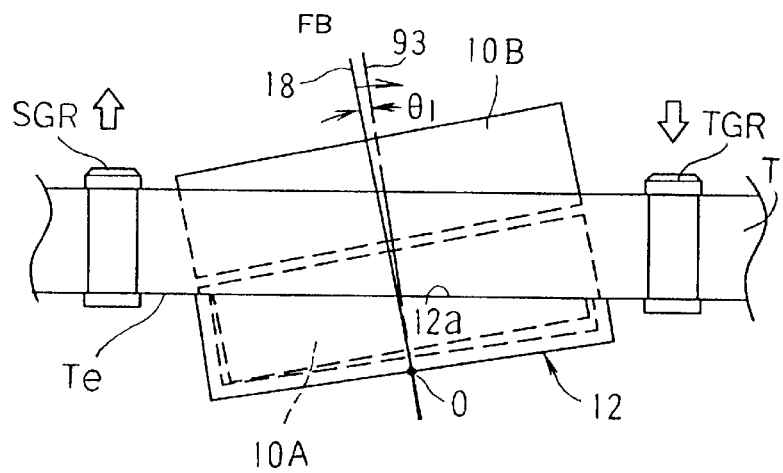

According to the fourth embodiment, as shown in FIG. 40(c), the lead compensation is performed by displacing the supply side guide roller SGR and the take-up side guide roller TGR downwardly and upwardly, respectively, to correct the running path of the magnetic tape T so that it runs along the lead 12a of the lead member 12. This lead compensation can be performed in the same way as described with respect to the third embodiment.

FIGS. 38(a) and 38(b) are cross sections of the fourth embodiment taken along the straight lines L1 and L2 in FIG. 2, showing the tape guide drum 10 and peripheral components associated therewith in the normal reproducing mode and FIGS. 39(a) and 39(b) are cross sections of the fourth embodiment taken along the straight line L2 in FIG. 2, showing the tape guide drum 10 and peripheral components associated therewith in the FF reproducing mode.

This embodiment is similar to the first embodiment except that the lead compensation is performed. Therefore, only differences of the fourth embodiment from the first embodiment will be described.

Although, in the first embodiment, the lead member 12 is fixed to the drum base 20 and the tape guide drum 10 is allowed to tilt with respect to the lead member 12, the main difference of the fourth embodiment is that the lower stationary drum 10A is fixed to the drum base 20 and the lead member 12 is allowed to tilt with respect to the tape guide drum 10.

That is, bosses 150 and 151 are provided in the bottom surface of the lower stationary drum 10A, penetrate through-holes 154 and 155 formed in the bottom portion 53 of the lead member 12 and are fixed to the rear side of the drum base 20 by screws 152 and 153, respectively.

Springs 156 and 157 are provided between the bottom surface portion 53 of the lead member 12 and the drum base 20 in 90 and 270 degrees directions and bias the lead member 12 upwardly to the lower stationary drum 10A.

This embodiment is the same as the first embodiment in that the fulcrum pins 34 and 35 are implanted in the bottom surface 53 of the lead member 12 in the 90 and 270 degrees directions and loosely fitted in the holes 43 and 44 of the lower stationary drum 10A, that the bearing retaining portion 56 is formed around the through-hole 57 formed in the bottom surface portion 53 of the lead member 12 and receives with a snug fit the ball bearing 31 such that its center height is flush with the abutment faces 47 and 48 and that the ball bearing 31 is one such as single deep groove ball bearing which allows a center axis of its outer ring to relatively incline with respect to that of an inner ring.

In this embodiment, the tape guide drum 10 is fixed to the drum base 20 and the lead member 12 is supported to tilt by the fulcrum pins 34 and 35 and the ball bearing 31. Therefore, when the gear screw 158 is driven by the motor 40 to retract downwardly as shown in FIG. 39(a), the lead member 12 tilt in the counterclockwise direction about the straight line CL1 by the spring 89 and the track compensation is performed suitably for the FF reproducing mode. On the other hand, when the gear screw 158 is driven by the motor 40 to move upwardly as shown in FIG. 39(b), the lead member 12 tilts in clockwise direction about the straight line CL1 against the spring 89 and the track compensation is performed suitably for the FB reproducing mode. In this case, the supply side guide roller SGR and the take-up side guide roller TGR are displaced respectively to perform the necessary lead compensation as mentioned previously.

In the above description, the state where the center axis 93 of the lead member and the drum shaft 18 are coincident is the recording mode and, when the magnetic tape recorded in this state is reproduced in the FF or FB mode with a tilt of the center axis 93 and the drum shaft 18 relatively has been described. However, the magnetic recording and reproducing apparatus according to the present invention is not limited to such recording state or the reproducing state.

That is, as mentioned previously, when the "time-lapse" or the so-called "frame by frame" recording is to be performed, the recording is performed in a state where the center axis 93 of the lead member 12 and the drum shaft 18 are preliminary tilted relatively. When the magnetic tape recorded in this manner is reproduced while running the tape at the standard speed, the center axis 93 of the lead member 12 and the drum shaft 18 are made coaxial.

Further, although, in the embodiments and their modifications, the magnetic heads Ha and Hb are mounted on the upper rotary drum 10B so that they rotate together with the upper rotary drum 10B, the magnetic recording and reproducing apparatus according to the present invention is not limited to such construction.

That is, the upper rotary drum 10B may be fixed to the drum shaft 18 and the magnetic heads Ha and Hb may be mounted on another member which rotates around the drum shaft 18. FIGS. 42(a) and 42(b) show a modification which employs the construction mentioned above.

Figure 42:
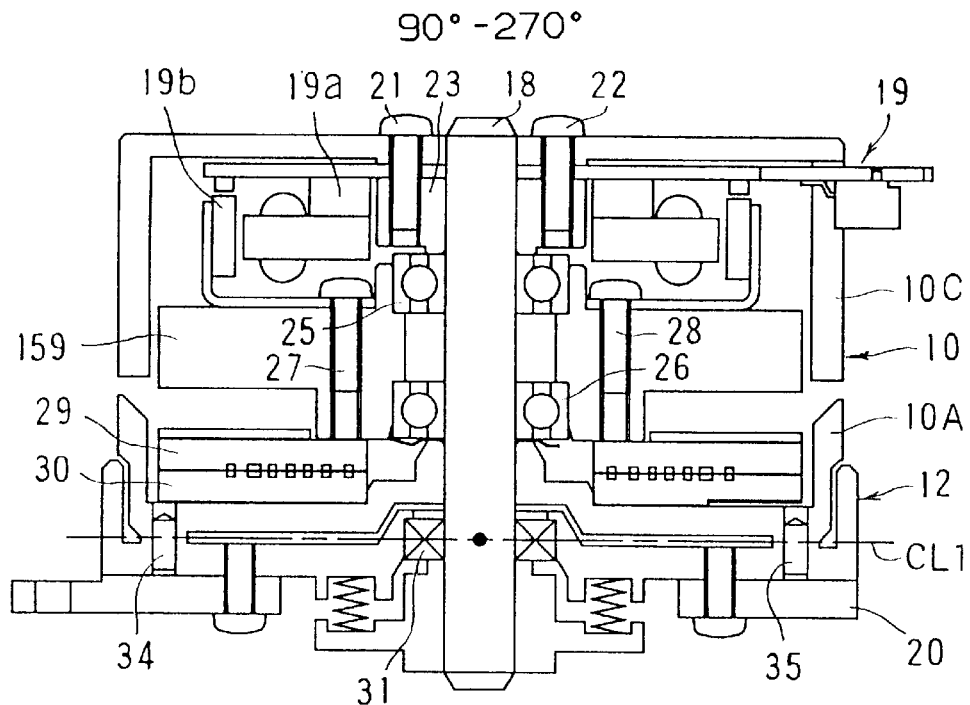
FIGS. 42(a) and 42(b) are cross sections of the tape guide drum and associated components of another modification in the normal reproducing mode.
Figure 42:
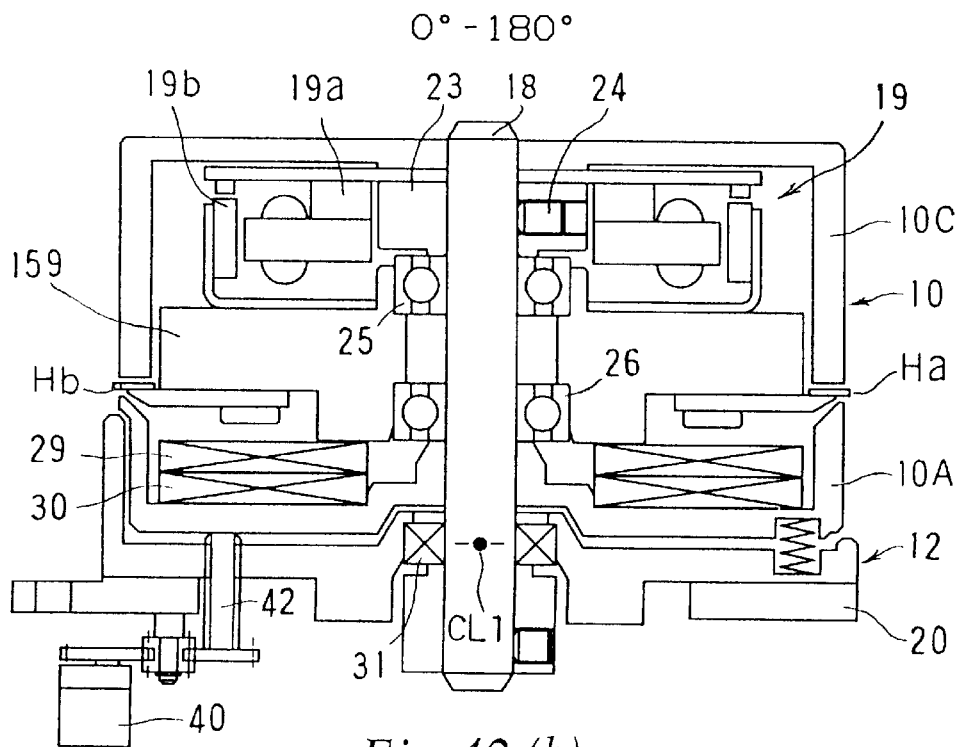

FIG. 42 is a cross section of the tape guide drum 10 and associated peripheral components in the normal reproducing mode, FIG. 42(a) is a cross section taken along the straight line L1 in FIG. 2. In this modification, an upper drum 10C together with the stator 19a of the drum motor 19 is fixed through the collar 23 to the drum shaft 18 by the screws 21 and 22. On the other hand, the magnetic heads Ha and Hb are mounted on a head base 159 provided separately from the upper drum 10C and rotate around the drum shaft 18. That is, the head base 159 is supported rotatably around the drum shaft 18 by the ball bearings 25 and 26 and the rotor 19b of the drum motor 19 is mounted on an upper surface of the head base 159 by screws 27 and 28. The rotary transformers 29 and 30 are respectively provided on the lower surface of the head base 159 and the upper surface of the lower stationary drum 10A in facing relation to exchange signals. Therefore, in this modification, the upper drum 10C, the drum motor 19, the head base 159 and the lower stationary drum 10A are supported as a single unit by means of the drum shaft 18 and the track compensation is performed by tilting the unit about the straight line CL1 with respect to the lead member 12. This modification is the same as the first embodiment in that the drum shaft 18 is supported by the ball bearing 31 provided in the lead member 12 and that the straight line CL1 which acts as the center axis of the rotation is determined by the fulcrum pins 34 and 35, etc.

In the modification mentioned above, only the track compensation is described. However, it is clear from the second to fourth embodiments that the lead compensation can be performed equally in this modification.

As described hereinbefore, according to the magnetic recording and reproducing apparatus of the present invention, it is possible to maintain the track patterns in recording and reproducing always coincident while maintaining the stable running condition of the magnetic tape even when the running speed and/or running direction of the magnetic tape in recording are different from those in reproducing. Thus, it is possible to obtain a good reproduced image without noise bars.

Further, in the conventional magnetic recording and reproducing apparatus using the actuator such as piezo electric element or voice coil, etc., it is difficult to change largely a ratio of the tape running speed in reproducing the magnetic tape to that in recording the magnetic tape due to limitation of amplitude-frequency characteristics of such actuators. In the magnetic recording and reproducing apparatus according to the present invention, however, the trick plays with a wide variety of speed ratio is also possible because there is no such limitation of amplitude-frequency characteristics of the above mentioned conventional actuators.

Further, since the magnetic recording and reproducing apparatus according to the present invention comprises a first rotary means for relatively tilting the drum shaft and a center axis of the annular portion between a first state in which the drum shaft and the center axis of the annular portion are coaxial and a second state in which the drum shaft and the center axis of the annular portion are tilted with respect to each other about a specific point on the drum shaft in the first state, support means for supporting the drum shaft and the center axis of the annular portion in the first state and the second state at the specific point and tilting direction regulating means for regulating the relative tilting direction of the drum shaft and the center axis of the annular portion such that a line extending from the specific point in a specific plane containing the drum shaft in the first and the second state perpendicularly to the specific plane is coincident with a line equally dividing a winding angle range of a peripheral surface of the tape guide drum on which the magnetic tape is wound, the specific points and the specific planes are maintained unchanged in the respective normal, FF and FB reproducing modes, etc., and the linearity of rotational loci of the magnetic heads Ha and Hb formed on the magnetic tape are maintained.

Further, since the tape guide member of the present invention is composed of the annular portion and the bottom surface portion and takes in the form of a cup, the rigidity thereof is high enough to eliminate machining distortion, etc., in machining the lead, etc., and therefore a high precision machining is possible and the reproducibility is superior.

What is claimed is:

1. A magnetic recording and reproducing apparatus for recording and reproducing signals on and from a magnetic tape, comprising:

a tape guide drum assembly comprising:

drum means composed of an upper rotary drum and a lower stationary drum, said lower stationary drum having a cylindrical tape contact portion extending along a peripheral surface of said lower stationary drum in a predetermined angular range for sliding contact with said magnetic tape;

a drum shaft for supporting said upper rotary drum and said lower stationary drum coaxially;

magnetic head means provided on said upper rotary drum;

tape guide means including a tape guide member provided separately from said drum means and composed of a bottom portion and an annular portion having edge means functioning as a lead for guiding a reference edge of said magnetic tape with said bottom portion of said tape guide member having a substantial cup shape;

a drum base for mounting said tape guide member on a chassis of said magnetic recording and reproducing apparatus;

a step portion formed in a lower portion of said lower stationary drum, said step portion having a diameter smaller than a diameter of said cylindrical tape contact portion of said lower stationary drum and adapted to loosely fit in said annular potion of said tape guide member;

tilting means for tilting said drum means including said drum shaft between first and second status modes corresponding to separate recording and reproducing modes, wherein said drum shaft and a center axis of said annular portion are coaxial each other in the first status mode, and said drum shaft and said center axis of said annular portion are inclined with respect to each other in the second status mode, and said tilting means further including a drum tilting motor mounted on said drum base and a transferring mechanism for transferring driving power from said drum tilting motor to tilt said lower stationary drum;

support means for supporting said drum shaft to enable said tilting means to tilt said drum shaft; and pivot means extending inside said drum means and located along axes on opposite sides of said drum shaft for supporting and allowing said drum means to tilt with respect to said center axis of said annular portion of said tape guide member between the first and second status modes, and said pivot means further having fulcrum portions provided on a bottom portion of said tape guide member and on said lower stationary drum.

2. A magnetic recording and reproducing apparatus as claimed in claim 1, wherein said tape guide means is fixed to a base portion of said apparatus and said drum shaft is supported to tilt with respect to said tape guide means.

3. A magnetic recording and reproducing apparatus as claimed in claim 2, wherein said drum means is tilted around a specific point, and said apparatus further comprises tilting direction determining means for determining a tilting direction of said drum shaft with respect to said center axis of said annular portion within a plane which includes said specific point and said drum shaft in both the first and second status modes causing that a line normal to said plane and passing through said specific point bisects said predetermined angular range.

4. A magnetic recording and reproducing apparatus as claimed in claim 1, wherein said support means comprises:

- a suspension ring including a large diameter ring and a small diameter ring coaxial with each other, and a flexible member for connecting said large diameter ring to said small diameter ring at two positions in radial directions of said suspension ring;
- a suspension ring holding portion formed in said bottom portion of said tape guide member coaxially with said annular portion wherein said large diameter ring is fitted to said suspension ring holding portion; and
- a fitting portion formed in said lower stationary drum coaxially with said drum shaft for engaging said small diameter ring.

5. A magnetic recording and reproducing apparatus as claimed in claim 1, wherein said pivot means depends from said lower stationary drum.

6. A magnetic recording and reproducing apparatus as claimed in claim 1, further comprising an additional tilting means for tilting said drum shaft together with said center axis of said annular portion of said tape guide member.

7. A magnetic recording and reproducing apparatus as claimed in claim 1, further comprising:

- a first guide roller provided on a tape inlet side of said drum means in a magnetic tape running path for regulating a running height of the magnetic tape;
- a second guide roller provided on a tape exit side of said drum means in said magnetic tape running path for regulating a running height of the magnetic tape;
- first displacement means for displacing a level of said first guide roller in a width direction of the magnetic tape; and
- second displacement means for displacing a level of said second guide roller in a width direction of the magnetic tape.

8. A magnetic recording and reproducing apparatus as claimed in claim 1, wherein said support means comprises a ball bearing including an inner ring and an outer ring, a center axis of said inner ring being allowed to tilt slightly with respect to a center axis of said outer ring, said outer ring being held coaxially with said annular portion at said bottom portion of said tape guide member, said drum shaft being fitted in said inner ring.

9. A magnetic recording and reproducing apparatus as claimed in claim 1, wherein said support means comprises a through hole formed in said bottom portion of said tape guide member, extending coaxially with said tape guide member and having a cross section in a form of substantially a knife edge.

* * * * *